United States Patent
Luo et al.

(10) Patent No.: US 11,259,314 B2
(45) Date of Patent: Feb. 22, 2022

(54) SYSTEM MESSAGE TRANSMISSION METHOD, APPARATUS, AND SYSTEM

(71) Applicant: Huawei Technologies Co., Ltd., Shenzhen (CN)

(72) Inventors: Zhihu Luo, Beijing (CN); Jun Li, Shanghai (CN); Zhe Jin, Beijing (CN); Weiliang Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/875,801

(22) Filed: May 15, 2020

(65) Prior Publication Data

US 2020/0281003 A1   Sep. 3, 2020

Related U.S. Application Data

(63) Continuation of application No. PCT/CN2017/111759, filed on Nov. 17, 2017.

(51) Int. Cl.
*H04W 72/12* (2009.01)
*H04L 5/14* (2006.01)
*H04W 56/00* (2009.01)

(52) U.S. Cl.
CPC ............ *H04W 72/12* (2013.01); *H04L 5/14* (2013.01); *H04W 56/001* (2013.01)

(58) Field of Classification Search
CPC ................................ H04L 5/14; H04W 72/12
(Continued)

(56) References Cited

U.S. PATENT DOCUMENTS

| 2010/0124919 A1 | 5/2010 | Ko et al. |
| 2015/0173078 A1 | 6/2015 | Schliwa-Bertling et al. |
| 2017/0251443 A1 | 8/2017 | Shin et al. |

FOREIGN PATENT DOCUMENTS

| CN | 101651988 A | 2/2010 |
| CN | 101674211 A | 3/2010 |

(Continued)

OTHER PUBLICATIONS

Huawei, HiSilicon, "Cell search and system information acquisition improvements in eFeMTC," 3GPP TSG RAN WG1 Meeting #89, Hangzhou, China, R1-1707017, total 4 pages, 3rd Generation Partnership project, Valbonne, France (May 15-19, 2017).

(Continued)

*Primary Examiner* — Angel T Brockman
(74) *Attorney, Agent, or Firm* — Leydig, Voit & Mayer, Ltd.

(57) ABSTRACT

This application provides a system message transmission method, an apparatus, and a system. A first communications device configures a MIB message, and the MIB message may carry various different information used to transmit a SIB1, for example, any one or more of scheduling information, first information, and an operation mode of a carrier, so that a second communications device receives the SIB1 based on the MIB message. The first communications device may flexibly configure information used to transmit the SIB1. In addition, when configuring the MIB message, the first communications device may consider ensuring, through configuration or implicit indication, that resource locations for transmitting SIB1s of different cells in one period are different. This type of interference isolation mechanism can avoid mutual interference between transmission of SIB1s of different cells, so that transmission reliability of the SIB1s can be improved.

20 Claims, 5 Drawing Sheets

(58) Field of Classification Search
USPC .......................................................... 370/280
See application file for complete search history.

(56) References Cited

FOREIGN PATENT DOCUMENTS

| CN | 102651890 A | 8/2012 |
|---|---|---|
| CN | 102790669 A | 11/2012 |
| CN | 102823181 A | 12/2012 |
| CN | 104272824 A | 1/2015 |
| CN | 104602226 A | 5/2015 |
| CN | 107046721 A | 8/2017 |
| WO | 2016053039 A1 | 4/2016 |
| WO | 2017019133 A1 | 2/2017 |
| WO | 2017192624 A1 | 11/2017 |
| WO | 2018190620 A1 | 10/2018 |

OTHER PUBLICATIONS

"On downlink TDD NB-IoT," 3GPP TSG RAN WG1 Meeting #90bis, Prague, Czech Republic, R1-1716982, pp. 1-4, 3rd Generation Partnership Project, Valbonne, France (Oct. 9-13, 2017).
"On downlink TDD NB-IoT," 3GPP TSG RAN WG1 Meeting #90, Prague, Czech Republic, R1-1713365, pp. 1-3, 3rd Generation Partnership Project, Valbonne, France (Aug. 21-25, 2017).
"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.4.0, total 753 pages, 3rd Generation Partnership Project, Valbonne, France (Sep. 2017).
"3rd Generation Partnership Project; Technical Specification Group Radio Access Network; Evolved Universal Terrestrial Radio Access (E-UTRA); Physical layer procedures (Release 14)," 3GPP TS 36.213 V14.4.0, total 462 pages, 3rd Generation Partnership Project, Valbonne, France (Sep. 2017).
"MIB, SIBS and Paging for NB-IoTTDD," 3GPP TSG-RAN WG2 #100, Reno, USA, R2-1713360,, pp. 1-8, 3rd Generation Partnership Project, Valbonne, France (Nov. 27-Dec. 1, 2017).
"Discussion on DL common channel/signal for TDD NB-IoT," 3GPP TSG RAN WG1 Meeting #90, Prague, Czech Republic, R1-1713549, pp. 1-4, 3rd Generation Partnership Project, Valbonne, France (Aug. 21-25, 2017).
"Reduction of NB-IoT System Information acquisition time," 3GPP TSG RAN WGI Meeting #90bis, Prague, Czech Republic, R1-1716987, pp. 1-8, 3rd Generation Partnership Project, Valbonne, France (Oct. 9-13, 2017).
"Further considerations on SIB(s) for MTC enhancement," 3GPP TSG RAN WG1 Meetinct #82, Beijing, China, R1-154039, pp. 1-6, 3rd Generation Partnership Project, Valbonne, France (Aug. 24-28, 2015).

SYSTEM MESSAGE TRANSMISSION METHOD, APPARATUS, AND SYSTEM

CROSS-REFERENCE TO RELATED APPLICATIONS

This application is a continuation of International Application No. PCT/CN2017/111759, filed on Nov. 17, 2017, the disclosure of which is hereby incorporated by reference in its entirety.

TECHNICAL FIELD

This application relates to the field of communications technologies, and in particular, to a system message transmission method, an apparatus, and a system BACKGROUND The 3rd generation partnership project (3GPP), which is a mobile communications standards organization, proposes a narrowband internet of things (NB-IoT) technology. NB-IoT supports frequency division duplex (FDD) and time division duplex (TDD).

For FDD NB-IoT, a period of a system information block type 1 (SIB1) is 2560 ms. The SIB1 is transmitted on a subframe 4 in a radio frame, and appears every other radio frame. One transport block (TB) of the SIB1 occupies 8 subframes. Therefore, one time of complete transmission of the SIB1 needs to occupy 16 consecutive radio frames. In addition, a repetition number of the SIB1 may be 4, 8, or 16, and repeated copies are distributed at an equal interval within the period of 2560 ms. In the FDD NB-IoT, SIB1s of different cells are transmitted at different resource locations within the period of 2560 ms, so that mutual interference between transmission of SIB1s of different cells can be avoided. This type of interference isolation mechanism is particularly important in a scenario of intra-frequency networking and time synchronization between cells.

In TDD NB-IoT, an uplink-downlink subframe configuration supports some uplink-downlink subframe configurations of a TDD long term evolution (LTE) system. On an anchor carrier, there are a narrowband primary synchronization signal (NPSS), a narrowband secondary synchronization signal (NSSS), and a narrowband physical broadcast channel (NPBCH). On the anchor carrier, the NSSS is transmitted on a subframe 0 of an even-numbered frame. A period of the SIB1 is also 2560 ms. One transport block of the SIB1 occupies eight subframes. When the SIB1 is transmitted on a subframe 0 of an odd-numbered frame on the anchor carrier, and a repetition number is 16, because the subframe 0 of the even-numbered frame is occupied by the NSSS, SIB1s of different cells can be transmitted only at a same resource location. Consequently, a problem of mutual interference between transmission of SIB1s of the cells is caused.

SUMMARY

This application provides a system message transmission method, an apparatus, and a system, to avoid mutual interference between transmission of SIB1s of different cells, and improve transmission reliability of the SIB1.

According to a first aspect, this application provides a system message transmission method. The method includes:
configuring, by a first communications device, a master information block (MIB) message, where the MIB message includes scheduling information of a SIB1, or the MIB message includes the scheduling information and at least one of an operation mode of a carrier and first information; and the first information includes at least one of the following information: status information used to transmit the SIB1, time domain position information used to transmit the SIB1, frequency domain position information of a non-anchor carrier used to transmit the SIB1, and transmission mode information of the SIB1 on the non-anchor carrier used to transmit the SIB1; and sending, by the first communications device, the MIB message to a second communications device; and transmitting, by the first communications device, the SIB1 to the second communications device based on the scheduling information, or based on the scheduling information and at least one of the operation mode of the carrier and the first information.

Because the first communications device configures the MIB message, and the MIB message may carry various different information used to transmit the SIB1, for example, any one or more of the scheduling information, the first information, and the operation mode of the carrier, the second communications device receives the SIB1 based on the MIB message. The first communications device may flexibly configure information used to transmit the SIB1. In addition, when configuring the MIB message, the first communications device may consider ensuring, through configuration or implicit indication, that resource locations for transmitting SIB1s of different cells in one period are different. This type of interference isolation mechanism can avoid mutual interference between transmission of SIB1s of different cells, so that transmission reliability of the SIB1 can be improved.

Optionally, the first information includes the status information used to transmit the SIB1, and the status information includes one of the following states: the SIB1 is transmitted only on an anchor carrier, and the SIB1 is transmitted only on a non-anchor carrier; or the status information includes one of the following states: the SIB1s transmitted only on an anchor carrier, and the SIB1 is transmitted on an anchor carrier and a non-anchor carrier; and the transmitting, by the first communications device, the SIB1 to the second communications device based on the scheduling information and the first information includes:
determining, by the first communications device based on the scheduling information and the status information, to transmit the SIB1 to the second communications device on an anchor carrier and/or a non-anchor carrier; and when the first communications device determines to transmit the SIB1 on the non-anchor carrier, determining, by the first communications device, the non-anchor carrier used to transmit the SIB1.

The first communications device adds, to the scheduling information and the status information, various different information used to transmit the SIB1. The status information can ensure that the first communications device can flexibly configure the carrier used to transmit the SIB1. It may be configured in some cells that the SIB1 is transmitted on an anchor carrier, and it may be configured in some other cells that the SIB1 is transmitted on a non-anchor carrier; or it may be configured in some cells that the SIB1 is transmitted on an anchor carrier, and it may be configured in some other cells that the SIB1 is transmitted on an anchor carrier and a non-anchor carrier, to ensure that carrier locations for transmitting SIB1 of different cells in one period are different. This type of interference isolation mechanism can avoid mutual interference between transmission of SIB1s of different cells, so that transmission reliability of the SIB1 can be improved.

Optionally, the first information further includes the time domain position information used to transmit the SIB1, and the time domain position information used to transmit the SIB1 includes one of the following locations: a subframe location, a radio frame location, a hyper frame location, a symbol location, and a slot location; and the determining, by the first communications device based on the scheduling information and the status information, to transmit the SIB1 to the second communications device on an anchor carrier and/or a non-anchor carrier includes: determining, by the first communications device based on the scheduling information, the status information, and the time domain position information, to transmit the SIB1 to the second communications device at a time domain position that is indicated by the time domain position information and that is on the anchor carrier and/or the non-anchor carrier used to transmit the SIB1.

Optionally, the first information includes the time domain position information used to transmit the SIB1, and the time domain position information includes one of the following locations: a subframe location, a radio frame location, a hyper frame location, a symbol location, and a slot location; and the transmitting, by the first communications device, the SIB1 to the second communications device based on the scheduling information and the first information includes: determining, by the first communications device, a carrier used to transmit the SIB1, where the carrier includes an anchor carrier and/or a non-anchor carrier used to transmit the SIB1; and transmitting, by the first communications device, the SIB1 to the second communications device based on the scheduling information at a time domain position that is indicated by the time domain position information and that is on the anchor carrier and/or the non-anchor carrier used to transmit the SIB1.

Optionally, the first information includes the frequency domain position information of the non-anchor carrier used to transmit the SIB1, and the frequency domain position information of the non-anchor carrier used to transmit the SIB1 includes at least one of the following parameters: a relative location of the non-anchor carrier used to transmit the SIB1 relative to an anchor carrier; and a frequency-domain offset between the non-anchor carrier used to transmit the SIB1 and the anchor carrier, where the frequency-domain offset is a frequency domain interval or the quantity of resource blocks; and the transmitting, by the first communications device, the SIB1 to the second communications device based on the scheduling information and the first information includes:

determining, by the first communications device, the non-anchor carrier used to transmit the SIB1;

determining, by the first communications device based on the frequency domain position information and the anchor carrier, a frequency domain position of the non-anchor carrier used to transmit the SIB1; and transmitting, by the first communications device based on the scheduling information, the SIB1 on the non-anchor carrier that corresponds to the frequency domain position and that is used to transmit the SIB1; or transmitting, by the first communications device based on the scheduling information, the SIB1 to the second communications device on the anchor carrier and the non-anchor carrier that corresponds to the frequency domain position and that is used to transmit the SIB1.

Optionally, the first information includes the transmission mode information of the SIB1 on the non-anchor carrier used to transmit the SIB1, and the transmission mode information includes a repetition number of the SIB1 on the non-anchor carrier used to transmit the SIB1; and the transmitting, by the first communications device, the SIB1 to the second communications device based on the scheduling information and the first information includes:

determining, by the first communications device, the non-anchor carrier used to transmit the SIB1; and transmitting, by the first communications device based on the repetition number and the scheduling information, the SIB1 to the second communications device on the non-anchor carrier used to transmit the SIB1; or transmitting, by the first communications device, the SIB1 to the second communications device on the anchor carrier based on the scheduling information, and transmitting, by the first communications device based on the scheduling information and the repetition number, the SIB1 to the second communications device on the non-anchor carrier used to transmit the SIB1.

Optionally, the first information includes the transmission mode information of the SIB1 on the non-anchor carrier used to transmit the SIB1, the transmission mode information includes resource indication information, and the resource indication information is used to indicate: when a repetition number of the SIB1 on the non-anchor carrier used to transmit the SIB1 is the same as a repetition number of the SIB1 on the anchor carrier, in a repetition period in which the SIB1 is transmitted once on the anchor carrier, whether transmission of the SIB1 on the non-anchor carrier used to transmit the SIB1 requires more transmission resources than transmission of the SIB1 on the anchor carrier, where the transmission resource is one of a subframe, a radio frame, a hyper frame, a symbol, or a slot; and the transmitting, by the first communications device, the SIB1 to the second communications device based on the scheduling information and the first information includes:

determining, by the first communications device, the non-anchor carrier used to transmit the SIB1;

determining, by the first communications device based on the resource indication information, a transmission resource that is used to transmit the SIB1 and that is on the non-anchor carrier used to transmit the SIB1; and transmitting, by the first communications device by using the transmission resource that is used to transmit the SIB1 and that is on the non-anchor carrier used to transmit the SIB1, the SIB1 to the second communications device based on the scheduling information; or transmitting, by the first communications device, the SIB1 to the second communications device on the anchor carrier based on the scheduling information and by using the transmission resource that is used to transmit the SIB1 and that is on the non-anchor carrier used to transmit the SIB1.

Optionally, some repetition number values in a repetition number set correspond to a first state, and the first state is that the SIB1 is transmitted only on an anchor carrier; other repetition number values in the repetition number set correspond to a second state, and the second state is that the SIB1 is transmitted only on a non-anchor carrier or the SIB1 is transmitted on an anchor carrier and a non-anchor carrier; and the scheduling information is used to determine a transport block size used to transmit the SIB1 and a repetition number; and the transmitting, by the first communications device, the SIB1 to the second communications device based on the scheduling information includes: determining, by the first communications device, that the repetition number corresponds to the first state or the second state; transmitting, by the first communications device based on the first state or the second state, the SIB1 to the second communications device on the anchor carrier and/or the non-anchor carrier; and when the first communications device determines to transmit the SIB1 on the non-anchor carrier, determining, by the first communications device, the non-anchor carrier used to transmit the SIB1.

Optionally, some repetition number values in a repetition number set correspond to a first state, and the first state is that the SIB1 is transmitted only on an anchor carrier; a second state corresponding to other repetition number values in the repetition number set is determined based on the status information used to transmit the SIB1, and the second state is that the SIB1 is transmitted only on a non-anchor carrier or the SIB1 is transmitted only on an anchor carrier; the scheduling information is used to determine a transport block size used to transmit the SIB1 and a repetition number; when the repetition number in the scheduling information corresponds to the first state, the MIB message includes the scheduling information of the SIB1 and the operation mode of the carrier; and when the repetition number in the scheduling information corresponds to the second state, the MIB message includes the scheduling information of the SIB1, the operation mode of the carrier, and the first information including the status information used to transmit the SIB1; and the transmitting, by the first communications device, the SIB1 to the second communications device based on the scheduling information and at least one of the operation mode of the carrier and the first information includes:

when the repetition number in the scheduling information belongs to the some repetition number values, transmitting the SIB1 to the second communications device on the anchor carrier based on the first state corresponding to the some repetition number values and the scheduling information; or when the repetition number in the scheduling information belongs to the other repetition number values, transmitting the SIB1 to the second communications device on the anchor carrier based on the scheduling information, or transmitting the SIB1 to the second communications device on the non-anchor carrier based on the scheduling information, the operation mode of the carrier, and the status information that is in the first information and that is used to transmit the SIB1; and the transmitting, by the first communications device, the SIB1 on the non-anchor carrier includes: determining, by the first communications device, the non-anchor carrier used to transmit the SIB1.

Optionally, the operation mode of the carrier includes operation mode information of the non-anchor carrier used to transmit the SIB1, or the operation mode of the carrier includes an operation mode of the anchor carrier and operation mode information of the non-anchor carrier used to transmit the SIB1; and the transmitting the SIB1 to the second communications device on the non-anchor carrier used to transmit the SIB1, based on the scheduling information, the operation mode of the carrier, and the status information that is in the first information and that is used to transmit the SIB1 includes:

determining, by the first communications device based on the operation mode of the carrier, an operation mode of the non-anchor carrier used to transmit the SIB1, where the determined operation mode is one of a standalone operation mode, a guard-band operation mode, and an in-band operation mode;

determining, by the first communications device based on the standalone operation mode, that a transmission resource of the SIB1 on the non-anchor carrier used to transmit the SIB1 is the same as a transmission resource of the SIB1 on the anchor carrier; and transmitting, by the first communications device based on the scheduling information and the transmission resource of the SIB1 on the non-anchor carrier used to transmit the SIB1, the SIB1 to the second communications device on the non-anchor carrier; or determining, by the first communications device based on the guard-band operation mode or the in-band operation mode, a transmission resource of the SIB1 on the non-anchor carrier used to transmit the SIB1; and transmitting, by the first communications device based on the scheduling information and the transmission resource of the SIB1 on the non-anchor carrier used to transmit the SIB1, the SIB1 to the second communications device on the non-anchor carrier used to transmit the SIB1.

Optionally, the operation mode of the carrier includes operation mode information of the non-anchor carrier used to transmit the SIB1, or the operation mode of the carrier includes an operation mode of the anchor carrier and operation mode information of the non-anchor carrier used to transmit the SIB1; and the transmitting, by the first communications device, the SIB1 to the second communications device based on the scheduling information and the operation mode of the carrier includes:

determining, by the first communications device based on the operation mode of the carrier, an operation mode of the non-anchor carrier used to transmit the SIB1, where the determined operation mode includes one of a standalone operation mode, a guard-band operation mode, and an in-band operation mode;

determining, by the first communications device based on the standalone operation mode, that a repetition number of the SIB1 on the non-anchor carrier is the same as a repetition number of the SIB1 on the anchor carrier; and transmitting, by the first communications device based on the scheduling information and the repetition number, the SIB1 on the non-anchor carrier used to transmit the SIB1; or transmitting, by the first communications device, the SIB1 to the second communications device on the anchor carrier based on the scheduling information, and transmitting, by the first communications device based on the repetition number and the scheduling information, the SIB1 to the second communications device on the non-anchor carrier used to transmit the SIB1; or determining, by the first communications device based on the standalone operation mode, that a transmission resource of the SIB1 on the non-anchor carrier used to transmit the SIB1 is the same as a transmission resource of the SIB1 on an anchor carrier; and transmitting, by the first communications device, the SIB1 on the non-anchor carrier based on the scheduling information and the transmission resource; or transmitting, by the first communications device, the SIB1 to the second communications device on the anchor carrier based on the scheduling information, and transmitting, by the first communications device, the SIB1 to the second communications device on the non-anchor carrier based on the transmission resource and the scheduling information; or determining, by the first communications device, a repetition number of the SIB1 on the non-anchor carrier based on the guard-band operation mode or the in-band operation mode; and transmitting, by the first communications device, the SIB1 to the second communications device on the non-anchor carrier based on the repetition number of the SIB1 on the non-anchor carrier and the scheduling information; or transmitting, by the first communications device, the SIB1 to the second communications device on the anchor carrier based on the scheduling information, and transmitting, by the first communications device, the SIB1 to the second communications device on the non-anchor carrier based on the repetition number of the SIB1 on the non-anchor carrier and the scheduling information; or determining, by the first communications device, a transmission resource of the SIB1 on the non-anchor carrier based on the guard-band operation mode or the in-band operation mode; and transmitting, by the first communications device, the SIB1 to the second communications device on the non-anchor carrier based on the transmission resource of the SIB1 on the non-anchor carrier and the scheduling information; or transmitting, by the first communications device, the SIB1 to the second communications device on the anchor carrier based on the scheduling information, and transmitting, by the first communications device, the SIB1 to the second communications device on the non-anchor carrier based on the transmission resource of the SIB1 on the non-anchor carrier and the scheduling information, where the transmitting, by the first communications device, the SIB1 on the non-anchor carrier includes: determining, by the first communications device, the non-anchor carrier used to transmit the SIB1.

Optionally, the first information further includes frequency domain position information of the non-anchor carrier used to transmit the SIB1, and the frequency domain position information includes at least one of the following parameters:

a relative location of the non-anchor carrier used to transmit the SIB1 relative to an anchor carrier; and a frequency-domain offset between the non-anchor carrier used to transmit the SIB1 and the anchor carrier, where the frequency-domain offset is a frequency domain interval or the quantity of resource blocks; and the determining, by the first communications device, the non-anchor carrier used to transmit the SIB1 includes:

determining, by the first communications device based on the anchor carrier and the frequency domain position information of the non-anchor carrier, a frequency domain position of the non-anchor carrier used to transmit the SIB1; and determining, by the first communications device, a non-anchor carrier corresponding to the frequency domain position.

According to a second aspect, this application provides a system message transmission method. The method includes:

receiving, by a second communications device, a master information block MIB message from a first communications device, where the MIB message includes scheduling information of a SIB1, or the MIB message includes the scheduling information and at least one of an operation mode of a carrier and first information, and the first information includes at least one of the following information: status information used to transmit the SIB1, time domain position information used to transmit the SIB1, frequency domain position information of a non-anchor carrier used to transmit the SIB1, and transmission mode information of the SIB1 on the non-anchor carrier used to transmit the SIB1; and receiving, by the second communications device, the SIB1 from the first communications device based on the scheduling information, or based on the scheduling information and at least one of the operation mode of the carrier and the first information.

Because the first communications device configures the MIB message, and the MIB message may carry various different information used to transmit the SIB1, for example, any one or more of the scheduling information, the first information, and the operation mode of the carrier, the second communications device receives the SIB1 based on the MIB message. The first communications device may flexibly configure information used to transmit the SIB1. In addition, when configuring the MIB message, the first communications device may consider ensuring, through configuration or implicit indication, that resource locations for transmitting SIB1 of different cells in one period are different. This type of interference isolation mechanism can avoid mutual interference between transmission of SIB1s of different cells, so that transmission reliability of the SIB1 can be improved.

Optionally, the first information includes the status information used to transmit the SIB1, where the status information includes one of the following states: the SIB1 is transmitted only on an anchor carrier, and the SIB1 is transmitted only on a non-anchor carrier; or the status information includes one of the following states: the SIB1 is transmitted only on an anchor carrier, and the SIB1 is transmitted on an anchor carrier and a non-anchor carrier; and the receiving, by the second communications device, the SIB1 from the first communications device based on the scheduling information and the first information includes:

determining, by the second communications device, to receive the SIB1 from the first communications device on the anchor carrier and/or the non-anchor carrier based on the scheduling information and the status information; and when the second communications device determines to receive the SIB1 from the first communications device on a non-anchor carrier, determining, by the second communications device, a non-anchor carrier used to receive the SIB1.

The first communications device adds, to the scheduling information and the status information, various different information used to transmit the SIB1. The status information can ensure that the first communications device can flexibly configure the carrier used to transmit the SIB1. It may be configured in some cells that the SIB1 is transmitted on an anchor carrier, and it may be configured in some other cells that the SIB1 is transmitted on a non-anchor carrier; or it may be configured in some cells that the SIB1 is transmitted on an anchor carrier, and it may be configured in some other cells that the SIB1 is transmitted on an anchor carrier and a non-anchor carrier, to ensure that carrier locations for transmitting SIB1 of different cells in one period are different. This type of interference isolation mechanism can avoid mutual interference between transmission of SIB1s of different cells, so that transmission reliability of the SIB1 can be improved.

Optionally, the first information further includes the time domain position information used to transmit the SIB1, and the time domain position information used to transmit the SIB1 includes one of the following locations: a subframe location, a radio frame location, a hyper frame location, a symbol location, and a slot location; and the determining, by the second communications device, to receive the SIB1 from the first communications device on the anchor carrier and/or the non-anchor carrier based on the scheduling information and the status information includes:

determining, by the second communications device based on the scheduling information, the status information, and the time domain position information, to receive the SIB1 from the first communications device at a time domain position that is indicated by the time domain position information and that is on the anchor carrier and/or the non-anchor carrier.

Optionally, the first information includes the time domain position information used to transmit the SIB1, and the time domain position information includes one of the following locations: a subframe location, a radio frame location, a hyper frame location, a symbol location, and a slot location; and the receiving, by the second communications device, the SIB1 from the first communications device based on the scheduling information and the first information includes:

determining, by the second communications device, a carrier used to receive the SIB1, where the carrier includes an anchor carrier and/or a non-anchor carrier used to transmit the SIB1; and receiving, by the second communications device, the SIB1 from the first communications device based on the scheduling information at a time domain position that is indicated by the time domain position information and that is on the anchor carrier and/or the non-anchor carrier used to transmit the SIB1.

Optionally, the first information includes frequency domain position information of the non-anchor carrier used to transmit the SIB1, and the frequency domain position information of the non-anchor carrier used to transmit the SIB1 includes at least one of the following parameters:

a relative location of the non-anchor carrier used to transmit the SIB1 relative to an anchor carrier; and a frequency-domain offset between the non-anchor carrier used to transmit the SIB1 and the anchor carrier, where the frequency-domain offset is a frequency domain interval or the quantity of resource blocks; and the receiving, by the second communications device, the SIB1 from the first communications device based on the scheduling information and the first information includes:

determining, by the second communications device, the non-anchor carrier used to receive the SIB1;

determining, by the second communications device based on the frequency domain position information and the anchor carrier, a frequency domain position of the non-anchor carrier used to transmit the SIB1; and receiving, by the second communications device based on the scheduling information, the SIB1 from the first communications device on the non-anchor carrier that corresponds to the frequency domain position and that is used to transmit the SIB1; or receiving, by the second communications device based on the scheduling information, the SIB1 from the first communications device on the anchor carrier and the non-anchor carrier that corresponds to the frequency domain position and that is used to transmit the SIB1.

Optionally, the first information includes the transmission mode information of the SIB1 on the non-anchor carrier used to transmit the SIB1, and the transmission mode information includes a repetition number of the SIB1 on the non-anchor carrier used to transmit the SIB1; and the receiving, by the second communications device, the SIB1 from the first communications device based on the scheduling information and the first information includes:

determining, by the second communications device, the non-anchor carrier used to transmit the SIB1; and receiving, by the second communications device based on the repetition number and the scheduling information, the SIB1 from the first communications device on the non-anchor carrier used to transmit the SIB1; or receiving, by the second communications device, the SIB1 from the first communications device on the anchor carrier based on the scheduling information, and receiving, by the second communications device based on the scheduling information and the repetition number, the SIB1 from the first communications device on the non-anchor carrier used to transmit the SIB1.

Optionally, the first information includes the transmission mode information of the SIB1 on the non-anchor carrier used to transmit the SIB1, the transmission mode information includes resource indication information, and the resource indication information is used to indicate: when a repetition number of the SIB1 on the non-anchor carrier used to transmit the SIB1 is the same as a repetition number of the SIB1 on the anchor carrier, in a repetition period in which the SIB1 is transmitted once on the anchor carrier, whether transmission of the SIB1 on the non-anchor carrier used to transmit the SIB1 requires more transmission resources than transmission of the SIB1 on the anchor carrier, where the transmission resource is one of a subframe, a radio frame, a hyper frame, a symbol, or a slot; and the receiving, by the second communications device, the SIB1 from the first communications device based on the scheduling information and the first information includes:

determining, by the second communications device, the non-anchor carrier used to transmit the SIB1;

determining, by the second communications device based on the resource indication information, a transmission resource that is used to transmit the SIB1 and that is on the non-anchor carrier used to transmit the SIB1; and receiving, by the second communications device by using the transmission resource that is used to transmit the SIB1 and that is on the non-anchor carrier used to transmit the SIB1, the SIB1 from the first communications device based on the scheduling information; or receiving, by the second communications device based on the scheduling information and by using the transmission resource that is used to transmit the SIB1 and that is on the non-anchor carrier used to transmit the SIB1, the SIB1 from the first communications device on the anchor carrier.

Optionally, some repetition number values in a repetition number set correspond to a first state, and the first state is that the SIB1 is transmitted only on an anchor carrier;

other repetition number values in the repetition number set correspond to a second state, and the second state is that the SIB1 is transmitted only on a non-anchor carrier or the SIB1 is transmitted on an anchor carrier and a non-anchor carrier;

the scheduling information is used to determine a transport block size used to transmit the SIB1 and a repetition number; and the receiving, by the second communications device, the SIB1 from the first communications device based on the scheduling information includes:

determining, by the second communications device, that the repetition number corresponds to the first state or the second state;

receiving, by the second communications device based on the first state or the second state, the SIB1 from the first communications device on the anchor carrier and/or the non-anchor carrier; and when the second communications device determines to receive the SIB1 from the first communications device on a non-anchor carrier, determining, by the second communications device, a non-anchor carrier used to receive the SIB1.

Optionally, some repetition number values in a repetition number set correspond to a first state, and the first state is that the SIB1 is transmitted only on an anchor carrier;

a second state corresponding to other repetition number values in the repetition number set is determined based on the status information used to transmit the SIB1, and the second state is that the SIB1 is transmitted only on a non-anchor carrier or the SIB1 is transmitted only on an anchor carrier;

the scheduling information is used to determine a transport block size used to transmit the SIB1 and a repetition number; and when the repetition number in the scheduling information corresponds to the first state, the MIB message includes the scheduling information of the SIB1 and the operation mode of the carrier;

when the repetition number in the scheduling information corresponds to the second state, the MIB message includes the scheduling information of the SIB1, the operation mode of the carrier, and the first information including the status information used to transmit the SIB1;

the receiving, by the second communications device, the SIB1 from the first communications device based on the scheduling information and at least one of the operation mode of the carrier and the first information includes:

when the repetition number in the scheduling information belongs to the some repetition number values, receiving the SIB1 from the first communications device on the anchor carrier based on the first state corresponding to the some repetition number values and the scheduling information; or when the repetition number in the scheduling information belongs to the other repetition number values, receiving the SIB1 from the first communications device on the anchor carrier based on the scheduling information, or receiving the SIB1 from the first communications device on the non-anchor carrier based on the scheduling information, the operation mode of the carrier, and the status information that is in the first information and that is used to transmit the SIB1; and the receiving, by the second communications device, the SIB1 from the first communications device on the non-anchor carrier includes: determining, by the second communications device, the non-anchor carrier used to receive the SIB1.

Optionally, the operation mode of the carrier includes operation mode information of the non-anchor carrier used to transmit the SIB1, or the operation mode of the carrier includes an operation mode of the anchor carrier and operation mode information of the non-anchor carrier used to transmit the SIB1; and the receiving the SIB1 from the first communications device on the non-anchor carrier used to transmit the SIB1, based on the scheduling information, the operation mode of the carrier, and the status information that is in the first information and that is used to transmit the SIB1 includes:

determining, by the second communications device based on the operation mode of the carrier, an operation mode of the non-anchor carrier used to transmit the SIB1, where the determined operation mode is one of a standalone operation mode, a guard-band operation mode, and an in-band operation mode;

determining, by the second communications device based on the standalone operation mode, that a transmission resource of the SIB1 on the non-anchor carrier used to transmit the SIB1 is the same as a transmission resource of the SIB1 on the anchor carrier; and receiving, by the second communications device, the SIB1 from the first communications device on the non-anchor carrier based on the transmission resource of the SIB1 on the non-anchor carrier and the scheduling information; or determining, by the second communications device based on the guard-band operation mode or the in-band operation mode, a transmission resource of the SIB1 on the non-anchor carrier used to transmit the SIB1; and receiving, by the second communications device based on the scheduling information and the transmission resource of the SIB1 on the non-anchor carrier used to transmit the SIB1, the SIB1 from the first communications device on the non-anchor carrier used to transmit the SIB1.

Optionally, the operation mode of the carrier includes operation mode information of the non-anchor carrier used to transmit the SIB1, or the operation mode of the carrier includes an operation mode of the anchor carrier and operation mode information of the non-anchor carrier used to transmit the SIB1; and the receiving, by the second communications device, the SIB1 from the first communications device based on the scheduling information and the operation mode of the carrier includes:

determining, by the second communications device based on the operation mode of the carrier, an operation mode of the non-anchor carrier used to transmit the SIB1, where the determined operation mode includes one of a standalone operation mode, a guard-band operation mode, and an in-band operation mode;

determining, by the second communications device based on the standalone operation mode, that a repetition number of the SIB1 on the non-anchor carrier is the same as a repetition number of a SIB1 on an anchor carrier; and receiving, by the second communications device based on the scheduling information and the repetition number, the SIB1 from the first communications device on the non-anchor carrier used to transmit the SIB1; or receiving, by the second communications device, the SIB1 from the first communications device on the anchor carrier, and receiving, by the second communications device based on the repetition number and the scheduling information, the SIB1 from the first communications device on the non-anchor carrier used to transmit the SIB1; or determining, by the second communications device based on the standalone operation mode, that a transmission resource of the SIB1 on the non-anchor carrier used to transmit the SIB1 is the same as a transmission resource of the SIB1 on an anchor carrier; and receiving, by the second communications device, the SIB1 from the first communications device on the non-anchor carrier based on the scheduling information and the transmission resource; or receiving, by the second communications device, the SIB1 from the first communications device on the anchor carrier, and receiving, by the second communications device, the SIB1 from the first communications device on the non-anchor carrier based on the transmission resource and the scheduling information; or determining, by the second communications device, a repetition number of the SIB1 on the non-anchor carrier based on the guard-band operation mode or the in-band operation mode; and receiving, by the second communications device, the SIB1 from the first communications device on the non-anchor carrier based on the repetition number of the SIB1 on the non-anchor carrier and the scheduling information; or receiving, by the second communications device, the SIB1 from the first communications device on the anchor carrier, and receiving, by the second communications device, the SIB1 from the first communications device on the non-anchor carrier based on the repetition number of the SIB1 on the non-anchor carrier and the scheduling information; or determining, by the second communications device, a transmission resource of the SIB1 on the non-anchor carrier based on the guard-band operation mode or the in-band operation mode; and receiving, by the second communications device, the SIB1 from the first communications device on the non-anchor carrier based on the transmission resource of the SIB1 on the non-anchor carrier and the scheduling information; or receiving, by the second communications device, the SIB1 from the first communications device on the anchor carrier, and receiving, by the second communications device, the SIB1 from the first communications device on the non-anchor carrier based on the transmission resource of the SIB1 on the non-anchor carrier and the scheduling information, where the receiving, by the second communications device, the SIB1 from the first communications device on the non-anchor carrier includes: determining, by the second communications device, the non-anchor carrier used to receive the SIB1.

Optionally, the first information further includes frequency domain position information of the non-anchor carrier used to transmit the SIB1, and the frequency domain position information includes at least one of the following parameters:

a relative location of the non-anchor carrier used to transmit the SIB1 relative to an anchor carrier; and a frequency-domain offset between the non-anchor carrier used to transmit the SIB1 and the anchor carrier, where the frequency-domain offset is a frequency domain interval or the quantity of resource blocks; and the determining, by the second communications device, the non-anchor carrier used to receive the SIB1 includes:

determining, by the second communications device based on the anchor carrier and the frequency domain position information of the non-anchor carrier, a frequency domain position of the non-anchor carrier used to transmit the SIB1; and determining, by the second communications device, a non-anchor carrier corresponding to the frequency domain position.

According to a third aspect, this application provides a system message transmission apparatus. The system message transmission apparatus is a first communications device, and the system message transmission apparatus includes:

a processing module, adapted to configure a master information block MIB message, where the MIB message includes scheduling information of a SIB1, or the MIB message includes the scheduling information and at least one of an operation mode of a carrier and first information; and the first information includes at least one of the following information: status information used to transmit the SIB1, time domain position information used to transmit the SIB1, frequency domain position information of a non-anchor carrier used to transmit the SIB1, and transmission mode information of the SIB1 on the non-anchor carrier used to transmit the SIB1; and a sending module, adapted to send the MIB message to a second communications device, where the processing module is further adapted to transmit, by using the sending module, the SIB1 to the second communications device based on the scheduling information, or based on the scheduling information and at least one of the operation mode of the carrier and the first information.

Based on a same inventive concept, a problem-resolving principle of the apparatus corresponds to the solution of the method design of the first aspect. Therefore, for implementation of the apparatus, refer to implementation of the method, and repeated parts are not described again.

According to a fourth aspect, this application provides a system message transmission apparatus. The system message transmission apparatus is a second communications device, and the system message transmission apparatus includes:

a receiving module, adapted to receive a master information block MIB message from a first communications device, where the MIB message includes scheduling information of a SIB1, or the MIB message includes the scheduling information and at least one of an operation mode of a carrier and first information, and the first information includes at least one of the following information: status information used to transmit the SIB1, time domain position information used to transmit the SIB1, frequency domain position information of a non-anchor carrier used to transmit the SIB1, and transmission mode information of the SIB1 on the non-anchor carrier used to transmit the SIB1; and a processing module, adapted to receive, by using the receiving module, the SIB1 from the first communications device based on the scheduling information, or based on the scheduling information and at least one of the operation mode of the carrier and the first information.

Based on a same inventive concept, a problem-resolving principle of the apparatus corresponds to the solution of the method design of the second aspect. Therefore, for implementation of the apparatus, refer to implementation of the method, and repeated parts are not described again.

According to a fifth aspect, this application provides a communications device. The communications device is a first communications device, and the communications device includes a memory, a processor, and a computer program that is stored in the memory and that can be executed by the processor. The processor executes the computer program to implement the steps of the system message transmission method according to the first aspect.

According to a sixth aspect, this application provides a communications device. The communications device is a second communications device, and the communications device includes a memory, a processor, and a computer program that is stored in the memory and that can be executed by the processor. The processor executes the computer program to implement the steps of the system message transmission method according to the second aspect.

According to a seventh aspect, this application provides a communications system. The communications system includes the communications device according to the fifth aspect and the communications device according to the sixth aspect.

According to an eighth aspect, this application provides a communications device. The communications device includes at least one processing element (or chip) adapted to perform the method according to the first aspect.

According to a ninth aspect, this application provides a communications device. The communications device includes at least one processing element (or chip) adapted to perform the method according to the second aspect.

According to a tenth aspect, this application provides a program. The program is adapted to perform the method according to the first aspect when being executed by a processor of a communications device.

According to an eleventh aspect, this application provides a program. The program is adapted to perform the method according to the second aspect when being executed by a processor of a communications device.

According to a twelfth aspect, this application provides a computer program product. The computer program product includes the program according to the tenth aspect.

According to a thirteenth aspect, this application provides a computer program product. The computer program product includes the program according to the eleventh aspect.

According to a fourteenth aspect, this application provides a computer-readable storage medium. When an instruction in the computer-readable storage medium is executed by a processor of a communications device, the communications device is enabled to perform the method according the first aspect.

According to a fifteenth aspect, this application provides a computer-readable storage medium. When an instruction in the computer-readable storage medium is executed by a processor of a communications device, the communications device is enabled to perform the method according the second aspect.

These aspects or other aspects in this application are clearer and more comprehensible in descriptions of the following (several) embodiments.

DESCRIPTION OF EMBODIMENTS

This application is mainly applied to an NB-IoT system, an LTE system, or an LTE advanced (LTE-A) system. This application may also be applied to another communications system, provided that an entity in the communications system can send information and another entity in the communications system can receive information.

Figure 1:
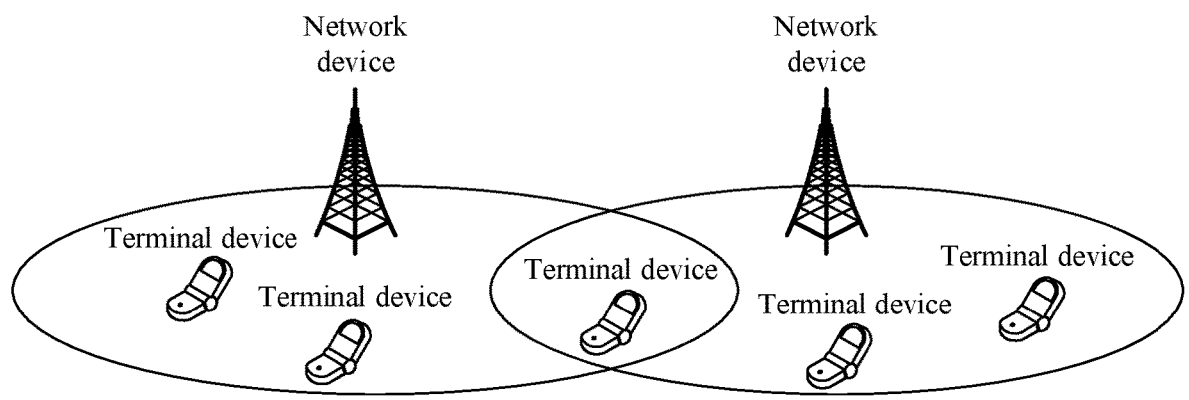
FIG. 1 is a schematic diagram of a communications system according to this application.

As shown in FIG. 1, an example of a first communications device is a network device, an example of a second communications device is a terminal device, and the first communications device and the second communications device form a communications system. In the communications system, the terminal device is located within coverage of the network device, and communicates with the network device, to implement the following technical solutions provided in embodiments of this application. It should be noted that the first communications device is not limited to the network device. Likewise, the second communications device is not limited to the terminal device.

In this application, the embodiments may be understood with reference to a network device and a terminal device. The network device and the terminal device may work on a licensed band or an unlicensed band.

The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a wireless local area network (WLAN), or may be a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, a vehicle-mounted device, a wearable device, or a next-generation communications system, for example, a terminal device in a 5th generation (5G) network, or a terminal device in a future evolved public land mobile network (PLMN).

As an example instead of a limitation, in this application, the terminal device may alternatively be a wearable device. A wearable device may also be referred to as a wearable intelligent device, and is a general term for wearable devices such as glasses, gloves, watches, clothes, and shoes that are developed by applying wearable technologies in intelligent designs of daily wear. A wearable device is a portable device that can be directly worn on a body or integrated into clothes or an accessory of a user. A wearable device is not merely a hardware device, but is used to implement a powerful function through software support, data interaction, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

In addition, the network device is also referred to as a radio access network (RAN) device, and is a device that connects a terminal device to a wireless network, and may be an evolved NodeB (eNB or eNodeB) in an LTE system, a relay station or an access point, a network device in a 5G network, or a network device in a future evolved PLMN, or a new radio NodeB (gNodeB) in an NR system. This is not limited herein.

In addition, in the embodiments of this application, the network device provides a service for a cell, and the terminal device communicates with the network device by using a transmission resource (for example, a frequency domain resource or a spectrum resource) used in the cell. The cell may be a cell corresponding to a network device (for example, a base station), and the cell may belong to a macro base station, or may belong to a base station corresponding to a small cell. The small cell herein may include: a metro cell, a micro cell, a pico cell, a femto cell, and the like. These small cells have characteristics of small coverage and low transmit power, and are applicable to providing a high-rate data transmission service.

In the embodiments of this application, an anchor carrier is a carrier on which the second communications device assumes that a common channel or a common signal is transmitted. A non-anchor carrier is a carrier on which the second communications device assumes that no common channel or no common signal is transmitted. The common channel is a cell-level common channel, and the common signal is a cell-level common signal. In an NB-IoT system, the anchor carrier is a carrier on which the second communications device assumes that NPSS/NSSS/NPBCH/SIB-NB transmission is performed; and the non-anchor carrier is a carrier on which the second communications device assumes that no NPSS/NSSS/NPBCH/SIB-NB transmission is performed. Alternatively, in an NB-IoT system, the anchor carrier is a carrier on which the second communications device assumes that NPSS/NSSS/NPBCH transmission is performed; and the non-anchor carrier is a carrier on which the second communications device assumes that no NPSS/NSSS/NPBCH transmission is performed.

Figure 2:
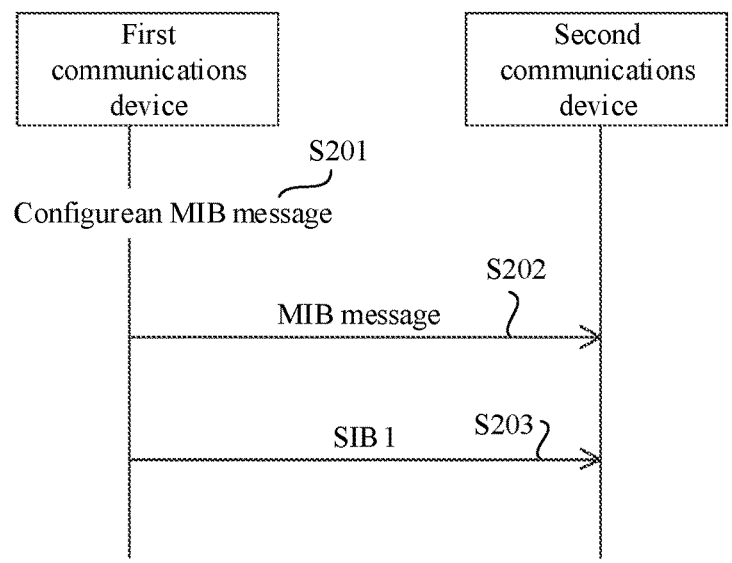
FIG. 2 is a signaling diagram of a system message transmission method according to an embodiment of this application.

FIG. 2 is a signaling diagram of a system message transmission method according to an embodiment of this application. As shown in FIG. 2, the method in this embodiment includes the following steps.

S201: A first communications device configures a master information block (MIB) message.

The MIB message may carry different information, and there are the following types:

Type 1: The MIB message includes scheduling information of a SIB1.

Type 2: The MIB message includes scheduling information of a SIB1 and an operation mode of a carrier.

Type 3: The MIB message includes scheduling information of a SIB1 and first information.

Type 4: The MIB message includes scheduling information of a SIB1, first information, and an operation mode of a carrier.

Further, the first information may include at least one of the following information: status information used to transmit the SIB1, time domain position information used to transmit the SIB1, frequency domain position information of a non-anchor carrier used to transmit the SIB1, and transmission mode information of the SIB1 on the non-anchor carrier used to transmit the SIB1.

In this step, the scheduling information is used to indicate a repetition number and a transport block size that is used to transmit the SIB1. A specific indication manner may be separate indication, and may indicate a value of the transport block size and a value of the repetition number, or may indicate an index of a transport block size which can be chosen and an index of the repetition number. A specific indication manner may be joint indication, and indicates an index of a combination of the transport block size which can be choosed and the repetition number. The scheduling information may further include other information used to schedule transmission of the SIB1, for example, a modulation and coding scheme (MCS) of the SIB1.

In this step, the operation mode of the carrier includes an operation mode of an anchor carrier or operation mode information of a non-anchor carrier used to transmit the SIB, or the operation mode of the carrier includes an operation mode of an anchor carrier and operation mode information of a non-anchor carrier used to transmit SIB. The operation mode of the anchor carrier includes one of a standalone operation mode, a guard-band operation mode, and an in-band operation mode. A operation mode of the non-anchor carrier used to transmit the SIB1 includes one of a standalone operation mode, a guard-band operation mode, and an in-band operation mode. For the anchor carrier and the non-anchor carrier, the in-band operation mode means that a system to which this application is applied is deployed in a transmission band of another communications system. Based on whether physical cell identifiers (PCI) of the two systems are the same, the in-band operation mode may be classified into in-band same PCI and in-band different PCI. For example, if an NB-IoT system is deployed in a guard band of an LTE system, the in-band operation mode may be classified into in-band same PCI and in-band different PCI depending on whether a PCI of the NB-IoT system is the same as that of the LTE system.

The operation mode of the non-anchor carrier may be determined based on the operation mode of the carrier in the following manners:

Manner 1: The operation mode of the carrier includes the operation mode of the anchor carrier. It may be predefined by using a protocol that the operation mode of the non-anchor carrier is the same as the operation mode of the anchor carrier. Therefore, the operation mode of the non-anchor carrier may be determined based on the operation mode of the anchor carrier.

Manner 2: The operation mode of the carrier includes the operation mode information of the non-anchor carrier used to transmit the SIB. The operation mode information of the non-anchor carrier used to transmit the SIB is used to indicate the operation mode of the non-anchor carrier used to transmit the SIB. Therefore, the operation mode of the non-anchor carrier may be directly determined based on the operation mode information of the non-anchor carrier used to transmit the SIB.

Manner 3: The operation mode of the carrier includes the operation mode of the anchor carrier and the operation mode information of the non-anchor carrier used to transmit the SIB. The operation mode information of the non-anchor carrier used to transmit the SIB is used to indicate whether the operation mode of the non-anchor carrier used to transmit the SIB is the same as the operation mode of the anchor carrier. Therefore, the operation mode of the non-anchor carrier may be determined based on the operation mode of the anchor carrier and the operation mode information of the non-anchor carrier used to transmit the SIB.

It is assumed that the system to which this application is applied is denoted as a first communications system. For the LTE system, a CRS is transmitted in a transmission band, and no CRS is transmitted in a guard band. When an operation mode of an anchor carrier of the first communications system is guard-band operation (that is, the anchor carrier is deployed in the guard band of LTE) and an operation mode of a non-anchor carrier of the first communications system is guard-band operation (that is, the anchor carrier is deployed in the guard band of LTE), the quantity of LTE CRS ports needs to be indicated in the MIB message, and a new field may be added to the MIB message for indication. A spare bit in a field corresponding to guard-band operation may be used for indication. For in-band deployment, in-band same PCI is not distinguished from in-band different PCI.

Using NB-IoT as an example, MasterInformationBlock-NB is a MIB message, operationModeInfo is a field corresponding to the operation mode, guardband indicates guard-band deployment, standalone indicates independent deployment, and inband-SamePCI indicates in-band deployment. The PCI of the NB-IoT system is the same as the PCI of the LTE system. For inband-DifferentPCI, the PCI of the NB-IoT system is different from the PCI of the LTE system. When an operation mode in the MIB message is guard-band deployment (guardband), there are three spare bits in a field corresponding to the guard-band deployment. When an NB-IoT anchor carrier is in a guard-band operation mode, and the non-anchor carrier used to transmit the SIB1 is in an in-band operation mode (including one of inband-SamePCI and inband-DifferentPCI), one of the spare bits may be used to indicate the quantity of LTE CRS ports. In addition, the field indicating the quantity of LTE CRS ports exists only when the anchor carrier is in the guard-band operation mode and the non-anchor carrier is in the in-band operation mode, where

```
MasterInformationBlock-NB ::= SEQUENCE {
...
   operationModeInfo-r13        CHOICE {
      inband-SamePCI-r13            Inband-SamePCI-NB-r13,
      inband-DifferentPCI-r13       Inband-DifferentPCI-NB-r13,
      guardband-r13                 Guardband-NB-r13,
      standalone-r13                Standalone-NB-r13
   },
   spare                        BIT STRING (SIZE (11))
}
...
Guardband-NB-r13 ::=          SEQUENCE {
   rasterOffset-r13              ChannelRasterOffset-NB-r13,
   spare                         BIT STRING (SIZE (3))
}
```

For this step, it should be noted that, similar to the prior art, the MIB message may further carry other information, to notify a second communications device of basic information about the communications system, to ensure operation of a subsequent communication process.

S202: The first communications device sends the MIB message to the second communications device.

Correspondingly, the second communications device receives the MIB message from the first communications device.

S203: The first communications device transmits the SIB1 to the second communications device.

Specifically, the first communications device transmits the SIB1 to the second communications device based on the scheduling information, or based on the scheduling information and at least one of the operation mode of the carrier and the first information.

For this step, it may be understood that the first communications device transmits the SIB1 to the second communications device based on the scheduling information and the first information; the first communications device transmits the SIB1 to the second communications device based on the scheduling information; the first communications device transmits the SIB1 to the second communications device based on the scheduling information and the operation mode of the carrier; the first communications device transmits the SIB1 to the second communications device based on the scheduling information, the first information, and the operation mode of the carrier; and so on. For detailed descriptions, refer to subsequent embodiments. Details are not described herein.

Correspondingly, the second communications device receives the SIB1 from the first communications device based on the scheduling information, or based on the scheduling information and at least one of the operation mode of the carrier and the first information.

In this embodiment, because the first communications device configures the MIB message, and the MIB message may carry various different information used to transmit the SIB1, for example, any one or more of the scheduling information, the first information, and the operation mode of the carrier, the second communications device receives the SIB1 based on the MIB message. The first communications device may flexibly configure information used to transmit the SIB1. In addition, when configuring the MIB message, the first communications device may consider ensuring, through configuration or implicit indication, that resource locations for transmitting SIB1 of different cells in one period are different. This type of interference isolation mechanism can avoid mutual interference between transmission of SIB1s of different cells, so that transmission reliability of the SIB1 can be improved.

The foregoing embodiment is described in detail below by distinguishing between information included in the MIB message and/or information included in the first information.

In an embodiment, the first information includes the status information used to transmit the SIB1.

The status information includes one of the following states: the SIB1 is transmitted only on an anchor carrier, and the SIB1 is transmitted only on a non-anchor carrier; or the status information includes one of the following states: the SIB1 is transmitted only on an anchor carrier, and the SIB1 is transmitted on an anchor carrier and a non-anchor carrier.

In this embodiment, that the first communications device transmits the SIB1 to the second communications device based on the scheduling information, or based on the scheduling information and at least one of the operation mode of the carrier and the first information may be specifically: transmitting, by the first communications device, the SIB1 to the second communications device based on the scheduling information and the first information; and further specifically includes: determining, by the first communications device based on the scheduling information and the status information, to transmit the SIB1 to the second communications device on the anchor carrier and/or the non-anchor carrier; and when the first communications device determines to transmit the SIB1 on the non-anchor carrier, determining, by the first communications device, the non-anchor carrier used to transmit the SIB1.

It should be noted that, when a frequency domain position of the non-anchor carrier used for the SIB1 transmission is predefined, that the first communications device determines the non-anchor carrier used to transmit the SIB1 means that the first communications device determines that a non-anchor carrier corresponding to the predefined frequency domain position is the non-anchor carrier used to transmit the SIB1.

It may be understood that if a state included in the status information is that the SIB1 is transmitted only on the anchor carrier, the first communications device determines, based on the scheduling information and the status information, to transmit the SIB1 to the second communications device on the anchor carrier; or if a state included in the status information is that the SIB1 is transmitted only on the non-anchor carrier, the first communications device determines, based on the scheduling information and the status information, to transmit the SIB1 to the second communications device on the non-anchor carrier; or if a state included in the status information is that the SIB1 is transmitted on the anchor carrier and the non-anchor carrier, the first communications device determines, based on the scheduling information and the status information, to transmit the SIB1 to the second communications device on the anchor carrier and the non-anchor carrier.

During specific implementation, the status information may be indicated by using a field whose bit width is one bit. A value set of the field is that the SIB1 is transmitted only on the anchor carrier and the SIB1 is transmitted only on the non-anchor carrier, or a value set of the field is that the SIB1 is transmitted only on the anchor carrier and the SIB1 is transmitted on the anchor carrier and the non-anchor carrier. Alternatively, a value of the field is a Boolean value, a digit, a character, a character string, or the like. Different Boolean values, and different values of the digit, the character, the character string, or the like represent different meanings. In an example, a value of the field being "0" indicates that the SIB1 is transmitted only on the anchor carrier, and a value of the field being "1" indicates that the SIB1 is transmitted only on the non-anchor carrier. In an example, a value of the field being "0" indicates that the SIB1 is transmitted only on the anchor carrier, and a value of the field being "1" indicates that the SIB1 is transmitted on the anchor carrier and the non-anchor carrier. In another example, a value of the field being "anchor" indicates that the SIB1 is transmitted only on the anchor carrier, and a value of the field being "non-anchor" indicates that the SIB1 is transmitted only on the non-anchor carrier.

If the status information indicates that the SIB1 is transmitted only on the anchor carrier, a time domain resource location for transmitting the SIB1 on the anchor carrier may be predefined by using a protocol. The scheduling information is used to indicate a transport block size used to transmit the SIB1 and a repetition number. The first communications device transmits the SIB1 to the second communications device on the anchor carrier based on the transport block size and the repetition number that are indicated by the scheduling information.

If the status information indicates that the SIB1 is transmitted only on the non-anchor carrier, a time domain resource location for transmitting the SIB1 on the non-anchor carrier may be predefined by using a protocol, and the frequency domain position of the non-anchor carrier used to transmit the SIB1 may be predefined by using a protocol. The scheduling information is used to indicate a transport block size used to transmit the SIB1 and a repetition number. The first communications device transmits the SIB1 to the second communications device on the non-anchor carrier based on the transport block size indicated by the scheduling information. It should be noted that, when the SIB1 is transmitted on the non-anchor carrier, a repetition number of the SIB1 may be the same as the repetition number indicated by the scheduling information, or when the SIB1 is transmitted on the non-anchor carrier, a repetition number of the SIB1 may be different from the repetition number indicated by the scheduling information. For example, when the SIB1 is transmitted on the non-anchor carrier, the repetition number of the SIB1 may be greater than the repetition number indicated by the scheduling information. When the repetition number of the SIB1 on the non-anchor carrier is the same as the repetition number of the SIB1 on the anchor carrier, in a repetition period in which the SIB1 is transmitted on the anchor carrier once, transmission of the SIB1 on the non-anchor carrier may use the same quantity of transmission resources as transmission of the SIB1 on the anchor carrier, or transmission of the SIB1 on the non-anchor carrier may use more transmission resources than transmission of the SIB1 on the anchor carrier. The repetition number of transmission of the SIB1 on the non-anchor carrier and the transmission resource for transmitting the SIB1 on the non-anchor carrier may be predefined by using a protocol.

If the status information indicates that the SIB1 is transmitted on the anchor carrier and the non-anchor carrier, the time domain resource location for transmitting the SIB1 on the anchor carrier and the time domain resource location for transmitting the SIB1 on the non-anchor carrier may be predefined by using a protocol. The time domain resource location for transmitting the SIB1 on the anchor carrier and the time domain resource location for transmitting the SIB1 on the non-anchor carrier may be the same or may be different. The frequency domain position of the non-anchor carrier used to transmit the SIB1 may be predefined by using a protocol. The scheduling information is used to indicate a transport block size used to transmit the SIB1 and a repetition number. The first communications device transmits the SIB1 to the second communications device on the non-anchor carrier based on the transport block size and the repetition number that are indicated by the scheduling information. It should be noted that, when the SIB1 is transmitted on the non-anchor carrier, a repetition number of the SIB1 may be the same as the repetition number indicated by the scheduling information, or when the SIB1 is transmitted on the non-anchor carrier, a repetition number of the SIB1 may be different from the repetition number indicated by the scheduling information. For example, when the SIB1 is transmitted on the non-anchor carrier, the repetition number of the SIB1 may be greater than the repetition number indicated by the scheduling information. When the repetition number of the SIB1 on the non-anchor carrier is the same as the repetition number of the SIB1 on the anchor carrier, in a repetition period in which the SIB1 is transmitted on the anchor carrier once, transmission of the SIB1 on the non-anchor carrier may use the same quantity of transmission resources as transmission of the SIB1 on the anchor carrier, or transmission of the SIB1 on the non-anchor carrier may use more transmission resources than transmission of the SIB1 on the anchor carrier. The repetition number of transmission of the SIB1 on the non-anchor carrier and the transmission resource for transmitting the SIB1 on the non-anchor carrier may be predefined by using a protocol.

It should be noted that, in this embodiment, similar to the prior art, the first communications device may further refer to other information when determining a transmission mode of the SIB1 based on the scheduling information and the status information. For example, in NB-IoT, the operation mode information indicated in the MIB message may further include information such as the quantity of CRS ports. During resource mapping, a resource location occupied by a CRS needs to be considered for the SIB1. During resource mapping, a resource occupied by the CRS is avoided, and the resource occupied by the CRS is related to the quantity of CRS ports. Therefore, when determining the transmission mode of the SIB1 based on the scheduling information and the status information, the first communications device may further refer to the operation mode information indicated in the MIB message.

Correspondingly, that the second communications device receives the SIB1 from the first communications device based on the scheduling information, or based on the scheduling information and at least one of the operation mode of the carrier and the first information may be specifically: receiving, by the second communications device, the SIB1 from the first communications device based on the scheduling information and the first information; and further includes: determining, by the second communications device, to receive the SIB1 from the first communications device on the anchor carrier and/or the non-anchor carrier based on the scheduling information and the status information; and when the second communications device determines to receive the SIB1 from the first communications device on the non-anchor carrier, determining, by the second communications device, a non-anchor carrier used to receive the SIB1. For specific details, refer to related descriptions of the first communications device. Details are not described herein again.

In this embodiment, the first communications device adds, to the scheduling information and the status information, various different information used to transmit the SIB1. The status information can ensure that the first communications device can flexibly configure the carrier used to transmit the SIB1. It may be configured in some cells that the SIB1 is transmitted on an anchor carrier, and it may be configured in some other cells that the SIB1 is transmitted on a non-anchor carrier; or it may be configured in some cells that the SIB1 is transmitted on an anchor carrier, and it may be configured in some other cells that the SIB1 is transmitted on an anchor carrier and a non-anchor carrier, to ensure that carrier locations for transmitting SIB1 of different cells in one period are different. This type of interference isolation mechanism can avoid mutual interference between transmission of SIB1s of different cells, so that transmission reliability of the SIB1 can be improved.

Based on this embodiment, the first information further includes time domain position information used to transmit the SIB1. The time domain position information used to transmit the SIB1 includes one of the following locations: a subframe location, a radio frame location, a hyper frame location, a symbol location, a slot location, and the like, which are information used to indicate a time domain position. The time domain position information used to transmit the SIB1 may alternatively be a time unit.

A symbol corresponding to the symbol location includes but is not limited to an orthogonal frequency division multiplexing (OFDM) symbol, a sparse code multiple access (SCMA) symbol, a filtered orthogonal frequency division multiplexing (F-OFDM) symbol, and a non-orthogonal multiple access (NOMA) symbol. The symbol may be specifically determined based on an actual situation, and details are not described herein.

In this case, the determining, by the first communications device based on the scheduling information and the status information, to transmit the SIB1 to the second communications device on the anchor carrier and/or the non-anchor carrier may include: determining, by the first communications device based on the scheduling information, the status information, and the time domain position information, to transmit the SIB1 to the second communications device at a time domain position that is indicated by the time domain position information and that is on the anchor carrier and/or the non-anchor carrier used to transmit the SIB1. The time domain position indicated by the time domain position information may be located on the anchor carrier, or may be located on the non-anchor carrier.

Correspondingly, the determining, by the second communications device, to receive the SIB1 from the first communications device on the anchor carrier and/or the non-anchor carrier based on the scheduling information and the status information includes: determining, by the second communications device based on the scheduling information, the status information, and the time domain position information, to receive the SIB1 from the first communications device at a time domain position that is indicated by the time domain position information and that is on the anchor carrier and/or the non-anchor carrier used to transmit the SIB1.

It should be noted that, in this embodiment, similar to the prior art, the first communications device may further refer to other information when determining a transmission mode of the SIB1 based on the scheduling information and the status information. For example, in NB-IoT, the operation mode information indicated in the MIB message may further include information such as the quantity of CRS ports. During resource mapping, a resource location occupied by a CRS needs to be considered for the SIB1. During resource mapping, a resource occupied by the CRS is avoided, and the resource occupied by the CRS is related to the quantity of CRS ports. Therefore, when determining the transmission mode of the SIB1 based on the scheduling information and the status information, the first communications device may further refer to the operation mode information indicated in the MIB message.

In this embodiment, the first communications device adds, to the scheduling information, the status information, and the time domain position information, various different information used to transmit the SIB1. The status information can ensure that the first communications device can flexibly configure the carrier used to transmit the SIB1. It may be configured in some cells that the SIB1 is transmitted on an anchor carrier, and it may be configured in some other cells that the SIB1 is transmitted on a non-anchor carrier; or it may be configured in some cells that the SIB1 is transmitted on an anchor carrier, and it may be configured in some other cells that the SIB1 is transmitted on an anchor carrier and a non-anchor carrier, and the time domain position information can ensure that time domain positions for transmitting SIB1s of different cells are different, to ensure that time domain positions and/or carrier locations for transmitting SIB1 of different cells in one period are different. This type of interference isolation mechanism can avoid mutual interference between transmission of SIB1s of different cells, so that transmission reliability of the SIB1 can be improved.

In another embodiment, the first information includes the time domain position information used to transmit the SIB1. It should be understood that, unless otherwise specified, a same noun in this application has a same meaning. For example, "time domain position information" herein and "time domain position information" in the foregoing embodiment have same content and a same meaning.

In this embodiment, that the first communications device transmits the SIB to the second communications device based on the scheduling information, or based on the scheduling information and at least one of the operation mode of the carrier and the first information may be specifically: transmitting, by the first communications device, the SIB1 to the second communications device based on the scheduling information and the first information; and may further specifically include: determining, by the first communications device, a carrier used to transmit the SIB1, where the carrier includes an anchor carrier and/or a non-anchor carrier used to transmit the SIB1; and transmitting, by the first communications device, the SIB1 to the second communications device based on the scheduling information at a time domain position that is indicated by the time domain position information and that is on the anchor carrier and/or the non-anchor carrier used to transmit the SIB1. The non-anchor carrier used to transmit the SIB1 may be preset, for example, specified in a communications standard and/or a communications protocol. The time domain position indicated by the time domain position information may be located on the anchor carrier, or may be located on the non-anchor carrier. It should be noted that, when a frequency domain position of the non-anchor carrier used to transmit the SIB1 is predefined, that the first communications device determines the non-anchor carrier used to transmit the SIB1 means that the first communications device determines that a non-anchor carrier corresponding to the predefined frequency domain position is the non-anchor carrier used to transmit the SIB1.

For example, the first communications device transmits the SIB1 to the second communications device on the anchor carrier and at the time domain position that is indicated by the time domain position information; or the first communications device transmits the SIB1 to the second communications device on the non-anchor carrier used to transmit the SIB1 and a time domain position that is indicated by the time domain position information; or the first communications device transmits the SIB1 to the second communications device on the anchor carrier and the non-anchor carrier that is used to transmit the SIB1 and a time domain position that is indicated by the time domain position information.

Correspondingly, that the second communications device receives the SIB1 from the first communications device based on the scheduling information, or based on the scheduling information and at least one of the operation mode of the carrier and the first information may be specifically: receiving, by the second communications device, the SIB1 from the first communications device based on the scheduling information and the first information; and further includes: determining, by the second communications device, a carrier used to receive the SIB1, where the carrier includes an anchor carrier and/or a non-anchor carrier used to transmit the SIB1; and receiving, by the second communications device based on the scheduling information, the SIB1 from the first communications device on the time domain position that is indicated by the time domain position information and that is on the anchor carrier and/or the non-anchor carrier used to transmit the SIB1.

It may be predefined by using a protocol that the SIB1 is transmitted only on an anchor carrier or only on a non-anchor carrier, or the SIB1 is transmitted on an anchor carrier and a non-anchor carrier. The frequency domain position of the non-anchor carrier used to transmit the SIB1 may be predefined by using a protocol. The scheduling information is used to indicate a transport block size used to transmit the SIB1 and a repetition number. The first communications device transmits the SIB1 to the second communications device on the non-anchor carrier based on the transport block size and the repetition number that are indicated by the scheduling information. It should be noted that, when the SIB1 is transmitted on the non-anchor carrier, a repetition number of the SIB1 may be the same as the repetition number indicated by the scheduling information, or when the SIB1 is transmitted on the non-anchor carrier, a repetition number of the SIB1 may be different from the repetition number indicated by the scheduling information. For example, when the SIB1 is transmitted on the non-anchor carrier, the repetition number of the SIB1 may be greater than the repetition number indicated by the scheduling information. When the repetition number of the SIB1 on the non-anchor carrier is the same as the repetition number of the SIB1 on the anchor carrier, in a repetition period in which the SIB1 is transmitted on the anchor carrier once, transmission of the SIB1 on the non-anchor carrier may use the same quantity of transmission resources as transmission of the SIB1 on the anchor carrier, or transmission of the SIB1 on the non-anchor carrier may use more transmission resources than transmission of the SIB1 on the anchor carrier. The repetition number of transmission of the SIB1 on the non-anchor carrier and the transmission resource for transmitting the SIB1 on the non-anchor carrier may be predefined by using a protocol.

It should be noted that, in this embodiment, similar to the prior art, the first communications device may further refer to other information when determining a transmission mode of the SIB1 based on the scheduling information and the status information. For example, in NB-IoT, the operation mode information indicated in the MIB message may further include information such as the quantity of CRS ports. During resource mapping, a resource location occupied by a CRS needs to be considered for the SIB1. During resource mapping, a resource occupied by the CRS is avoided, and the resource occupied by the CRS is related to the quantity of CRS ports. Therefore, when determining the transmission mode of the SIB1 based on the scheduling information and the status information, the first communications device may further refer to the operation mode information indicated in the MIB message.

In this embodiment, the first communications device adds, to the scheduling information and the time domain position information, various different information used to transmit the SIB1. The time domain position information can ensure that time domain positions for transmitting SIB1s of different cells are different, to ensure that time domain positions for transmitting SIB1s of different cells in one period are different. This type of interference isolation mechanism can avoid mutual interference between transmission of SIB1s of different cells, so that transmission reliability of the SIB1 can be improved.

In still another embodiment, the first information includes frequency domain position information of the non-anchor carrier used to transmit the SIB1.

The frequency domain position information of the non-anchor carrier used to transmit the SIB1 includes at least one of the following parameters: a relative location of the non-anchor carrier used to transmit the SIB1 relative to an anchor carrier; and a frequency-domain offset between the non-anchor carrier used to transmit the SIB1 and the anchor carrier. The frequency domain offset may be a frequency domain interval or the quantity of resource blocks. The resource block is a frequency domain resource unit, and may be the quantity of N consecutive subcarriers, where N may be predefined by using a protocol. In LTE, the resource block may be abbreviated as RB. That is, the frequency-domain offset between the non-anchor carrier used to transmit the SIB1 and the anchor carrier may be a frequency domain interval between the non-anchor carrier used to transmit the SIB1 and the anchor carrier, or the quantity of resource blocks of the non-anchor carrier used to transmit the SIB1 relative to the anchor carrier. For details, refer to FIG. 3.

Figure 3:
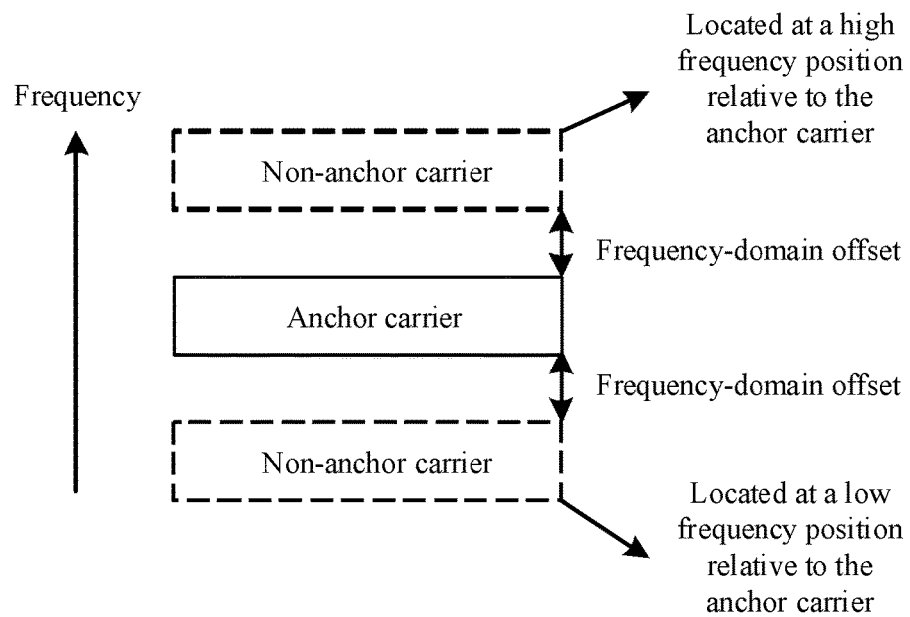
FIG. 3 is a legend of frequency domain position information of a non-anchor carrier used to transmit a SIB1 according to this application.

A relative location of the non-anchor carrier used to transmit the SIB1 relative to an anchor carrier may include at least the following states: a high-frequency location, on the anchor carrier, of the non-anchor carrier used to transmit the SIB1 and a low-frequency location, on the anchor carrier, of the non-anchor carrier used to transmit the SIB1, as shown in FIG. 3.

In this embodiment, that the first communications device transmits the SIB1 to the second communications device based on the scheduling information, or based on the scheduling information and at least one of the operation mode of the carrier and the first information may be specifically: transmitting, by the first communications device, the SIB1 to the second communications device based on the scheduling information and the first information; and further specifically includes: determining, by the first communications device, the non-anchor carrier used to transmit the SIB1; determining, by the first communications device based on the frequency domain position information and the anchor carrier, the frequency domain position of the non-anchor carrier used to transmit the SIB1; and transmitting, by the first communications device based on the scheduling information, the SIB1 on the non-anchor carrier that corresponds to the frequency domain position and that is used to transmit the SIB1. In other words, only the non-anchor carrier is used to transmit the SIB1.

Alternatively, that the first communications device transmits the SIB1 to the second communications device based on the scheduling information, or based on the scheduling information and at least one of the operation mode of the carrier and the first information may be specifically: transmitting, by the first communications device, the SIB1 to the second communications device based on the scheduling information and the first information; and further specifically includes: determining, by the first communications device, the non-anchor carrier used to transmit the SIB1; determining, by the first communications device based on the frequency domain position information and the anchor carrier, the frequency domain position of the non-anchor carrier used to transmit the SIB1; and transmitting, by the first communications device, the SIB1 to the second communications device on the anchor carrier and the non-anchor carrier that corresponds to the frequency domain position and that is used to transmit the SIB1. In other words, the SIB1 is transmitted on both the anchor carrier and the non-anchor carrier.

Correspondingly, that the second communications device receives the SIB1 from the first communications device based on the scheduling information, or based on the scheduling information and at least one of the operation mode of the carrier and the first information may be specifically: receiving, by the second communications device, the SIB1 from the first communications device based on the scheduling information and the first information; and further includes: determining, by the second communications device, a non-anchor carrier used to receive the SIB1; determining, by the second communications device based on the frequency domain position information and the anchor carrier, a frequency domain position of the non-anchor carrier used to transmit the SIB1; and receiving, by the second communications device based on the scheduling information, the SIB1 from the first communications device on the non-anchor carrier that corresponds to the frequency domain position and that is used to transmit the SIB1; or receiving, by the second communications device based on the scheduling information, the SIB1 from the first communications device on the anchor carrier and the non-anchor carrier that corresponds to the frequency domain position and that is used to transmit the SIB1.

It may be predefined by using a protocol that the SIB is transmitted only on a non-anchor, or the SIB1 is transmitted on an anchor carrier and a non-anchor carrier. A time domain resource location for transmitting the SIB1 on the anchor carrier and a time domain resource location for transmitting the SIB1 on the non-anchor carrier may be predefined by using a protocol. The time domain resource location for transmitting the SIB1 on the anchor carrier and the time domain resource location for transmitting the SIB1 on the non-anchor carrier may be the same or may be different. The scheduling information is used to indicate a transport block size used to transmit the SIB1 and a repetition number. The first communications device transmits the SIB1 to the second communications device on the non-anchor carrier based on the transport block size and the repetition number that are indicated by the scheduling information. It should be noted that, when the SIB1 is transmitted on the non-anchor carrier, a repetition number of the SIB1 may be the same as the repetition number indicated by the scheduling information, or when the SIB1 is transmitted on the non-anchor carrier, a repetition number of the SIB1 may be different from the repetition number indicated by the scheduling information. For example, when the SIB1 is transmitted on the non-anchor carrier, the repetition number of the SIB1 may be greater than the repetition number indicated by the scheduling information. When the repetition number of the SIB1 on the non-anchor carrier is the same as the repetition number of the SIB1 on the anchor carrier, in a repetition period in which the SIB1 is transmitted on the anchor carrier once, transmission of the SIB1 on the non-anchor carrier may use the same quantity of transmission resources as transmission of the SIB1 on the anchor carrier, or transmission of the SIB1 on the non-anchor carrier may use more transmission resources than transmission of the SIB1 on the anchor carrier. The repetition number of transmission of the SIB1 on the non-anchor carrier and the transmission resource for transmitting the SIB1 on the non-anchor carrier may be predefined by using a protocol.

It should be noted that, in this embodiment, similar to the prior art, the first communications device may further refer to other information when determining a transmission mode of the SIB1 based on the scheduling information and the status information. For example, in NB-IoT, the operation mode information indicated in the MIB message may further include information such as the quantity of CRS ports. During resource mapping, a resource location occupied by a CRS needs to be considered for the SIB1. During resource mapping, a resource occupied by the CRS is avoided, and the resource occupied by the CRS is related to the quantity of CRS ports. Therefore, when determining the transmission mode of the SIB1 based on the scheduling information and the status information, the first communications device may further refer to the operation mode information indicated in the MIB message.

In this embodiment, the first communications device adds, to the scheduling information and the frequency domain position information of the non-anchor carrier, various different information used to transmit the SIB1. The frequency domain position information of the non-anchor carrier can ensure that SIB1s of different cells are transmitted on a non-anchor carrier, and different cells may be configured with different non-anchor carriers, to ensure that frequency domain positions for transmitting SIB1s of different cells in one period are different. This type of interference isolation mechanism can avoid mutual interference between transmission of SIB1s of different cells, so that transmission reliability of the SIB1 can be improved.

In still another embodiment, the first information includes the transmission mode information of the SIB1 on the non-anchor carrier used to transmit the SIB1.

The transmission mode information may include the repetition number of the SIB1 on the non-anchor carrier used to transmit the SIB1.

In correspondence to this embodiment, in a first implementation, that the first communications device transmits the SIB1 to the second communications device based on the scheduling information, or based on the scheduling information and at least one of the operation mode of the carrier and the first information may be specifically: transmitting, by the first communications device, the SIB1 to the second communications device based on the scheduling information and the first information; and further specifically includes: determining, by the first communications device, the non-anchor carrier used to transmit the SIB1; and transmitting, by the first communications device based on the repetition number and the scheduling information, the SIB1 to the second communications device on the non-anchor carrier used to transmit the SIB1.

In a second implementation, that the first communications device transmits the SIB1 to the second communications device based on the scheduling information, or based on the scheduling information and at least one of the operation mode of the carrier and the first information may be specifically: transmitting, by the first communications device, the SIB1 to the second communications device based on the scheduling information and the first information. Further, the transmitting, by the first communications device, the SIB1 to the second communications device based on the scheduling information and the first information specifically includes: determining, by the first communications device, the non-anchor carrier used to transmit the SIB1; and transmitting, by the first communications device, the SIB1 to the second communications device on the anchor carrier based on the scheduling information, and transmitting, by the first communications device based on the scheduling information and the repetition number, the SIB1 to the second communications device on the non-anchor carrier used to transmit the SIB1.

A repetition number of the SIB1 on the anchor carrier may be determined with reference to the prior art.

Correspondingly, that the second communications device receives the SIB1 from the first communications device based on the scheduling information, or based on the scheduling information and at least one of the operation mode of the carrier and the first information may be specifically: receiving, by the second communications device, the SIB1 from the first communications device based on the scheduling information and the first information; and further includes: determining, by the second communications device, the non-anchor carrier used to transmit the SIB1; receiving, by the second communications device based on the repetition number and the scheduling information, the SIB1 from the first communications device on the non-anchor carrier used to transmit the SIB1; or receiving, by the second communications device, the SIB1 from the first communications device on the anchor carrier based on the scheduling information, and receiving, by the second communications device based on the scheduling information and the repetition number, the SIB1 from the first communications device on the non-anchor carrier used to transmit the SIB1.

It may be predefined by using a protocol that the SIB is transmitted only on a non-anchor, or the SIB1 is transmitted on an anchor carrier and a non-anchor carrier. A time domain resource location for transmitting the SIB1 on the anchor carrier and a time domain resource location for transmitting the SIB1 on the non-anchor carrier may be predefined by using a protocol. The time domain resource location for transmitting the SIB1 on the anchor carrier and the time domain resource location for transmitting the SIB1 on the non-anchor carrier may be the same or may be different. The frequency domain position of the non-anchor carrier used to transmit the SIB1 may be predefined by using a protocol. The scheduling information is used to indicate a transport block size used to transmit the SIB1 and a repetition number. The first communications device transmits the SIB1 to the second communications device on the non-anchor carrier based on the transport block size indicated by the scheduling information. When the repetition number of the SIB1 on the non-anchor carrier is the same as the repetition number of the SIB1 on the anchor carrier, in a repetition period in which the SIB1 is transmitted on the anchor carrier once, transmission of the SIB1 on the non-anchor carrier may use the same quantity of transmission resources as transmission of the SIB1 on the anchor carrier, or transmission of the SIB1 on the non-anchor carrier may use more transmission resources than transmission of the SIB1 on the anchor carrier. The transmission resource for transmitting the SIB1 on the non-anchor carrier may be predefined by using a protocol.

It should be noted that, in this embodiment, similar to the prior art, the first communications device may further refer to other information when determining a transmission mode of the SIB1 based on the scheduling information and the status information. For example, in NB-IoT, the operation mode information indicated in the MIB message may further include information such as the quantity of CRS ports. During resource mapping, a resource location occupied by a CRS needs to be considered for the SIB1. During resource mapping, a resource occupied by the CRS is avoided, and the resource occupied by the CRS is related to the quantity of CRS ports. Therefore, when determining the transmission mode of the SIB1 based on the scheduling information and the status information, the first communications device may further refer to the operation mode information indicated in the MIB message.

In this embodiment, the first communications device adds, to the scheduling information and the transmission mode information of the SIB1 on the non-anchor carrier, various different information used to transmit the SIB1. It can be ensured that SIB1s of different cells are transmitted on a non-anchor carrier, to ensure that frequency domain positions for transmitting SIB1 of different cells in one period are different. This type of interference isolation mechanism can avoid mutual interference between transmission of SIB1s of different cells, so that transmission reliability of the SIB1 can be improved. The repetition number may be configured, so that a base station can configure the repetition number of transmission of the SIB1 on the non-anchor carrier based on a power difference between the non-anchor carrier and the anchor carrier, to ensure transmission reliability of the SIB1 on the non-anchor carrier.

In still another embodiment, the first information includes the transmission mode information of the SIB1 on the non-anchor carrier used to transmit the SIB1.

In this embodiment, the transmission mode information includes resource indication information. The resource indication information is used to indicate: when the repetition number of the SIB1 on the non-anchor carrier used to transmit the SIB1 is the same as the repetition number of the SIB1 on the anchor carrier, in a repetition period in which the SIB1 is transmitted on the anchor carrier once, whether transmission of the SIB1 on the non-anchor carrier used to transmit the SIB1 requires more transmission resources than transmission of the SIB1 on the anchor carrier. The transmission resource may be one of a subframe, a radio frame, a hyper frame, a symbol, a slot, or the like.

The repetition period in which the SIB1 is transmitted on the anchor carrier once is a time required for transmitting one TB of the SIB1. It is assumed that the SIB1 uses one subframe in m radio frames, and k subframes need to be occupied to transmit one TB of the SIB1, where both m and k are positive integers greater than 1. In this case, a time for transmitting the SIB1 once is 10×m×k milliseconds (ms). Herein, an example of a time corresponding to one radio frame is 10 milliseconds. However, this application is not limited thereto. For example, if the SIB1 uses one subframe in two radio frames, and one TB for transmitting the SIB1 needs to occupy eight subframes, the time for transmitting the SIB1 once is 10×2×8 ms, that is, 160 ms.

It should be noted that, in the repetition period in which the SIB1 is transmitted on the anchor carrier once, transmission of the SIB1 on the non-anchor carrier used to transmit the SIB1 requires more transmission resources than transmission of the SIB1 on the anchor carrier. This means that transmission resources occupied to transmit the SIB1 on the non-anchor carrier are more than transmission resources occupied to transmit the SIB1 on the anchor carrier. The transmission resources occupied by transmission on the anchor carrier are merely a reference, and do not mean that the SIB1 is transmitted on the anchor carrier. For example, when the SIB1 is transmitted on the anchor carrier, the SIB1 occupies one subframe in two radio frames. When the SIB1 is transmitted on the non-anchor carrier, two subframes are used in two radio frames, and the two subframes are located in a same radio frame; or when the SIB1 is transmitted on the non-anchor carrier, two subframes are used in two radio frames, the two subframes are located in different radio frames, and subframe numbers of the two subframes are the same; or when the SIB1 is transmitted the SIB1 on the non-anchor carrier, two subframes are used in two radio frames, the two subframes are located in different radio frames, and subframe numbers of the two subframes are different.

Herein, that the first communications device transmits the SIB1 to the second communications device based on the scheduling information, or based on the scheduling information and at least one of the operation mode of the carrier and the first information may be specifically: transmitting, by the first communications device, the SIB1 to the second communications device based on the scheduling information and the first information. Further, the transmitting, by the first communications device, the SIB1 to the second communications device based on the scheduling information and the first information specifically includes:

determining, by the first communications device, the non-anchor carrier used to transmit the SIB1;

determining, by the first communications device based on the resource indication information, a transmission resource that is used to transmit the SIB1 and that is on the non-anchor carrier used to transmit the SIB1; and transmitting, by the first communications device by using the transmission resource that is used to transmit the SIB1 and that is on the non-anchor carrier used to transmit the SIB1, the SIB1 to the second communications device based on the scheduling information; or transmitting, by the first communications device, the SIB1 to the second communications device on the anchor carrier based on the scheduling information and by using the transmission resource that is used to transmit the SIB1 and that is on the non-anchor carrier used to transmit the SIB1.

Similarly, in this embodiment, a repetition number of the SIB1 on the anchor carrier may be determined with reference to the prior art.

That the second communications device receives the SIB1 from the first communications device based on the scheduling information, or based on the scheduling information and at least one of the operation mode of the carrier and the first information may be specifically: receiving, by the second communications device, the SIB1 from the first communications device based on the scheduling information and the first information; and further includes: determining, by the second communications device, the non-anchor carrier used to transmit the SIB1; determining, by the second communications device based on the resource indication information, a transmission resource that is used to transmit the SIB1 and that is on the non-anchor carrier used to transmit the SIB1; and receiving, by the second communications device by using the transmission resource that is used to transmit the SIB1 and that is on the non-anchor carrier used to transmit the SIB1, the SIB1 from the first communications device based on the scheduling information; or receiving, by the second communications device based on the scheduling information and by using the transmission resource that is used to transmit the SIB1 and that is on the non-anchor carrier used to transmit the SIB1, the SIB1 from the first communications device on the anchor carrier.

It should be noted that, for the transmission mode information of the SIB1 on the non-anchor carrier used to transmit the SIB1, the power difference between the anchor carrier and the non-anchor carrier is mainly considered.

If a power of the non-anchor carrier is greater than or equal to a power of the anchor carrier, when the SIB1 is transmitted on the non-anchor carrier, a repetition number that is the same as a repetition number of transmission of the SIB1 on the anchor carrier may be used. For example, if the repetition number of transmission of the SIB1 on the anchor carrier is 8, the repetition number of transmission of the SIB1 on the non-anchor carrier is also 8.

If the power of the non-anchor carrier is less than the power of the anchor carrier, when the SIB1 is transmitted on the non-anchor carrier, a repetition number that is greater than a repetition time count of transmission of the SIB1 on the anchor carrier is used. For example, if the repetition number of transmission of the SIB1 on the anchor carrier is 8, the repetition number of transmission of the SIB1 on the non-anchor carrier is 16. Alternatively, when the repetition number of the SIB1 on the non-anchor carrier is the same as the repetition number of the SIB1 on the anchor carrier, in the repetition period in which the SIB1 is transmitted on the anchor carrier once, transmission of the SIB1 on the non-anchor carrier uses more subframes than transmission of the SIB1 on the anchor carrier. For example, the repetition number of the SIB1 transmitted on the non-anchor carrier is 8; and in 160 ms, the SIB1 occupies eight subframes on the anchor carrier, and occupies 16 subframes on the non-anchor carrier.

It may be predefined by using a protocol that the SIB is transmitted only on a non-anchor, or the SIB1 is transmitted on an anchor carrier and a non-anchor carrier. A time domain resource location for transmitting the SIB1 on the anchor carrier and a time domain resource location for transmitting the SIB1 on the non-anchor carrier may be predefined by using a protocol. The time domain resource location for transmitting the SIB1 on the anchor carrier and the time domain resource location for transmitting the SIB1 on the non-anchor carrier may be the same or may be different. The frequency domain position of the non-anchor carrier used to transmit the SIB1 may be predefined by using a protocol. The scheduling information is used to indicate a transport block size used to transmit the SIB1 and a repetition number. The first communications device transmits the SIB1 to the second communications device on the non-anchor carrier based on the transport block size and the repetition number that are indicated by the scheduling information. It should be noted that, when the SIB1 is transmitted on the non-anchor carrier, a repetition number of the SIB1 may be the same as the repetition number indicated by the scheduling information, or when the SIB1 is transmitted on the non-anchor carrier, a repetition number of the SIB1 may be different from the repetition number indicated by the scheduling information. For example, when the SIB1 is transmitted on the non-anchor carrier, the repetition number of the SIB1 may be greater than the repetition number indicated by the scheduling information. The repetition number of transmission of the SIB1 on the non-anchor carrier may be predefined by using a protocol.

It should be noted that, in this embodiment, similar to the prior art, the first communications device may further refer to other information when determining a transmission mode of the SIB1 based on the scheduling information and the status information. For example, in NB-IoT, the operation mode information indicated in the MIB message may further include information such as the quantity of CRS ports. During resource mapping, a resource location occupied by a CRS needs to be considered for the SIB1. During resource mapping, a resource occupied by the CRS is avoided, and the resource occupied by the CRS is related to the quantity of CRS ports. Therefore, when determining the transmission mode of the SIB1 based on the scheduling information and the status information, the first communications device may further refer to the operation mode information indicated in the MIB message.

In this embodiment, the first communications device adds, to the scheduling information and the transmission mode information of the SIB1 on the non-anchor carrier, various different information used to transmit the SIB1. It can be ensured that SIB1 of different cells are transmitted on a non-anchor carrier, to ensure that frequency domain positions for transmitting SIB1 of different cells in one period are different. This type of interference isolation mechanism can avoid mutual interference between transmission of SIB1 of different cells, so that transmission reliability of the SIB1 can be improved. The transmission resource may be configured, so that a base station can configure, based on a power difference between the non-anchor carrier and the anchor carrier, the transmission resource for transmitting the SIB1 on the non-anchor carrier, to ensure transmission reliability of the SIB1 on the non-anchor carrier.

Further, it may be preset that some repetition number values in the repetition number set correspond to a first state, and the first state is that the SIB1 is transmitted only on the anchor carrier. Other repetition number values in the repetition number set correspond to a second state, and the second state is that the SIB1 is transmitted only on the non-anchor carrier, or the second state is that the SIB1 is transmitted only on the anchor carrier. For example, the repetition number set includes at least one repetition number, and the repetition number may be 4, 8, 16, or the like. For example, repetition numbers included in the repetition number set are 4, 8, and the like. In addition, the scheduling information is used to determine a transport block size used to transmit the SIB1 and a repetition number.

Herein, in an implementation, that the first communications device transmits the SIB1 to the second communications device based on the scheduling information, or based on the scheduling information and at least one of the operation mode of the carrier and the first information may be specifically: transmitting, by the first communications device, the SIB1 to the second communications device based on the scheduling information. Optionally, the transmitting, by the first communications device, the SIB1 to the second communications device based on the scheduling information specifically includes: determining, by the first communications device, that the repetition number (which is the repetition number in the scheduling information) corresponds to the first state or the second state; and transmitting, by the first communications device based on the first state or the second state, the SIB1 to the second communications device on the anchor carrier and/or the non-anchor carrier.

If the first communications device determines that the repetition number corresponds to the first state, the first communications device transmits the SIB1 to the second communications device only on the anchor carrier based on the first state; or if the first communications device determines that the repetition number corresponds to the second state, the first communications device transmits the SIB1 to the second communications device on the anchor carrier and the non-anchor carrier based on the second state; or if the first communications device determines that the repetition number corresponds to the second state, the first communications device transmits the SIB1 to the second communications device only on the non-anchor carrier based on the second state.

When the first communications device determines to transmit the SIB1 on the non-anchor carrier, the first communications device determines the non-anchor carrier used to transmit the SIB1.

If the first communications device determines that the repetition number corresponds to the first state, the first communications device transmits the SIB1 to the second communications device only on the anchor carrier based on the first state. A time domain resource location for transmitting the SIB1 on the anchor carrier may be predefined by using a protocol. The scheduling information is used to indicate a transport block size used to transmit the SIB1 and a repetition number. The first communications device transmits the SIB1 to the second communications device on the anchor carrier based on the transport block size and the repetition number that are indicated by the scheduling information.

If the first communications device determines that the repetition number corresponds to the second state, the first communications device transmits the SIB1 to the second communications device only on the non-anchor carrier based on the second state. A time domain resource location for transmitting the SIB1 on the non-anchor carrier may be predefined by using a protocol, and the frequency domain position of the non-anchor carrier used to transmit the SIB1 may be predefined by using a protocol. The scheduling information is used to indicate a transport block size used to transmit the SIB1 and a repetition number. The first communications device transmits the SIB1 to the second communications device on the non-anchor carrier based on the transport block size indicated by the scheduling information. It should be noted that, when the SIB1 is transmitted on the non-anchor carrier, a repetition number of the SIB1 may be the same as the repetition number indicated by the scheduling information, or when the SIB1 is transmitted on the non-anchor carrier, a repetition number of the SIB1 may be different from the repetition number indicated by the scheduling information. For example, when the SIB1 is transmitted on the non-anchor carrier, the repetition number of the SIB1 may be greater than the repetition number indicated by the scheduling information. When the repetition number of the SIB1 on the non-anchor carrier is the same as the repetition number of the SIB1 on the anchor carrier, in a repetition period in which the SIB1 is transmitted on the anchor carrier once, transmission of the SIB1 on the non-anchor carrier may use the same quantity of transmission resources as transmission of the SIB1 on the anchor carrier, or transmission of the SIB1 on the non-anchor carrier may use more transmission resources than transmission of the SIB1 on the anchor carrier. The repetition number of transmission of the SIB1 on the non-anchor carrier and the transmission resource for transmitting the SIB1 on the non-anchor carrier may be predefined by using a protocol.

If the first communications device determines that the repetition number corresponds to the second state, the first communications device transmits the SIB1 to the second communications device on the anchor carrier and the non-anchor carrier based on the second state, the time domain resource location for transmitting the SIB1 on the anchor carrier and the time domain resource location for transmitting the SIB1 on the non-anchor carrier may be predefined by using a protocol. The time domain resource location for transmitting the SIB1 on the anchor carrier and the time domain resource location for transmitting the SIB1 on the non-anchor carrier may be the same or may be different. The frequency domain position of the non-anchor carrier used to transmit the SIB1 may be predefined by using a protocol. The scheduling information is used to indicate a transport block size used to transmit the SIB1 and a repetition number. The first communications device transmits the SIB1 to the second communications device on the non-anchor carrier based on the transport block size and the repetition number that are indicated by the scheduling information. It should be noted that, when the SIB1 is transmitted on the non-anchor carrier, a repetition number of the SIB1 may be the same as the repetition number indicated by the scheduling information, or when the SIB1 is transmitted on the non-anchor carrier, a repetition number of the SIB1 may be different from the repetition number indicated by the scheduling information. For example, when the SIB1 is transmitted on the non-anchor carrier, the repetition number of the SIB1 may be greater than the repetition number indicated by the scheduling information. When the repetition number of the SIB1 on the non-anchor carrier is the same as the repetition number of the SIB1 on the anchor carrier, in a repetition period in which the SIB1 is transmitted on the anchor carrier once, transmission of the SIB1 on the non-anchor carrier may use the same quantity of transmission resources as transmission of the SIB1 on the anchor carrier, or transmission of the SIB1 on the non-anchor carrier may use more transmission resources than transmission of the SIB1 on the anchor carrier. The repetition number of transmission of the SIB1 on the non-anchor carrier and the transmission resource for transmitting the SIB1 on the non-anchor carrier may be predefined by using a protocol.

It should be noted that, in this embodiment, similar to the prior art, the first communications device may further refer to other information when determining a transmission mode of the SIB1 based on the scheduling information and the status information. For example, in NB-IoT, the operation mode information indicated in the MIB message may further include information such as the quantity of CRS ports. During resource mapping, a resource location occupied by a CRS needs to be considered for the SIB1. During resource mapping, a resource occupied by the CRS is avoided, and the resource occupied by the CRS is related to the quantity of CRS ports. Therefore, when determining the transmission mode of the SIB1 based on the scheduling information and the status information, the first communications device may further refer to the operation mode information indicated in the MIB message.

Correspondingly, that the second communications device receives the SIB1 from the first communications device based on the scheduling information, or based on the scheduling information and at least one of the operation mode of the carrier and the first information may be specifically: receiving, by the second communications device, the SIB1 from the first communications device based on the scheduling information. The receiving, by the second communications device, the SIB1 from the first communications device based on the scheduling information further includes: determining, by the second communications device, that the repetition number corresponds to the first state or the second state; and receiving, by the second communications device, the SIB1 from the first communications device on the anchor carrier and/or the non-anchor carrier based on the first state or the second state; and when the second communications device determines to receive the SIB1 from the first communications device on a non-anchor carrier, determining, by the second communications device, a non-anchor carrier used to receive the SIB1.

In this embodiment, the first communications device obtains the repetition number by using the scheduling information, and performs configuration based on the repetition number, so that the SIB1 can be transmitted on a non-anchor carrier, and MIB signaling overheads are increased, to ensure that carrier locations for transmitting SIB1 of different cells in one period are different. This type of interference isolation mechanism can avoid mutual interference between transmission of SIB1s of different cells, so that transmission reliability of the SIB1 can be improved.

In another implementation, further, when the repetition number in the scheduling information corresponds to the first state, the MIB message includes the scheduling information of the SIB1 and the operation mode of the carrier; and when the repetition number in the scheduling information corresponds to the second state, the MIB message includes the scheduling information of the SIB1, the operation mode of the carrier, and the first information including the status information used to transmit the SIB1.

In this implementation, that the first communications device transmits the SIB1 to the second communications device based on the scheduling information, or based on the scheduling information and at least one of the operation mode of the carrier and the first information may be specifically: transmitting, by the first communications device, the SIB1 to the second communications device based on the scheduling information and at least one of the operation mode of the carrier and the first information. Optionally, the transmitting, by the first communications device, the SIB1 to the second communications device based on the scheduling information and at least one of the operation mode of the carrier and the first information specifically includes the following specific implementations:

when the repetition number in the scheduling information belongs to the some repetition number values, transmitting the SIB1 to the second communications device on the anchor carrier based on the first state corresponding to the some repetition number values and the scheduling information; or when the repetition number in the scheduling information belongs to the other repetition number values, transmitting the SIB1 to the second communications device on the anchor carrier based on the scheduling information; or when the repetition number in the scheduling information belongs to the other repetition number values, transmitting the SIB1 to the second communications device on the non-anchor carrier based on the scheduling information, the operation mode of the carrier, and the status information that is in the first information and that is used to transmit the SIB1.

The transmitting, by the first communications device, the SIB1 on the non-anchor carrier includes: determining, by the first communications device, the non-anchor carrier used to transmit the SIB1.

It should be noted that, when a frequency domain position of the non-anchor carrier used to transmit the SIB1 is predefined, that the first communications device determines the non-anchor carrier used to transmit the SIB1 means that the first communications device determines that a non-anchor carrier corresponding to the predefined frequency domain position is the non-anchor carrier used to transmit the SIB1.

Correspondingly, that the second communications device receives the SIB1 from the first communications device based on the scheduling information, or based on the scheduling information and at least one of the operation mode of the carrier and the first information may be specifically: receiving, by the second communications device, the SIB1 from the first communications device based on the scheduling information and at least one of the operation mode of the carrier and the first information; and further includes: when the repetition number in the scheduling information belongs to the some repetition number values, receiving the SIB1 from the first communications device on the anchor carrier based on the first state corresponding to the some repetition number values and the scheduling information; or when the repetition number in the scheduling information belongs to the other repetition number values, receiving the SIB1 from the first communications device on the anchor carrier based on the scheduling information, or receiving the SIB1 from the first communications device on the non-anchor carrier based on the scheduling information, the operation mode of the carrier, and the status information that is in the first information and that is used to transmit the SIB1.

The receiving, by the second communications device, the SIB1 from the first communications device on the non-anchor carrier may include: determining, by the second communications device, the non-anchor carrier used to receive the SIB1.

Based on the foregoing another implementation, it may be understood that the operation mode of the carrier includes operation mode information of the non-anchor carrier used to transmit the SIB1, or the operation mode of the carrier includes a operation mode of the anchor carrier and operation mode information of the non-anchor carrier used to transmit the SIB1.

In this embodiment, the transmitting the SIB1 to the second communications device on the non-anchor carrier used to transmit the SIB1, based on the scheduling information, the operation mode of the carrier, and the status information that is in the first information and that is used to transmit the SIB1 may include the following specific implementations:

In a first implementation, the first communications device determines, based on the operation mode of the carrier, an operation mode of the non-anchor carrier used to transmit the SIB1, where the determined operation mode is a standalone operation mode; the first communications device determines, based on the standalone operation mode, that a transmission resource of the SIB1 on the non-anchor carrier used to transmit the SIB1 is the same as a transmission resource of the SIB1 on the anchor carrier; and the first communications device transmits the SIB1 to the second communications device on the non-anchor carrier based on the scheduling information and the transmission resource of the SIB1 on the non-anchor carrier used to transmit the SIB1.

Figure 4:
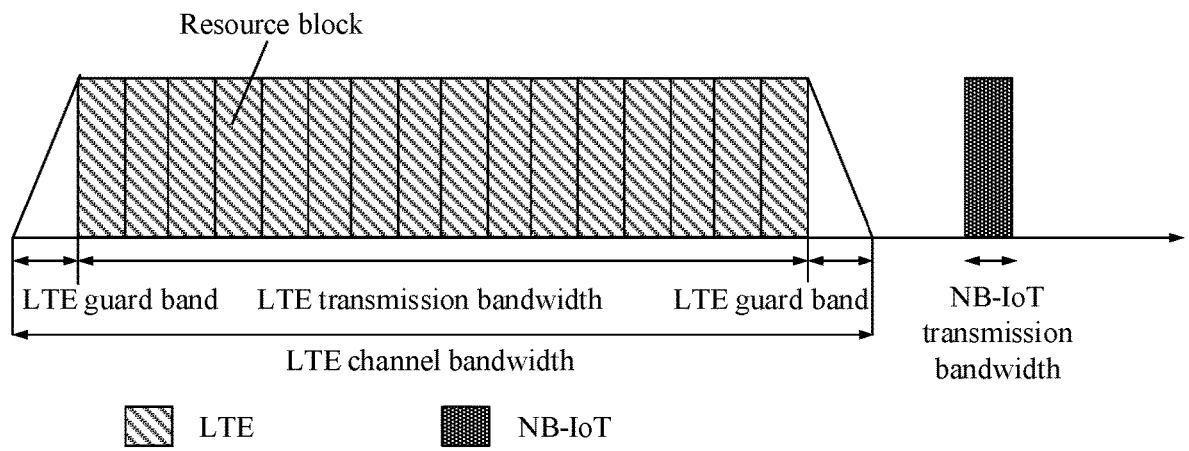
FIG. 4 is a legend of a standalone operation mode according to this application.

In the standalone operation mode, a standalone frequency band is used. For example, in NB-IoT, one or more carriers are used for transmission, as shown in FIG. 4.

In a second implementation, the first communications device determines, based on the operation mode of the carrier, an operation mode of the non-anchor carrier used to transmit the SIB1, where the determined operation mode is a guard-band operation mode or an in-band operation mode; the first communications device determines, based on the guard-band operation mode or the in-band operation mode, a transmission resource of the SIB1 on the non-anchor carrier used to transmit the SIB1; and the first communications device transmits, on the non-anchor carrier, the SIB1 to the second communications device based on the scheduling information and the transmission resource of the SIB1 on the non-anchor carrier used to transmit the SIB1.

Figure 5:
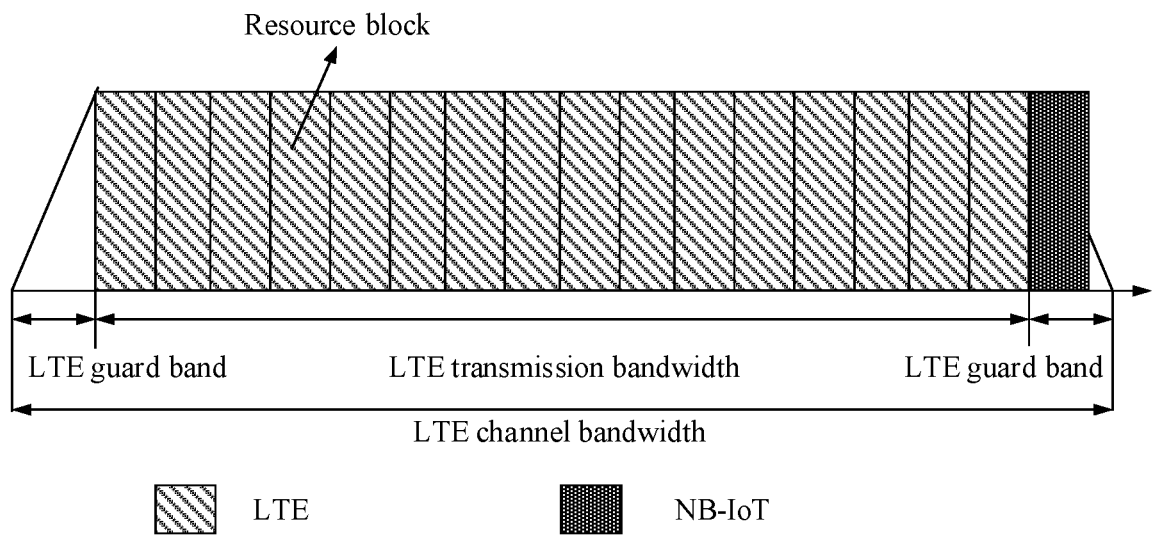
FIG. 5 is a legend of a guard-band operation mode according to this application.

In the guard-band operation mode, in NB-IoT, one or more resource blocks that are not used in an LTE guard-band are used for transmission, and a bandwidth of one of the resource blocks is 180 kHz, as shown in FIG. 5. An LTE channel bandwidth includes an LTE guard-band and an LTE transmission bandwidth.

Figure 6:
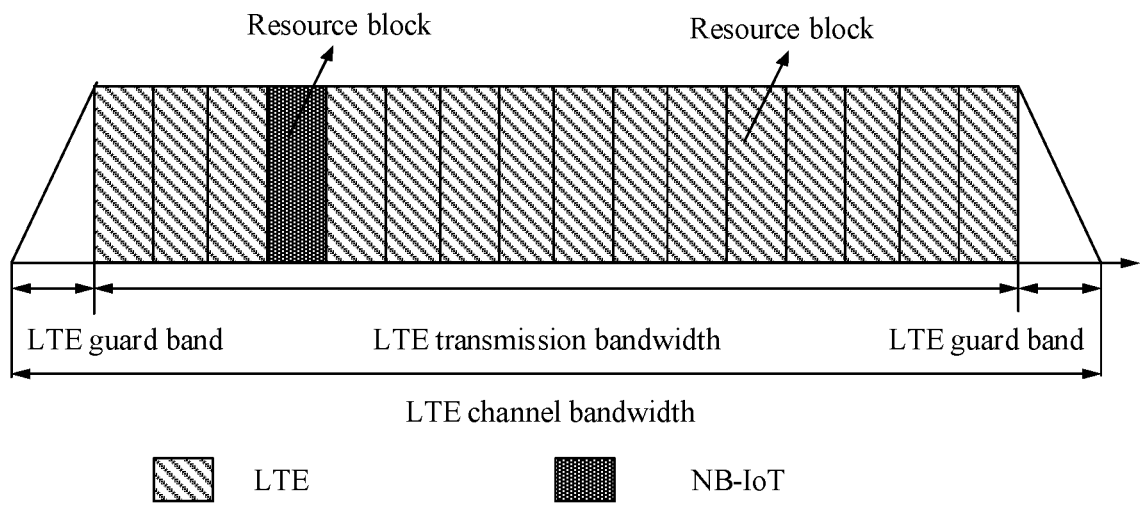
FIG. 6 is a legend of an in-band operation mode according to this application.

In the in-band operation mode, in NB-IoT, one or more resource blocks in the LTE transmission bandwidth are used for transmission, and a bandwidth of one of the resource blocks is 180 kHz, as shown in FIG. 6.

When the repetition number in the scheduling information belongs to the some repetition number values, the SIB1 is transmitted to the second communications device on the anchor carrier based on the first state corresponding to the some repetition number values and the scheduling information. A time domain resource location for transmitting the SIB1 on the anchor carrier may be predefined by using a protocol. The scheduling information is used to indicate a transport block size used to transmit the SIB1 and a repetition number. The first communications device transmits the SIB1 to the second communications device on the anchor carrier based on the transport block size and the repetition number that are indicated by the scheduling information.

When the repetition number in the scheduling information belongs to the other repetition number values, the SIB1 is transmitted to the second communications device on the anchor carrier based on the scheduling information. A time domain resource location for transmitting the SIB1 on the anchor carrier may be predefined by using a protocol. The scheduling information is used to indicate a transport block size used to transmit the SIB1 and a repetition number. The first communications device transmits the SIB1 to the second communications device on the anchor carrier based on the transport block size and the repetition number that are indicated by the scheduling information.

When the repetition number in the scheduling information belongs to the other repetition number values, the SIB1 is transmitted to the second communications device on the non-anchor carrier based on the scheduling information, the operation mode of the carrier, and the status information that is in the first information and that is used to transmit the SIB1. A time domain resource location for transmitting the SIB1 on the non-anchor carrier may be predefined by using a protocol, and the frequency domain position of the non-anchor carrier used to transmit the SIB1 may be predefined by using a protocol. The scheduling information is used to indicate a transport block size used to transmit the SIB1 and a repetition number. The first communications device transmits the SIB1 to the second communications device on the non-anchor carrier based on the transport block size indicated by the scheduling information. It should be noted that, when the SIB1 is transmitted on the non-anchor carrier, a repetition number of the SIB1 may be the same as the repetition number indicated by the scheduling information, or when the SIB1 is transmitted on the non-anchor carrier, a repetition number of the SIB1 may be different from the repetition number indicated by the scheduling information. For example, when the SIB1 is transmitted on the non-anchor carrier, the repetition number of the SIB1 may be greater than the repetition number indicated by the scheduling information. The repetition number of transmission of the SIB1 on the non-anchor carrier may be predefined by using a protocol.

For the first implementation in this embodiment, when the repetition number of the SIB1 on the non-anchor carrier is the same as the repetition number of the SIB1 on the anchor carrier, in a repetition period in which the SIB1 is transmitted on the anchor carrier once, transmission of the SIB1 on the non-anchor carrier may use the same quantity of transmission resources as transmission of the SIB1 on the anchor carrier. For the second implementation in this embodiment, transmission of the SIB1 on the non-anchor carrier may use more transmission resources than transmission of the SIB1 on the anchor carrier.

For example, the repetition number set includes at least one repetition number, and the repetition number may be 4, 8, 16, or the like. For example, if repetition numbers included in the repetition number set is 4, 8, and 16, some repetition number values in the repetition number set are 4 and 8, and the remaining repetition number value in the repetition number set is 16.

Using an NB-IoT system as an example, if repetition numbers included in the repetition number set are 4, 8, and 16, some repetition numbers in the repetition number set are 4 and 8, and the remaining repetition number value in the repetition number set is 16. If the repetition number indicated in the scheduling information that is of the SIB1 and that is in the MIB message is 4 or 8, the SIB1 is transmitted only on the anchor carrier, and a subframe location for transmitting the SIB1 on the anchor carrier may be predefined by using a protocol, for example, a subframe 0. If the repetition number indicated in the scheduling information that is of the SIB1 and that is in the MIB message is 16, the SIB1 is transmitted only on the non-anchor carrier, and a frequency domain position of the non-anchor carrier used to transmit SIB1 is predefined by using a protocol. For example, the non-anchor carrier used to transmit the SIB1 is at a high frequency location of the anchor carrier relative to the anchor carrier, and a non-anchor carrier used to transmit the SIB1 is on a neighboring RB of the anchor carrier; or the non-anchor carrier used to transmit the SIB1 is at a low frequency location of the anchor carrier relative to the anchor carrier, and the non-anchor carrier used to transmit the SIB1 is on a neighboring RB of the anchor carrier. A manner for determining the operation mode of the non-anchor carrier is described above. If it is determined, based on the operation mode of the carrier, that the operation mode of the non-anchor carrier is a standalone operation mode, a repetition number of transmission of the SIB1 on the non-anchor carrier is the same as the repetition number indicated by the scheduling information that is of the SIB1 and that is in the MIB message, that is, 16. Compared with a transmission resource used to transmit the SIB1 on the anchor carrier within 160 ms, one subframe is occupied to transmit the SIB1 on the non-anchor carrier, and a subframe location may be predefined by using a protocol, for example, a subframe 0, a subframe 5, or a subframe 9. If it is determined, based on the operation mode of the carrier, that the operation mode of the non-anchor carrier is a guard-band operation mode or an in-band operation mode, the repetition number of transmission of the SIB1 on the non-anchor carrier is the same as the repetition number indicated by the scheduling information that is of the SIB1 and that is in the MIB message, that is, 16. Compared with a transmission resource used to transmit the SIB1 on the anchor carrier within 160 ms, more resources are used to transmit the SIB1 on the non-anchor carrier. THE quantity of used transmission resources and a transmission resource location may be predefined by using a protocol. For example, the SIB1 is transmitted on the non-anchor carrier by using a subframe 0 and a subframe 5, or a subframe 5 and a subframe 9, or a subframe 0 and a subframe 9.

It should be noted that, in this embodiment, similar to the prior art, the first communications device may further refer to other information when determining a transmission mode of the SIB1 based on the scheduling information and the status information. For example, in NB-IoT, the operation mode information indicated in the MIB message may further include information such as the quantity of CRS ports. During resource mapping, a resource location occupied by a CRS needs to be considered for the SIB1. During resource mapping, a resource occupied by the CRS is avoided, and the resource occupied by the CRS is related to the quantity of CRS ports. Therefore, when determining the transmission mode of the SIB1 based on the scheduling information and the status information, the first communications device may further refer to the operation mode information indicated in the MIB message.

Correspondingly, the receiving the SIB1 from the first communications device on the non-anchor carrier used to transmit the SIB1, based on the scheduling information, the operation mode of the carrier, and the status information that is in the first information and that is used to transmit the SIB1 may include: determining, by the second communications device based on the operation mode of the carrier, an operation mode of the non-anchor carrier used to transmit the SIB1, where the determined operation mode is one of a standalone operation mode, a guard-band operation mode, and an in-band operation mode;

determining, by the second communications device based on the standalone operation mode, that a transmission resource of the SIB1 on the non-anchor carrier used to transmit the SIB1 is the same as a transmission resource of the SIB1 on the anchor carrier; and receiving, by the second communications device, the SIB1 from the first communications device on the non-anchor carrier based on the transmission resource of the SIB1 on the non-anchor carrier and the scheduling information; or determining, by the second communications device based on the guard-band operation mode or the in-band operation mode, a transmission resource of the SIB1 on the non-anchor carrier used to transmit the SIB1; and receiving, by the second communications device based on the scheduling information and the transmission resource of the SIB1 on the non-anchor carrier used to transmit the SIB1, the SIB1 from the first communications device on the non-anchor carrier used to transmit the SIB1.

In this embodiment, the first communications device adds, to the scheduling information, the operation mode of the carrier, and the status information, various different information used to transmit the SIB1. The status information can ensure that the first communications device can flexibly configure the carrier used to transmit the SIB1. It may be configured in some cells that the SIB1 is transmitted on an anchor carrier, and it may be configured in some other cells that the SIB1 is transmitted on a non-anchor carrier; or it may be configured in some cells that the SIB1 is transmitted on an anchor carrier, and it may be configured in some other cells that the SIB1 is transmitted on an anchor carrier and a non-anchor carrier, to ensure that carrier locations for transmitting SIB1 of different cells in one period are different. This type of interference isolation mechanism can avoid mutual interference between transmission of SIB1 of different cells, so that transmission reliability of the SIB1 can be improved.

In still another embodiment, the operation mode of the carrier includes operation mode information of the non-anchor carrier used to transmit the SIB1, or the operation mode of the carrier includes an operation mode of the anchor carrier and operation mode information of the non-anchor carrier used to transmit the SIB1.

That the first communications device transmits the SIB1 to the second communications device based on the scheduling information, or based on the scheduling information and at least one of the operation mode of the carrier and the first information may be specifically: transmitting, by the first communications device, the SIB1 to the second communications device based on the scheduling information and the operation mode of the carrier. Optionally, the transmitting, by the first communications device, the SIB1 to the second communications device based on the scheduling information and the operation mode of the carrier specifically includes the following specific implementations:

In a first specific implementation, the first communications device determines, based on the operation mode of the carrier, an operation mode of the non-anchor carrier used to transmit the SIB1, where the determined operation mode is a standalone operation mode; the first communications device determines, based on the standalone operation mode, that a repetition number of the SIB1 on the non-anchor carrier is the same as a repetition number of the SIB1 on the anchor carrier; and the first communications device transmits, based on the scheduling information and the repetition number, the SIB1 on the non-anchor carrier used to transmit the SIB1; or the first communications device transmits, based on the scheduling information, the SIB1 to the second communications device on the anchor carrier, and transmits, based on the scheduling information, the SIB1 to the second communications device on the non-anchor carrier used to transmit the SIB1.

In a second specific implementation, the first communications device determines, based on the operation mode of the carrier, an operation mode of the non-anchor carrier used to transmit the SIB1, where the determined operation mode is a standalone operation mode; the first communications device determines, based on the standalone operation mode, that a transmission resource of the SIB1 on the non-anchor carrier used to transmit the SIB1 is the same as a transmission resource of the SIB1 on the anchor carrier; and the first communications device transmits the SIB1 to the second communications device on the non-anchor carrier based on the scheduling information and the transmission resource; or the first communications device transmits the SIB1 to the second communications device on the anchor carrier based on the scheduling information, and transmits the SIB1 to the second communications device on the non-anchor carrier based on the transmission resource and the scheduling information.

In a third specific implementation, the first communications device determines, based on the operation mode of the carrier, an operation mode of the non-anchor carrier used to transmit the SIB1, where the determined operation mode is a guard-band operation mode or an in-band operation mode; the first communications device determines, based on the guard-band operation mode or the in-band operation mode, a repetition number of the SIB1 on the non-anchor carrier; and the first communications device transmits, on the non-anchor carrier, the SIB1 to the second communications device based on the scheduling information and the repetition number of the SIB1 on the non-anchor carrier. For the guard-band operation mode or the in-band operation mode, a power spectral density of the non-anchor carrier is usually lower than or equal to a power spectral density of the anchor carrier. To ensure transmission reliability of the SIB1 on the non-anchor carrier, the repetition number, determined in this manner, of the SIB1 on the non-anchor carrier is greater than the repetition number of the SIB1 on the anchor carrier.

In a fourth specific implementation, the first communications device determines, based on the operation mode of the carrier, an operation mode of the non-anchor carrier used to transmit the SIB1, where the determined operation mode is a guard-band operation mode or an in-band operation mode; the first communications device determines, based on the guard-band operation mode or the in-band operation mode, a repetition number of the SIB1 on the non-anchor carrier; and the first communications device transmits the SIB1 to the second communications device on the anchor carrier based on the scheduling information, and transmits the SIB1 to the second communications device on the non-anchor carrier based on the scheduling information and the repetition number of the SIB1 on the non-anchor carrier. For the guard-band operation mode or the in-band operation mode, a power spectral density of the non-anchor carrier is usually lower than or equal to a power spectral density of the anchor carrier. To ensure transmission reliability of the SIB1 on the non-anchor carrier, the repetition number, determined in this manner, of the SIB1 on the non-anchor carrier is greater than the repetition number of the SIB1 on the anchor carrier.

The transmitting, by the first communications device, the SIB1 on the non-anchor carrier includes: determining, by the first communications device, the non-anchor carrier used to transmit the SIB1.

It should be noted that, when a frequency domain position of the non-anchor carrier used to transmit the SIB1 is predefined, that the first communications device determines the non-anchor carrier used to transmit the SIB1 means that the first communications device determines that a non-anchor carrier corresponding to the predefined frequency domain position is the non-anchor carrier used to transmit the SIB1.

If it is predefined by using a protocol that the SIB1 is transmitted only on the non-anchor carrier or the SIB1 is transmitted on the anchor carrier and the non-anchor carrier, the time domain resource location for transmitting the SIB1 on the anchor carrier and the time domain resource location for transmitting the SIB1 on the non-anchor carrier may be predefined by using a protocol. The time domain resource location for transmitting the SIB1 on the anchor carrier and the time domain resource location for transmitting the SIB1 on the non-anchor carrier may be the same or may be different. The frequency domain position of the non-anchor carrier used to transmit the SIB1 may be predefined by using a protocol. The scheduling information is used to indicate a transport block size used to transmit the SIB1 and a repetition number. The first communications device transmits the SIB1 to the second communications device on the non-anchor carrier based on the transport block size indicated by the scheduling information. The transmission resource and the repetition number of transmission of the SIB1 on the non-anchor carrier may be bound to the operation mode of the non-anchor carrier. A specific repetition number of the SIB1 on the non-anchor carrier and the transmission resource are predefined by using a protocol.

It should be noted that, in this embodiment, similar to the prior art, the first communications device may further refer to other information when determining a transmission mode of the SIB1 based on the scheduling information and the status information. For example, in NB-IoT, the operation mode information indicated in the MIB message may further include information such as the quantity of CRS ports. During resource mapping, a resource location occupied by a CRS needs to be considered for the SIB1. During resource mapping, a resource occupied by the CRS is avoided, and the resource occupied by the CRS is related to the quantity of CRS ports. Therefore, when determining the transmission mode of the SIB1 based on the scheduling information and the status information, the first communications device may further refer to the operation mode information indicated in the MIB message.

In this embodiment, the receiving, by the second communications device, the SIB1 from the first communications device based on the scheduling information and the operation mode of the carrier may specifically include:

determining, by the second communications device based on the operation mode of the carrier, an operation mode of the non-anchor carrier used to transmit the SIB1, where the determined operation mode includes one of a standalone operation mode, a guard-band operation mode, and an in-band operation mode;

determining, by the second communications device based on the standalone operation mode, that a repetition number of the SIB1 on the non-anchor carrier is the same as a repetition number of the SIB1 on an anchor carrier; and receiving, by the second communications device based on the scheduling information and the repetition number, the SIB1 from the first communications device on the non-anchor carrier used to transmit the SIB1; or receiving, by the second communications device, the SIB1 from the first communications device on the anchor carrier, and receiving, by the second communications device based on the repetition number and the scheduling information, the SIB1 from the first communications device on the non-anchor carrier used to transmit the SIB1; or determining, by the second communications device based on the standalone operation mode, that a transmission resource of the SIB1 on the non-anchor carrier used to transmit the SIB1 is the same as a transmission resource of the SIB1 on an anchor carrier; and receiving, by the second communications device, the SIB1 from the first communications device on the non-anchor carrier based on the scheduling information and the transmission resource; or receiving, by the second communications device, the SIB1 from the first communications device on the anchor carrier, and receiving, by the second communications device, the SIB1 from the first communications device on the non-anchor carrier based on the transmission resource and the scheduling information; or determining, by the second communications device, a repetition number of the SIB1 on the non-anchor carrier based on the guard-band operation mode or the in-band operation mode; and receiving, by the second communications device, the SIB1 from the first communications device on the non-anchor carrier based on the repetition number of the SIB1 on the non-anchor carrier and the scheduling information; or receiving, by the second communications device, the SIB1 from the first communications device on the anchor carrier, and receiving, by the second communications device, the SIB1 from the first communications device on the non-anchor carrier based on the repetition number of the SIB1 on the non-anchor carrier and the scheduling information; or determining, by the second communications device, a transmission resource of the SIB1 on the non-anchor carrier based on the guard-band operation mode or the in-band operation mode; and receiving, by the second communications device, the SIB1 from the first communications device on the non-anchor carrier based on the transmission resource of the SIB1 on the non-anchor carrier and the scheduling information; or receiving, by the second communications device, the SIB1 from the first communications device on the anchor carrier, and receiving, by the second communications device, the SIB1 from the first communications device on the non-anchor carrier based on the transmission resource of the SIB1 on the non-anchor carrier and the scheduling information.

The receiving, by the second communications device, the SIB1 from the first communications device on the non-anchor carrier includes: determining, by the second communications device, the non-anchor carrier used to receive the SIB1.

It can be learned that steps performed by the first communications device correspond to steps performed by the second communications device.

In this embodiment, it may be predefined by using a protocol that the SIB1 is transmitted on the non-anchor carrier, or the SIB1 is transmitted on the anchor carrier and the non-anchor carrier, to ensure that time domain positions and/or frequency domain positions for transmitting SIB1 of different cells in one period are different. This type of interference isolation mechanism can avoid mutual interference between transmission of SIB1s of different cells, so that transmission reliability of the SIB1 can be improved. In addition, in this embodiment, the transmission resource or the repetition number of transmission of the SIB1 on the non-anchor carrier is bound to the operation mode of the carrier, to reduce the MIB signaling overheads.

On the basis that the first information includes the transmission mode information of the SIB1 on the non-anchor carrier used to transmit the SIB1, optionally, the first information further includes frequency domain position information of the non-anchor carrier used to transmit the SIB1.

Parameters included in the frequency domain position information of the non-anchor carrier used to transmit the SIB1 are the same as those described above, and details are not described herein again.

In this case, the determining, by the first communications device, the non-anchor carrier used to transmit the SIB1 may include: determining, by the first communications device based on the anchor carrier and the frequency domain position information of the non-anchor carrier, the frequency domain position of the non-anchor carrier used to transmit the SIB1; and determining, by the first communications device, a non-anchor carrier corresponding to the frequency domain position.

The determining, by the second communications device, a non-anchor carrier used to receive the SIB1 may include: determining, by the second communications device based on the anchor carrier and the frequency domain position information of the non-anchor carrier, the frequency domain position of the non-anchor carrier used to transmit the SIB1; and determining, by the second communications device, the non-anchor carrier corresponding to the frequency domain position.

It may be predefined by using a protocol that the SIB is transmitted only on a non-anchor, or the SIB1 is transmitted on an anchor carrier and a non-anchor carrier. A time domain resource location for transmitting the SIB1 on the anchor carrier and a time domain resource location for transmitting the SIB1 on the non-anchor carrier may be predefined by using a protocol. The time domain resource location for transmitting the SIB1 on the anchor carrier and the time domain resource location for transmitting the SIB1 on the non-anchor carrier may be the same or may be different. The scheduling information is used to indicate a transport block size used to transmit the SIB1 and a repetition number. The first communications device transmits the SIB1 to the second communications device on the non-anchor carrier based on the transport block size indicated by the scheduling information.

It should be noted that, in this embodiment, similar to the prior art, the first communications device may further refer to other information when determining a transmission mode of the SIB1 based on the scheduling information and the status information. For example, in NB-IoT, the operation mode information indicated in the MIB message may further include information such as the quantity of CRS ports. During resource mapping, a resource location occupied by a CRS needs to be considered for the SIB1. During resource mapping, a resource occupied by the CRS is avoided, and the resource occupied by the CRS is related to the quantity of CRS ports. Therefore, when determining the transmission mode of the SIB1 based on the scheduling information and the status information, the first communications device may further refer to the operation mode information indicated in the MIB message.

In this embodiment, the first communications device adds, to the scheduling information, the frequency domain position information of the non-anchor carrier, and the transmission mode information of the SIB1 on the non-anchor carrier, various different information used to transmit the SIB1. It can be ensured that SIB1 of different cells are transmitted on a non-anchor carrier, and different cells may be configured with different non-anchor carriers, to ensure that frequency domain positions for transmitting SIB1 of different cells in one period are different. This type of interference isolation mechanism can avoid mutual interference between transmission of SIB1s of different cells, so that transmission reliability of the SIB1 can be improved. The transmission resource may be configured, so that a base station can configure, based on a power difference between the non-anchor carrier and the anchor carrier, the transmission resource for transmitting the SIB1 on the non-anchor carrier and the repetition number of transmission of the SIB1 on the non-anchor carrier, to ensure transmission reliability of the SIB1 on the non-anchor carrier.

The following describes the foregoing embodiments by using several specific implementations as examples.

Implementation 1

It is predefined by using a protocol that a SIB1 is transmitted only on an anchor carrier. When a repetition number of transmission of the SIB1 on the anchor carrier is 16, in uplink and downlink subframes, a downlink subframe other than a subframe 0 is configured to be available, and the available downlink subframe is a non-multimedia broadcast multicast service single frequency network (MBSFN) subframe; or when the available downlink subframe has relatively small impact on an MBSFN subframe (for example, in a configuration with more downlink subframes), the SIB1 is sent on the anchor carrier by using the downlink subframe, and time domain position information used to transmit the SIB1 is indicated in a MIB message, in other words, first information includes the time domain position information used to transmit the SIB1.

TABLE 1

TDD LTE uplink-downlink subframe configuration

| Uplink-downlink subframe configuration | Downlink-to-uplink switch-point periodicity | Subframe number | | | | | | | | | |
|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Currently, TDD LTE supports the uplink-downlink subframe configurations 0 to 6. In Table 1, "D" represents a downlink subframe, used for downlink transmission; "U" represents an uplink subframe, used for uplink transmission; and "S" represents a special subframe. It can be learned from Table 1 that in the seven uplink-downlink subframe configurations of TDD LTE, the quantity of consecutive uplink subframes may be 1, 2, or 3.

It can be learned from Table 1 that subframes that can be used to transmit the SIB1 include a subframe 0, a subframe 3, a subframe 4, a subframe 6, a subframe 7, and a subframe 8. During specific implementation, three bits may be used to indicate the foregoing six subframes that can be used to transmit the SIB1, or four subframes may be determined in the foregoing six subframes by using an agreement of a standard protocol or an agreement of an operator, where the four subframes include at least a subframe 0. In this way, two bits may be used to indicate a subframe used to transmit the SIB1, or one bit may be used to indicate a subframe used to transmit the SIB1. For example, "0" indicates that the SIB1 is transmitted on the subframe 0 of the anchor carrier, and "1" indicates that the SIB1 is transmitted on a subframe X of the anchor carrier. The subframe X is a downlink subframe other than the subframe 0. Therefore, the subframe X may be any one of the subframe 3, the subframe 4, the subframe 6, the subframe 7, and the subframe 8. The subframe X may be predefined by using a standard protocol or with an operator. In the foregoing subframes, the subframe 6 is a non-MBSFN subframe. Therefore, the subframe X may be the subframe 6, to reduce impact on an MBSFN subframe configuration.

In this implementation, specifically, two bits may be used to indicate transmission of the SIB1, as shown in Table 2. The SIB1 occupies one subframe in two radio frames.

In addition, for other repetition numbers, for example, 4 and 8, to improve configuration flexibility of a first communications device, the time domain position information used to transmit the SIB1 may also be indicated by using a MIB message.

In the foregoing manner, the SIB1 may be configured as another subframe different from the subframe 0 during transmission on the anchor carrier, so that mutual interference between transmission of SIB1s of different cells can be avoided, and therefore transmission reliability of the SIB1 is improved.

TABLE 2

| Field value | Meaning |
| --- | --- |
| 0 | The SIB1 is transmitted on the subframe 0 of the anchor carrier. |
| 1 | The SIB1 is transmitted on the subframe X of the anchor carrier, where the subframe X is a downlink subframe other than the subframe 0. |

It should be noted that for any table in this application, for example, Table 1, a correspondence between a field value and a meaning is not limited to that shown in the table. For example, meanings of the field value "0" and the field value "1" may be exchanged.

Implementation 2

It is predefined in first information that a SIB1 is transmitted on an anchor carrier and a non-anchor carrier. When a repetition number of transmission of the SIB1 is N, a value of N includes, for example, 4, 8, or 16. Some SIB1s may be transmitted on the anchor carrier, and some other SIB1s may be transmitted on the non-anchor carrier. A repetition number of the SIB1 on the anchor carrier is N/2, and the SIB1 is transmitted on a subframe 0. The first information includes frequency domain position information of the non-anchor carrier used to transmit the SIB1. The frequency domain position information of the non-anchor carrier used to transmit the SIB1 is used to indicate that the non-anchor carrier used to transmit the SIB1 is at a high frequency location of the anchor carrier or the non-anchor carrier used to transmit the SIB1 is at a low frequency location of the anchor carrier. In consideration of a power difference between the anchor carrier and the non-anchor carrier, the first information may further include transmission mode information of the SIB1 on the non-anchor carrier used to transmit the SIB1. In this manner, a repetition number of transmission of the SIB1 on the subframe 0 of the anchor carrier is reduced, and the SIB1 may be transmitted on the non-anchor carrier, thereby avoiding mutual interference between transmission of SIB1s of different cells. A subframe Y for transmitting the SIB1 on the non-anchor carrier may be predefined by using a standard protocol or with an operator, where the subframe Y may be a subframe 0, a subframe 1, a subframe 3, a subframe 4, a subframe 5, a subframe 6, a subframe 7, a subframe 8, or a subframe 9. In this implementation, specifically, two bits may be used to indicate transmission of the SIB1, as shown in Table 3. The SIB1 occupies one subframe in two radio frames.

TABLE 3

| Field value | Meaning |
| --- | --- |
| 00 | The SIB1 is transmitted on the anchor carrier and the non-anchor carrier. The non-anchor carrier used to transmit the SIB1 is at the high frequency location of the anchor carrier. The SIB1 is transmitted on the subframe 0 of the anchor carrier, and the repetition number is N/2. The SIB1 is transmitted on the subframe Y of the non-anchor carrier, and the repetition number is N/2. |
| 01 | The SIB1 is transmitted on the anchor carrier and the non-anchor carrier. The non-anchor carrier used to transmit the SIB1 is at the low frequency location of the anchor carrier. The SIB1 is transmitted on the subframe 0 of the anchor carrier, and the repetition number is N/2. The SIB1 is transmitted on the subframe Y of the non-anchor carrier, and the repetition number is N/2. |
| 10 | The SIB1 is transmitted on the anchor carrier and the non-anchor carrier. The non-anchor carrier used to transmit the SIB1 is at the high frequency location of the anchor carrier. The SIB1 is transmitted on the subframe 0 of the anchor carrier, and the repetition number is N/2. The SIB1 is transmitted on the subframe Y of the non-anchor carrier, and the repetition number is N. |
| 11 | The SIB1 is transmitted on the anchor carrier and the non-anchor carrier. The non-anchor carrier used to transmit the SIB1 is at the low frequency location of the anchor carrier. The SIB1 is transmitted on the subframe 0 of the anchor carrier, and the repetition number is N/2. The SIB1 is transmitted on the subframe Y of the non-anchor carrier, and the repetition number is N. |

Implementation 3

Frequency domain position information of a non-anchor carrier used to transmit a SIB1 is predefined by using a standard protocol or with an operator. When a repetition number of transmission of the SIB1 is N, and a value of N includes, for example, 4, 8, or 16, first information includes status information used to transmit the SIB1, frequency domain position information used to transmit the SIB1, and time domain position information used to transmit the SIB1. The first information may be separately indicated, or may be jointly indicated. In consideration of a power difference between an anchor carrier and the non-anchor carrier, the first information may further include transmission mode information of the SIB1 on the non-anchor carrier used to transmit the SIB1. When the SIB1 is transmitted only on the anchor carrier, the time domain position information used to transmit the SIB1 indicates a subframe location for transmitting the SIB1 on the anchor carrier. When the SIB1 is transmitted on the anchor carrier and the non-anchor carrier, the SIB1 is transmitted on a subframe 0 of the anchor carrier. The transmission mode information of the SIB1 on the non-anchor carrier used to transmit the SIB1 includes a repetition number of the SIB1 on the non-anchor carrier.

In the foregoing manner, the SIB1 may be transmitted on another subframe, different from the subframe 0, of the anchor carrier, and the SIB1 may be transmitted on the non-anchor carrier, thereby avoiding mutual interference between transmission of SIB1s of different cells.

For example, the SIB1 is transmitted on a subframe X1 of the anchor carrier. The subframe X1 is a downlink subframe other than the subframe 0, and may be specifically one of a subframe 3, a subframe 4, a subframe 6, a subframe 7, and a subframe 8. The subframe X1 may be predefined by using a standard protocol or with an operator. In the foregoing subframes, the subframe 6 is a non-MBSFN subframe. Therefore, the subframe X1 may be the subframe 6, to reduce impact on an MBSFN subframe configuration. A subframe Y1 for transmitting the SIB1 on the non-anchor carrier may be predefined by using a standard protocol or with an operator, where the subframe Y1 may be the subframe 0, a subframe 1, the subframe 3, the subframe 4, a subframe 5, the subframe 6, the subframe 7, the subframe 8, or a subframe 9. Two bits may be used to indicate specific implementation of transmission of the SIB1, as shown in Table 4. The SIB1 occupies one subframe in two radio frames.

Implementation 4

Frequency domain position information of a non-anchor carrier used to transmit a SIB1 is predefined by using a standard protocol or with an operator. A repetition number of transmission of the SIB1 is N, and a value of N includes, for example, 4, 8, or 16. First information includes status information used to transmit the SIB1, time domain position information used to transmit the SIB1, and the frequency domain position information of the non-anchor carrier used to transmit the SIB1. The first information may be separately indicated, or may be jointly indicated. In consideration of a power difference between an anchor carrier and the non-anchor carrier, the first information may further include transmission mode information of the SIB1 on the non-anchor carrier used to transmit the SIB1. A state included in the status information used to transmit the SIB1 indicates that the SIB1 is transmitted only on the anchor carrier or the SIB1 is transmitted only on the non-anchor carrier. The time domain position information used to transmit the SIB1 indicates a subframe location for transmitting the SIB1 on the anchor carrier. The transmission mode information of the SIB1 on the non-anchor carrier used to transmit the SIB1 includes a repetition number of the SIB1 on the non-anchor carrier and resource indication information.

In the foregoing manner, the SIB1 may be transmitted on another subframe, different from the subframe 0, of the anchor carrier, and the SIB1 may be transmitted on the non-anchor carrier, thereby avoiding mutual interference between transmission of SIB1s of different cells.

For example, the SIB1 is transmitted on a subframe X2 of the anchor carrier. The subframe X2 is a downlink subframe other than the subframe 0, and may be specifically one of a subframe 3, a subframe 4, a subframe 6, a subframe 7, and a subframe 8. The subframe X2 may be predefined by using a standard protocol or with an operator. In the foregoing subframes, the subframe 6 is a non-MBSFN subframe. Therefore, the subframe X2 may be preferably the subframe 6, to reduce impact on an MBSFN subframe configuration. A subframe Y2 for transmitting the SIB1 on the non-anchor carrier may be predefined by using a standard protocol or with an operator, where the subframe Y2, a subframe Y21, and a subframe Y22 each may be the subframe 0, a subframe 1, the subframe 3, the subframe 4, a subframe 5, the subframe 6, the subframe 7, the subframe 8, or a subframe 9. Two bits may be used to indicate specific implementation of transmission of the SIB1, as shown in Table 5. It should be noted that in a repetition period in which the SIB1 is

TABLE 4

| Field value | Meaning |
| --- | --- |
| 00 | The SIB1 is transmitted only on the subframe 0 of the anchor carrier, and a repetition number is N. |
| 01 | The SIB1 is transmitted only on the subframe X1 of the anchor carrier, and a repetition number is N. |
| 10 | The SIB1 is transmitted on the anchor carrier and the non-anchor carrier. The SIB1 is transmitted on the subframe 0 of the anchor carrier, and a repetition number is N/2. The SIB1 is transmitted on the subframe Y1 of the non-anchor carrier, and a repetition number is N/2. |
| 11 | The SIB1 is transmitted on the anchor carrier and the non-anchor carrier. The SIB1 is transmitted on the subframe 0 of the anchor carrier, and a repetition number is N/2. The SIB1 is transmitted on the subframe Y1 of the non-anchor carrier, and a repetition number is N. | transmitted on the anchor carrier once, transmission of the SIB1 on the non-anchor carrier used to transmit the SIB1 requires more transmission resources than transmission of the SIB1 on the anchor carrier. For example, on the non-anchor carrier, the SIB1 uses two subframes in two radio frames, and the two subframes are located in a same radio frame; or on the non-anchor carrier, the SIB1 uses two subframes in two radio frames, and the two subframes are located in different radio frames.

TABLE 5

| Field value | Meaning |
| --- | --- |
| 00 | The SIB1 is transmitted only on the subframe 0 of the anchor carrier, and a repetition number is N. |
| 01 | The SIB1 is transmitted only on the subframe X2 of the anchor carrier, and a repetition number is N. |
| 10 | The SIB1 is transmitted only on the non-anchor carrier, the SIB1 is transmitted on the subframe Y2 of the non-anchor carrier, and a repetition number is N. |
| 11 | The SIB1 is transmitted only on the non-anchor carrier, the SIB1 is transmitted on the subframe Y2 of the non-anchor carrier, and a repetition number is N. In the repetition period in which the SIB1 is transmitted on the anchor carrier once, transmission of the SIB1 on the non-anchor carrier requires more subframes than transmission of the SIB1 on the anchor carrier. Alternatively, the SIB1 is transmitted on a subframe Y21 and a subframe Y22 in a same radio frame of the non-anchor carrier, and a repetition number is N. In the repetition period in which the SIB1 is transmitted on the anchor carrier once, transmission of the SIB1 on the non-anchor carrier requires more subframes than transmission of the SIB1 on the anchor carrier. |

Implementation 5

A repetition number of a SIB1 is N, and a value of N includes, for example, 4, 8, or 16. First information includes status information used to transmit the SIB1 and frequency domain position information of a non-anchor carrier used to transmit the SIB1. In consideration of a power difference between an anchor carrier and the non-anchor carrier, the first information further includes transmission mode information of the SIB1 on the non-anchor carrier used to transmit the SIB1. A state included in the status information used to transmit the SIB1 indicates that the SIB1 is transmitted only on the anchor carrier, the SIB1 is transmitted only on the non-anchor carrier, or the SIB1 is transmitted on the anchor carrier and the non-anchor carrier. A location for transmitting the SIB1 on the anchor carrier may be predefined by using a standard protocol or with an operator. The transmission mode information of the SIB1 on the non-anchor carrier used to transmit the SIB1 includes a repetition number of the SIB1 on the non-anchor carrier and resource indication information.

In this manner, the SIB1 may be transmitted on another subframe, different from the subframe 0, of the anchor carrier, and the SIB1 may be transmitted on the non-anchor carrier, thereby avoiding mutual interference between transmission of SIB1s of different cells, and improving transmission reliability of the SIB1.

For example, a subframe Y3 for transmitting the SIB1 on the non-anchor carrier may be predefined by using a standard protocol or with an operator, where the subframe Y3 may be the subframe 0, a subframe 1, a subframe 3, a subframe 4, a subframe 5, a subframe 6, a subframe 7, a subframe 8, or a subframe 9. Two bits may be used to indicate specific implementation of transmission of the SIB1, as shown in Table 6.

TABLE 6

| Field value | Meaning |
| --- | --- |
| 00 | The SIB1 is transmitted only on the subframe 0 of the anchor carrier, and a repetition number is N. |
| 01 | The SIB1 is transmitted only on the subframe Y3 of the non-anchor carrier, and a repetition number is N. |
| 10 | The SIB1 is transmitted on the anchor carrier and the non-anchor carrier. The SIB1 is transmitted on the subframe 0 of the anchor carrier, and a repetition number is N/2. The SIB1 is transmitted on the subframe Y3 of the non-anchor carrier, and a repetition number is N/2. |
| 11 | The SIB1 is transmitted on the anchor carrier and the non-anchor carrier. The SIB1 is transmitted on the subframe 0 of the anchor carrier, and a repetition number is N/2. The SIB1 is transmitted on the subframe Y3 of the non-anchor carrier, and a repetition number is N. |

Further, to reduce MIB message signaling overheads, at least one of a operation mode of a carrier, the status information used to transmit the SIB1, time domain position information used to transmit the SIB1, the frequency domain position information of the non-anchor carrier used to transmit the SIB1, and the transmission mode information of the SIB1 on the non-anchor carrier used to transmit the SIB1 may be implicitly indicated by being bound to other information in the MIB message, or may be predefined by using a standard protocol or with an operator, and does not need to be explicitly indicated in the MIB message.

For example, for the operation mode of the carrier, when NB-IoT includes: an in-band operation mode and a guard-band operation mode, a power of the anchor carrier is higher than that of the non-anchor carrier. Therefore, when the SIB1 is transmitted on the non-anchor carrier, a repetition number of transmission of the SIB1 on the non-anchor carrier is greater than that of transmission of the SIB1 on the anchor carrier, or a repetition number of transmission of the SIB1 on the non-anchor carrier is the same as that of transmission of the SIB1 on the anchor carrier. However, in the repetition period in which the SIB1 is transmitted on the anchor carrier once, transmission of the SIB1 on the non-anchor carrier requires more transmission resources than transmission of the SIB1 on the anchor carrier. The transmission resources are, for example, subframes.

Therefore, for the implementation 2, with reference to the operation mode of the carrier, specific implementation of transmission of the SIB1 may be indicated by using one bit, as shown in Table 7.

TABLE 7

| Field value | Meaning |
| --- | --- |
| 0 | The SIB1 is transmitted on the anchor carrier and the non-anchor carrier. The non-anchor carrier used to transmit the SIB1 is at a high frequency location of the anchor carrier.<br>When the operation mode is a standalone operation mode, the SIB1 is transmitted on the subframe 0 of the anchor carrier, and a repetition number is N/2; or the SIB1 is transmitted on a subframe Y of the non-anchor carrier, and a repetition number is N/2.<br>When the operation mode is an in-band operation mode or a guard-band operation mode, the SIB1 is transmitted on the subframe 0 of the anchor carrier, and a repetition number is N/2; or the SIB1 is transmitted on a subframe Y of the non-anchor carrier, and a repetition number is N. |
| 1 | The SIB1 is transmitted on the anchor carrier and the non-anchor carrier. The non-anchor carrier used to transmit the SIB1 is at a low frequency location of the anchor carrier.<br>When the operation mode is a standalone operation mode, the SIB1 is transmitted on the subframe 0 of the anchor carrier, and a repetition number is N/2; or the SIB1 is transmitted on a subframe Y of the non-anchor carrier, and a repetition number is N/2.<br>When the operation mode is an in-band operation mode or a guard-band operation mode, the SIB1 is transmitted on the subframe 0 of the anchor carrier, and a repetition number is N/2; or the SIB1 is transmitted on a subframe Y of the non-anchor carrier, and a repetition number is N. |

For the implementation 3, with reference to the operation mode of the carrier, a frequency domain offset between the non-anchor carrier used to transmit the SIB1 and the anchor carrier may be predefined by using a standard protocol or with an operator. Specific implementation of transmission of the SIB1 may be indicated by using two bits, as shown in Table 8.

TABLE 8

| Field value | Meaning |
| --- | --- |
| 00 | The SIB1 is transmitted only on the subframe 0 of the anchor carrier, and a repetition number is N. |
| 01 | The SIB1 is transmitted only on a subframe X1 of the anchor carrier, and a repetition number is N. |
| 10 | The SIB1 is transmitted on the anchor carrier and the non-anchor carrier. The non-anchor carrier used to transmit the SIB1 is at a high frequency location of the anchor carrier.<br>When the operation mode is a standalone operation mode, the SIB1 is transmitted on the subframe 0 of the anchor carrier, and a repetition number is N/2; or the SIB1 is transmitted on a subframe Y1 of the non-anchor carrier, and a repetition number is N/2.<br>When the operation mode is an in-band operation mode or a guard-band operation mode, the SIB1 is transmitted on the subframe 0 of the anchor carrier, and a repetition number is N/2; or the SIB1 is transmitted on a subframe Y1 of the non-anchor carrier, and a repetition number is N. |

TABLE 8-continued

| Field value | Meaning |
|---|---|
| 11 | The SIB1 is transmitted on the anchor carrier and the non-anchor carrier. The non-anchor carrier used to transmit the SIB1 is at a low frequency location of the anchor carrier.<br>When the operation mode is a standalone operation mode, the SIB1 is transmitted on the subframe 0 of the anchor carrier, and a repetition number is N/2; or the SIB1 is transmitted on a subframe Y1 of the non-anchor carrier, and a repetition number is N/2.<br>When the operation mode is an in-band operation mode or a guard-band operation mode, the SIB1 is transmitted on the subframe 0 of the anchor carrier, and a repetition number is N/2; or the SIB1 is transmitted on a subframe Y1 of the non-anchor carrier, and a repetition number is N. |

For the implementation 4, with reference to the operation mode of the carrier, a frequency domain offset between the non-anchor carrier used to transmit the SIB1 and the anchor carrier may be predefined by using a standard protocol or with an operator. Specific implementation of transmission of the SIB1 may be indicated by using two bits, as shown in Table 9.

TABLE 9

| Field value | Meaning |
|---|---|
| 00 | The SIB1 is transmitted only on the subframe 0 of the anchor carrier, and a repetition number is N. |
| 01 | The SIB1 is transmitted only on the subframe X2 of the anchor carrier, and a repetition number is N. |
| 10 | The SIB1 is transmitted only on a non-anchor carrier. The non-anchor carrier used to transmit the SIB1 is at a high frequency location of the anchor carrier.<br>When the operation mode is a standalone operation mode, the SIB1 is transmitted on a subframe Y2 of the non-anchor carrier, and a repetition number is N.<br>When the operation mode is an in-band operation mode or a guard-band operation mode, the SIB1 is transmitted on a subframe Y2 of the non-anchor carrier, a repetition number is 2N. In the repetition period in which the SIB1 is transmitted on the anchor carrier once, transmission of the SIB1 on the non-anchor carrier requires more subframes than transmission of the SIB1 on the anchor carrier.<br>Alternatively, the SIB1 is transmitted on a subframe Y21 and a subframe Y22 in a same radio frame of the non-anchor carrier, and a repetition number is N. In the repetition period in which the SIB1 is transmitted on the anchor carrier once, transmission of the SIB1 on the non-anchor carrier requires more subframes than transmission of the SIB1 on the anchor carrier. |
| 11 | The SIB1 is transmitted only on the non-anchor carrier. The non-anchor carrier used to transmit the SIB1 is at a low frequency location of the anchor carrier.<br>When the operation mode is a standalone operation mode, the SIB1 is transmitted on a subframe Y2 of the non-anchor carrier, and a repetition number is N.<br>When the operation mode is an in-band operation mode or a guard-band operation mode, the SIB1 is transmitted on a subframe Y2 of the non-anchor carrier, a repetition number is 2N. In the repetition period in which the SIB1 is transmitted on the anchor carrier once, transmission of the SIB1 on the non-anchor carrier requires more subframes than transmission of the SIB1 on the anchor carrier.<br>Alternatively, the SIB1 is transmitted on a subframe Y21 and a subframe Y22 in a same radio frame of the non-anchor carrier, and a repetition number is N. In the repetition period in which the SIB1 is transmitted on the anchor carrier once, transmission of the SIB1 on the non-anchor carrier requires more subframes than transmission of the SIB1 on the anchor carrier. |

When the repetition number N is less than N0, N0 may be set based on a timing requirement. The SIB1 is transmitted only on a subframe 0 of an anchor carrier, and the repetition number is N. When the repetition number N is greater than or equal to N0, the SIB1 is transmitted on the anchor carrier and a non-anchor carrier. Transmission mode information of the SIB1 on the non-anchor carrier used to transmit the SIB1 is bound to an operation mode of a carrier. For example, a value of N includes 4, 8, or 16, and N0 may be 16.

When the operation mode of the carrier is a standalone operation mode, the SIB1 is transmitted on a subframe 0 of Implementation 6

A repetition number N of a SIB1 may be obtained based on scheduling information of the SIB1 in a MIB message.

the anchor carrier, and a repetition number is N/2; or the SIB1 is transmitted on a subframe Y4 of the non-anchor carrier, and a repetition number is N/2.

When the operation mode of the carrier is an in-band operation mode or a guard-band operation mode, the SIB1s transmitted on a subframe 0 of the anchor carrier, and a repetition number is N/2; or the SIB1 is transmitted on a subframe Y4 of the non-anchor carrier, and a repetition number is N. The subframe Y4 for transmitting the SIB1 on the non-anchor carrier may be predefined by using a standard protocol or with an operator, where the subframe Y4 may be a subframe 0, a subframe 1, a subframe 3, a subframe 4, a subframe 5, a subframe 6, a subframe 7, a subframe 8, or a subframe 9.

Implementation 7

A repetition number N of a SIB1 may be obtained based on scheduling information of the SIB1 in a MIB message. When the repetition number N is less than N1, N1 may be set based on a timing requirement. The SIB1 is transmitted only on a subframe 0 of an anchor carrier, and the repetition number is N. When the repetition number N is greater than or equal to N1, the SIB1 is transmitted only on a non-anchor carrier. Transmission mode information of the SIB1 on the non-anchor carrier used to transmit the SIB1 is bound to an operation mode of a carrier. For example, a value of N includes 4, 8, or 16, and N1 may be 16.

When the operation mode of the carrier is a standalone operation mode, the SIB1 is transmitted on a subframe Y5 of the non-anchor carrier, and the repetition number is N.

When the operation mode is an in-band operation mode or a guard-band operation mode, the SIB1 is transmitted on the subframe Y5 of the non-anchor carrier, and the repetition number is 2N; or the SIB1 is transmitted on a subframe Y51 and a subframe Y52 that are in a same radio frame of the non-anchor carrier, and the repetition number is N. The subframe Y5 for transmitting the SIB1 on the non-anchor carrier may be predefined by using a standard protocol or with an operator. The subframe Y5, the subframe Y51, and the subframe Y52 each may be a subframe 0, a subframe 1, a subframe 3, a subframe 4, a subframe 5, a subframe 6, a subframe 7, a subframe 8, or a subframe 9.

In the foregoing embodiments of this application, it is indicated in the MIB message that the SIB1 may be transmitted on another subframe, different from the subframe 0, of the anchor carrier, and the SIB1 may be transmitted on the non-anchor carrier, thereby avoiding mutual interference between transmission of SIB1s of different cells, and improving transmission reliability of the SIB1. In addition, signaling overheads of the MIB message may be reduced through agreement or through implicit indication performed by using other information in the MIB message.

Figure 7:
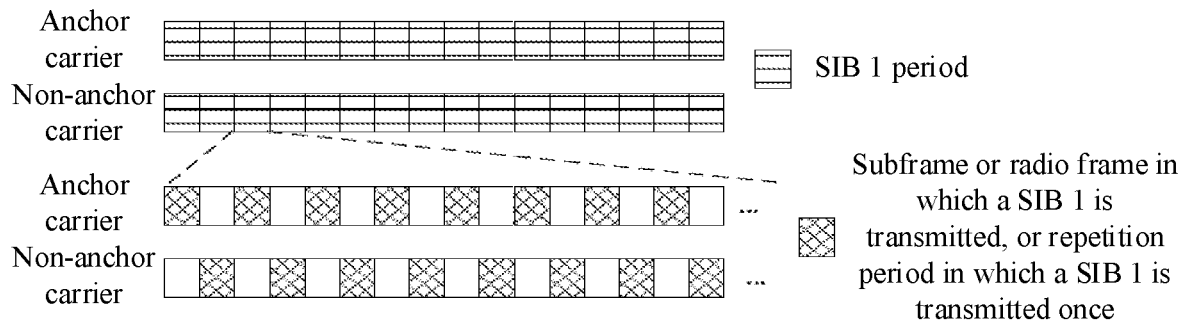
FIG. 7 is a schematic diagram of a system message transmission mode according to this application.

If the SIB1 is transmitted on the anchor carrier and the non-anchor carrier, the SIB1 is alternately transmitted on the anchor carrier and the non-anchor carrier based on a subframe level, a radio frame level, and a repetition period level of single transmission of the SIB1 on the anchor carrier, as shown in FIG. 7. In this manner, the SIB1 is transmitted more compactly in time. This helps reduce a delay and power consumption.

Figure 8:
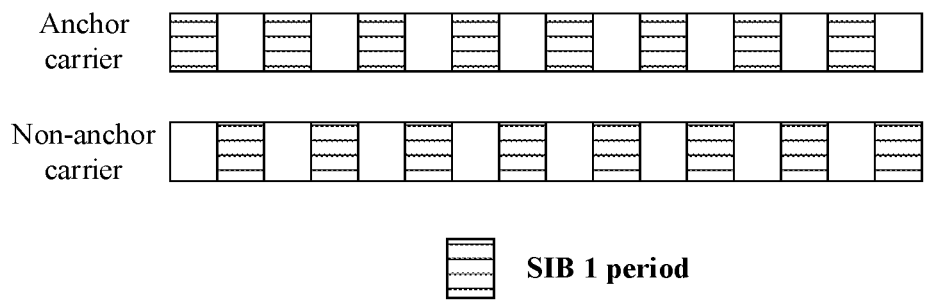
FIG. 8 is a schematic diagram of another system message transmission mode according to this application.

Alternatively, a time difference between transmission of the SIB1 on the anchor carrier and transmission of the SIB1 on the non-anchor carrier is a length of at least one period, as shown in FIG. 8. In this manner, the SIB1 is transmitted in series on the anchor carrier and the non-anchor carrier, and complexity is low.

The following are apparatus embodiments of this application, and the apparatus embodiments may be used to execute the foregoing method embodiments. For details that are not disclosed in the apparatus embodiments, refer to the method embodiments.

Figure 9:
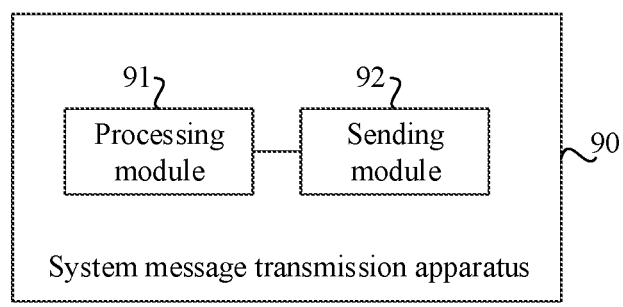
FIG. 9 is a schematic structural diagram of a system message transmission apparatus according to an embodiment of this application.

FIG. 9 is a schematic structural diagram of a system message transmission apparatus according to an embodiment of this application. As shown in FIG. 9, the system message transmission apparatus 90 includes a processing module 91 and a sending module 92. The system message transmission apparatus 90 may be specifically the first communications device in the foregoing embodiments.

The processing module 91 is adapted to configure a master information block MIB message. The MIB message includes scheduling information of a SIB1, or the MIB message includes the scheduling information and at least one of an operation mode of a carrier and first information. The first information includes at least one of the following information: status information used to transmit the SIB1, time domain position information used to transmit the SIB1, frequency domain position information of a non-anchor carrier used to transmit the SIB1, and transmission mode information of the SIB1 on the non-anchor carrier used to transmit the SIB1.

The sending module 92 is adapted to send the MIB message to a second communications device.

The processing module 91 is further adapted to transmit, by using the sending module 92, the SIB1 to the second communications device based on the scheduling information, or based on the scheduling information and at least one of the operation mode of the carrier and the first information.

The apparatus in this embodiment may be adapted to perform the steps performed by the first communications device in the system message transmission methods provided in the foregoing embodiments. Their specific implementation principles and technical effects are similar, and details are not described herein again.

Optionally, the first information includes the status information used to transmit the SIB1. The status information includes one of the following states: the SIB1 is transmitted only on an anchor carrier, and the SIB1 is transmitted only on a non-anchor carrier; or the status information includes one of the following states: the SIB1s transmitted only on an anchor carrier, and the SIB1 is transmitted on an anchor carrier and a non-anchor carrier.

The processing module 91 may be specifically adapted to transmit, by using the sending module 92 and based on the scheduling information and the status information, the SIB1 to the second communications device on the anchor carrier and/or the non-anchor carrier. When determining to transmit the SIB1 on the non-anchor carrier, the processing module 91 is further adapted to determine the non-anchor carrier used to transmit the SIB1.

Optionally, the first information further includes time domain position information used to transmit the SIB1. The time domain position information used to transmit the SIB1 includes one of the following locations: a subframe location, a radio frame location, a hyper frame location, a symbol location, and a slot location.

In this case, when the first communications device determines to transmit the SIB1 to the second communications device on the anchor carrier and/or the non-anchor carrier based on the scheduling information and the status information, the processing module 91 is specifically adapted to: determine, based on the scheduling information, the status information, and the time domain position information, to transmit, by using the sending module 92, the SIB1 to the second communications device at a time domain position that is indicated by the time domain position information and that is on the anchor carrier and/or the non-anchor carrier used to transmit the SIB1.

Optionally, the first information includes the time domain position information used to transmit the SIB1. The time domain position information includes one of the following locations: a subframe location, a radio frame location, a hyper frame location, a symbol location, and a slot location.

The processing module 91 may be specifically adapted to: determine a carrier used to transmit the SIB1, where the carrier includes the anchor carrier and/or the non-anchor carrier used to transmit the SIB1; and transmit, by using the sending module 92, the SIB1 to the second communications device based on the scheduling information at a time domain position that is indicated by the time domain position information and that is on the anchor carrier and/or the non-anchor carrier used to transmit the SIB1.

Optionally, the first information includes frequency domain position information of the non-anchor carrier used to transmit the SIB1. The frequency domain position information of the non-anchor carrier used to transmit the SIB1 includes at least one of the following parameters: a relative location of the non-anchor carrier used to transmit the SIB1 relative to an anchor carrier; and a frequency-domain offset between the non-anchor carrier used to transmit the SIB1 and the anchor carrier. The frequency-domain offset is a frequency domain interval or the quantity of resource blocks.

The processing module 91 may be specifically adapted to: determine the non-anchor carrier used to transmit the SIB1; determine, based on the frequency domain position information and the anchor carrier, a frequency domain position of the non-anchor carrier used to transmit the SIB1; and transmit, by using the sending module 92 and based on the scheduling information, the SIB1 on the non-anchor carrier that corresponds to the frequency domain position and that is used to transmit the SIB1; or transmit, by using the sending module and based on the scheduling information, the SIB1 to the second communications device on the anchor carrier and the non-anchor carrier that corresponds to the frequency domain position and that is used to transmit the SIB1.

Optionally, the first information includes the transmission mode information of the SIB1 on the non-anchor carrier used to transmit the SIB1. The transmission mode information includes a repetition number of the SIB1 on the non-anchor carrier used to transmit the SIB1.

The processing module 91 is specifically adapted to: determine the non-anchor carrier used to transmit the SIB1; and transmit, by using the sending module 92 and based on the repetition number and the scheduling information, the SIB1 to the second communications device on the non-anchor carrier used to transmit the SIB1; or transmit, by using the sending module 92 and based on the scheduling information, the SIB1 to the second communications device on the anchor carrier, and transmit, by using the sending module 92 and based on the scheduling information and the repetition number, the SIB1 to the second communications device on the non-anchor carrier used to transmit the SIB1.

Optionally, the first information includes the transmission mode information of the SIB1 on the non-anchor carrier used to transmit the SIB1. The transmission mode information includes resource indication information. The resource indication information is used to indicate: when the repetition number of the SIB1 on the non-anchor carrier used to transmit the SIB1 is the same as the repetition number of the SIB1 on the anchor carrier, in a repetition period in which the SIB1 is transmitted on the anchor carrier once, whether transmission of the SIB1 on the non-anchor carrier used to transmit the SIB1 requires more transmission resources than transmission of the SIB1 on the anchor carrier. The transmission resource is one of a subframe, a radio frame, a hyper frame, a symbol, or a slot.

The processing module 91 may be specifically adapted to: determine the non-anchor carrier used to transmit the SIB1; determine, based on the resource indication information, a transmission resource that is used to transmit the SIB1 and that is on the non-anchor carrier used to transmit the SIB1; and transmit, by using the sending module 92 and the transmission resource that is used to transmit the SIB1 and that is on the non-anchor carrier used to transmit the SIB1, the SIB1 to the second communications device based on the scheduling information; or transmit, by using the sending module 92 and the transmission resource that is used to transmit the SIB1 and that is on the non-anchor carrier used to transmit the SIB1, the SIB1 to the second communications device on the anchor carrier based on the scheduling information.

Optionally, some repetition number values in a repetition number set correspond to a first state, and the first state is that the SIB1 is transmitted only on an anchor carrier; and other repetition number values in the repetition number set correspond to a second state, and the second state is that the SIB1 is transmitted only on a non-anchor carrier or the SIB1 is transmitted on an anchor carrier and a non-anchor carrier. The scheduling information is used to determine a transport block size used to transmit the SIB1 and a repetition number.

The processing module 91 may be specifically adapted to: determine that the repetition number corresponds to the first state or the second state; and transmit, by using the sending module 92 and based on the first state or the second state, the SIB1 to the second communications device on the anchor carrier and/or the non-anchor carrier.

When determining to transmit the SIB1 on the non-anchor carrier, the processing module 91 is further adapted to determine the non-anchor carrier used to transmit the SIB1.

Optionally, some repetition number values in a repetition number set correspond to a first state, and the first state is that the SIB1s transmitted only on an anchor carrier; and a second state corresponding to other repetition number values in the repetition number set is determined based on the status information used to transmit the SIB1, and the second state is that the SIB1 is transmitted only on a non-anchor carrier or the SIB1 is transmitted only on an anchor carrier. The scheduling information is used to determine a transport block size used to transmit the SIB1 and a repetition number. When the repetition number in the scheduling information corresponds to the first state, the MIB message includes the scheduling information of the SIB1 and the operation mode of the carrier. When the repetition number in the scheduling information corresponds to the second state, the MIB message includes the scheduling information of the SIB1, the operation mode of the carrier, and the first information including the status information used to transmit the SIB1.

The processing module 91 is specifically adapted to: when the repetition number in the scheduling information belongs to the some repetition number values, transmit, by using the sending module 92, the SIB1 to the second communications device on the anchor carrier based on the first state corresponding to the some repetition number values and the scheduling information; or when the repetition number in the scheduling information belongs to the other repetition number values, transmit, by using the sending module 92, the SIB1 to the second communications device on the anchor carrier based on the scheduling information, or transmit, by using the sending module 92, the SIB1 to the second communications device on the non-anchor carrier based on the scheduling information, the operation mode of the carrier, and the status information that is in the first information and that is used to transmit the SIB1.

When transmitting the SIB1 on the non-anchor carrier, the processing module 91 is further adapted to determine the non-anchor carrier used to transmit the SIB1.

Further, the operation mode of the carrier includes operation mode information of the non-anchor carrier used to transmit the SIB1, or the operation mode of the carrier includes an operation mode of the anchor carrier and operation mode information of the non-anchor carrier used to transmit the SIB1.

That the processing module 91 is adapted to transmit, by using the sending module 92, the SIB1 to the second communications device on the non-anchor carrier used to transmit the SIB1, based on the scheduling information, the operation mode of the carrier, and the status information that is in the first information and that is used to transmit the SIB1 is specifically:

determining, based on the operation mode of the carrier, an operation mode of the non-anchor carrier used to transmit the SIB1, where the determined operation mode is one of a standalone operation mode, a guard-band operation mode, and an in-band operation mode; and determining, based on the standalone operation mode, that a transmission resource of the SIB1 on the non-anchor carrier used to transmit the SIB1 is the same as a transmission resource of the SIB1 on the anchor carrier; and transmitting, by using the sending module 92 and based on the scheduling information and the transmission resource of the SIB1 on the non-anchor carrier, the SIB1 to the second communications device on the non-anchor carrier used to transmit the SIB1; or determining, based on the guard-band operation mode or the in-band operation mode, a transmission resource of the SIB1 on the non-anchor carrier used to transmit the SIB1; and transmitting, by using the sending module 92, the SIB1 to the second communications device based on the scheduling information and the transmission resource of the SIB1 on the non-anchor carrier used to transmit the SIB1.

Optionally, the operation mode of the carrier includes operation mode information of the non-anchor carrier used to transmit the SIB1, or the operation mode of the carrier includes an operation mode of the anchor carrier and operation mode information of the non-anchor carrier used to transmit the SIB1.

The processing module 91 is specifically adapted to:

determine, based on the operation mode of the carrier, an operation mode of the non-anchor carrier used to transmit the SIB1, where the determined operation mode includes one of a standalone operation mode, a guard-band operation mode, and an in-band operation mode;

determine, based on the standalone operation mode, that a repetition number of the SIB1 on the non-anchor carrier is the same as a repetition number of the SIB1 on an anchor carrier; and transmit, by using the sending module 92 and based on the scheduling information and the repetition number, the SIB1 on the non-anchor carrier used to transmit the SIB1; or transmit, by using the sending module 92 and based on the scheduling information, the SIB1 to the second communications device on the anchor carrier, and transmit, by using the sending module 92 and based on the repetition number and the scheduling information, the SIB1 to the second communications device on the non-anchor carrier used to transmit the SIB1; or determine, based on the standalone operation mode, that a transmission resource of the SIB1 on the non-anchor carrier used to transmit the SIB1 is the same as a transmission resource of the SIB1 on an anchor carrier; and transmit, by using the sending module 92, the SIB1 on the non-anchor carrier based on the scheduling information and the transmission resource; or transmit, by using the sending module 92 and based on the scheduling information, the SIB1 to the second communications device on the anchor carrier, and transmit, by using the sending module 92, the SIB1 to the second communications device on the non-anchor carrier based on the scheduling information and the transmission resource; or determine a repetition number of the SIB1 on the non-anchor carrier based on the guard-band operation mode or the in-band operation mode; and transmit, by using the sending module 92, the SIB1 to the second communications device on the non-anchor carrier based on the repetition number of the SIB1 on the non-anchor carrier and the scheduling information; or transmit, by using the sending module 92 and based on the scheduling information, the SIB1 to the second communications device on the anchor carrier, and transmit, by using the sending module 92, the SIB1 to the second communications device on the non-anchor carrier based on the repetition number of the SIB1 on the non-anchor carrier and the scheduling information; or determine a transmission resource of the SIB1 on the non-anchor carrier based on the guard-band operation mode or the in-band operation mode; and transmit, by using the sending module 92, the SIB1 to the second communications device on the non-anchor carrier based on the transmission resource of the SIB1 on the non-anchor carrier; or transmit, by using the sending module 92 and based on the scheduling information, the SIB1 to the second communications device on the anchor carrier, and transmit, by using the sending module 92, the SIB1 to the second communications device on the non-anchor carrier based on the scheduling information and the transmission resource of the SIB1 on the non-anchor carrier.

When transmitting the SIB1 on the non-anchor carrier, the processing module 91 is further adapted to determine the non-anchor carrier used to transmit the SIB1.

Further, the first information further includes frequency domain position information of the non-anchor carrier used to transmit the SIB1. The frequency domain position information includes at least one of the following parameters: a relative location of the non-anchor carrier used to transmit the SIB1 relative to an anchor carrier; and a frequency-domain offset between the non-anchor carrier used to transmit the SIB1 and the anchor carrier. The frequency-domain offset is a frequency domain interval or the quantity of resource blocks.

When determining the non-anchor carrier used to transmit the SIB1, the processing module 91 is specifically adapted to:

determine, based on the anchor carrier and the frequency domain position information of the non-anchor carrier, a frequency domain position of the non-anchor carrier used to transmit the SIB1; and determine a non-anchor carrier corresponding to the frequency domain position.

Figure 10:
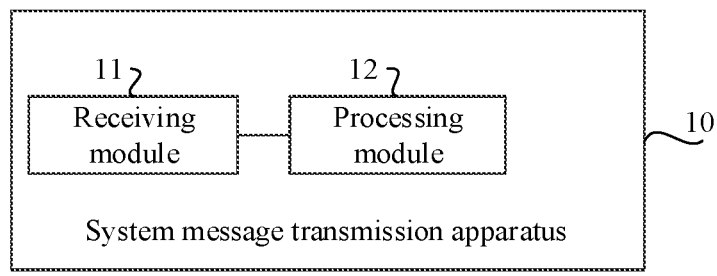
FIG. 10 is a schematic structural diagram of a system message transmission apparatus according to another embodiment of this application.

FIG. 10 is a schematic structural diagram of a system message transmission apparatus according to another embodiment of this application. As shown in FIG. 10, the system message transmission apparatus 10 includes a receiving module 11 and a processing module 12. The system message transmission apparatus 10 may be specifically the second communications device in the foregoing embodiments.

Specifically, the receiving module 11 is adapted to receive a master information block MIB message from a first communications device.

The MIB message includes scheduling information of a SIB1, or the MIB message includes the scheduling information and at least one of an operation mode of a carrier and first information. The first information includes at least one of the following information: status information used to transmit the SIB1, time domain position information used to transmit the SIB1, frequency domain position information of a non-anchor carrier used to transmit the SIB1, and transmission mode information of the SIB1 on the non-anchor carrier used to transmit the SIB1.

The processing module 12 is adapted to receive, by using the receiving module 11, the SIB1 from the first communications device based on the scheduling information, or based on the scheduling information and at least one of the operation mode of the carrier and the first information.

The apparatus in this embodiment may be adapted to perform the steps performed by the second communications device in the system message transmission methods provided in the foregoing embodiments. Their specific implementation principles and technical effects are similar, and details are not described herein again.

Optionally, the first information includes the status information used to transmit the SIB1. The status information includes one of the following states: the SIB1 is transmitted only on an anchor carrier, and the SIB1 is transmitted only on a non-anchor carrier; or the status information includes one of the following states: the SIB1 is transmitted only on an anchor carrier, and the SIB1 is transmitted on an anchor carrier and a non-anchor carrier.

The processing module 12 may be specifically adapted to:

determine to receive, by using the receiving module 11, the SIB1 from the first communications device on the anchor carrier and/or the non-anchor carrier based on the scheduling information and the status information.

When determining to receive the SIB1 from the first communications device on the non-anchor carrier, the processing module 12 is further adapted to determine a non-anchor carrier used to receive the SIB1.

Optionally, the first information further includes time domain position information used to transmit the SIB1. The time domain position information used to transmit the SIB1 includes one of the following locations: a subframe location, a radio frame location, a hyper frame location, a symbol location, and a slot location.

When determining to receive the SIB1 from the first communications device on the anchor carrier and/or the non-anchor carrier based on the scheduling information and the status information, the processing module 12 is specifically adapted to:

determine, based on the scheduling information, the status information, and the time domain position information, to receive, by using the receiving module 11, the SIB1 from the first communications device at a time domain position that is indicated by the time domain position information and that is on the anchor carrier and/or the non-anchor carrier used to transmit the SIB1.

Optionally, the first information includes the time domain position information used to transmit the SIB1. The time domain position information includes one of the following locations: a subframe location, a radio frame location, a hyper frame location, a symbol location, and a slot location.

The processing module 12 is specifically adapted to:

determine a carrier used to receive the SIB1, where the carrier includes an anchor carrier and/or a non-anchor carrier used to transmit the SIB1; and receive, by using the receiving module 11, the SIB1 from the first communications device based on the scheduling information at a time domain position that is indicated by the time domain position information and that is on the anchor carrier and/or the non-anchor carrier used to transmit the SIB1.

Optionally, the first information includes frequency domain position information of the non-anchor carrier used to transmit the SIB1. The frequency domain position information of the non-anchor carrier used to transmit the SIB1 includes at least one of the following parameters: a relative location of the non-anchor carrier used to transmit the SIB1 relative to an anchor carrier; and a frequency-domain offset between the non-anchor carrier used to transmit the SIB1 and the anchor carrier. The frequency-domain offset is a frequency domain interval or the quantity of resource blocks.

The processing module 12 is specifically adapted to:

determine a non-anchor carrier used to receive the SIB1;

determine, based on the frequency domain position information and the anchor carrier, a frequency domain position of the non-anchor carrier used to transmit the SIB1; and receive, by using the receiving module 11 and based on the scheduling information, the SIB1 from the first communications device on the non-anchor carrier that corresponds to the frequency domain position and that is used to transmit the SIB1; or receive, by using the receiving module 11 and based on the scheduling information, the SIB1 from the first communications device on the anchor carrier and the non-anchor carrier that corresponds to the frequency domain position and that is used to transmit the SIB1.

Optionally, the first information includes the transmission mode information of the SIB1 on the non-anchor carrier used to transmit the SIB1. The transmission mode information includes a repetition number of the SIB1 on the non-anchor carrier used to transmit the SIB1.

The processing module 12 is specifically adapted to:

determine the non-anchor carrier used to transmit the SIB1; and receive, by using the receiving module 11 and based on the repetition number and the scheduling information, the SIB1 from the first communications device on the non-anchor carrier used to transmit the SIB1; or receive, by using the receiving module 11 and based on the scheduling information, the SIB1 from the first communications device on the anchor carrier, and receive, by using the receiving module 11 and based on the scheduling information and the repetition number, the SIB1 from the first communications device on the non-anchor carrier used to transmit the SIB1.

Optionally, the first information includes the transmission mode information of the SIB1 on the non-anchor carrier used to transmit the SIB1. The transmission mode information includes resource indication information. The resource indication information is used to indicate: when the repetition number of the SIB1 on the non-anchor carrier used to transmit the SIB1 is the same as the repetition number of the SIB1 on the anchor carrier, in a repetition period in which the SIB1 is transmitted on the anchor carrier once, whether transmission of the SIB1 on the non-anchor carrier used to transmit the SIB1 requires more transmission resources than transmission of the SIB1 on the anchor carrier. The transmission resource is one of a subframe, a radio frame, a hyper frame, a symbol, or a slot.

The processing module 12 is specifically adapted to:

determine the non-anchor carrier used to transmit the SIB1;

determine, based on the resource indication information, a transmission resource that is used to transmit the SIB1 and that is on the non-anchor carrier used to transmit the SIB1; and receive, by using the receiving module 11 and the transmission resource that is used to transmit the SIB1 and that is on the non-anchor carrier used to transmit the SIB1, the SIB1 from the first communications device based on the scheduling information; or receive, by using the receiving module 11, the SIB1 from the first communications device on the anchor carrier based on the scheduling information, and receive, by using the receiving module 11 and the transmission resource that is used to transmit the SIB1 and that is on the non-anchor carrier used to transmit the SIB1, the SIB1 from the first communications device based on the scheduling information.

Optionally, some repetition number values in a repetition number set correspond to a first state, and the first state is that the SIB1 is transmitted only on an anchor carrier; and other repetition number values in the repetition number set correspond to a second state, and the second state is that the SIB1 is transmitted only on a non-anchor carrier or the SIB1 is transmitted on an anchor carrier and a non-anchor carrier. The scheduling information is used to determine a transport block size used to transmit the SIB1 and a repetition number.

The processing module 12 is specifically adapted to:

determine that the repetition number corresponds to the first state or the second state; and receive, by using the receiving module 11 and based on the first state or the second state, the SIB1 from the first communications device on the anchor carrier and/or the non-anchor carrier.

When determining to receive the SIB1 from the first communications device on the non-anchor carrier, the processing module 12 is further adapted to determine a non-anchor carrier used to receive the SIB1.

Optionally, some repetition number values in a repetition number set correspond to a first state, and the first state is that the SIB1 is transmitted only on an anchor carrier; and a second state corresponding to other repetition number values in the repetition number set is determined based on the status information used to transmit the SIB1, and the second state is that the SIB1 is transmitted only on a non-anchor carrier or the SIB1 is transmitted only on an anchor carrier. The scheduling information is used to determine a transport block size used to transmit the SIB1 and a repetition number. When the repetition number in the scheduling information corresponds to the first state, the MIB message includes the scheduling information of the SIB1 and the operation mode of the carrier. When the repetition number in the scheduling information corresponds to the second state, the MIB message includes the scheduling information of the SIB1, the operation mode of the carrier, and the first information including the status information used to transmit the SIB1.

The processing module 12 is specifically adapted to:

when the repetition number in the scheduling information belongs to the some repetition number values, receive, by using the receiving module 11, the SIB1 from the first communications device on the anchor carrier based on the first state corresponding to the some repetition number values and the scheduling information; or when the repetition number in the scheduling information belongs to the other repetition number values, receive, by using the receiving module 11, the SIB1 from the first communications device on the anchor carrier based on the scheduling information, or receive, by using the receiving module 11, the SIB1 from the first communications device on the non-anchor carrier based on the scheduling information, the operation mode of the carrier, and the status information that is in the first information and that is used to transmit the SIB1.

When receiving the SIB1 from the first communications device on the non-anchor carrier, the processing module 12 is further adapted to determine a non-anchor carrier used to receive the SIB1.

Further, the operation mode of the carrier includes operation mode information of the non-anchor carrier used to transmit the SIB1, or the operation mode of the carrier includes an operation mode of the anchor carrier and operation mode information of the non-anchor carrier used to transmit the SIB1.

That the processing module 12 is adapted to receive, by using the receiving module 11, the SIB1 from the first communications device on the non-anchor carrier used to transmit the SIB1, based on the scheduling information, the operation mode of the carrier, and the status information that is in the first information and that is used to transmit the SIB1 is specifically:

determining, based on the operation mode of the carrier, an operation mode of the non-anchor carrier used to transmit the SIB1, where the determined operation mode is one of a standalone operation mode, a guard-band operation mode, and an in-band operation mode;

determining, based on the standalone operation mode, that a transmission resource of the SIB1 on the non-anchor carrier is the same as a transmission resource of the SIB1 on an anchor carrier; and receiving, by using the receiving module 11 and based on the scheduling information and the transmission resource of the SIB1 on the non-anchor carrier, the SIB1 from the first communications device on the non-anchor carrier used to transmit the SIB1; or determining, based on the guard-band operation mode or the in-band operation mode, a transmission resource of the SIB1 on the non-anchor carrier used to transmit the SIB1; and receiving, by using the receiving module 11 and based on the scheduling information and the transmission resource of the SIB1 on the non-anchor carrier used to transmit the SIB1, the SIB1 from the first communications device on the non-anchor carrier used to transmit the SIB1.

Optionally, the operation mode of the carrier includes operation mode information of the non-anchor carrier used to transmit the SIB1, or the operation mode of the carrier includes an operation mode of the anchor carrier and operation mode information of the non-anchor carrier used to transmit the SIB1.

The processing module 12 is specifically adapted to:

determine, based on the operation mode of the carrier, an operation mode of the non-anchor carrier used to transmit the SIB1, where the determined operation mode includes one of a standalone operation mode, a guard-band operation mode, and an in-band operation mode;

determine, based on the standalone operation mode, that a repetition number of the SIB1 on the non-anchor carrier is the same as a repetition number of the SIB1 on an anchor carrier; and receive, by using the receiving module 11 and based on the scheduling information and the repetition number, the SIB1 from the first communications device on the non-anchor carrier used to transmit the SIB1; or receive, by using the receiving module 11 and based on the scheduling information, the SIB1 from the first communications device on the anchor carrier, and receive, by using the receiving module 11 and based on the repetition number and the scheduling information, the SIB1 from the first communications device on the non-anchor carrier used to transmit the SIB1; or determine, based on the standalone operation mode, that a transmission resource of the SIB1 on the non-anchor carrier used to transmit the SIB1 is the same as a transmission resource of the SIB1 on an anchor carrier; and receive, by using the receiving module 11, the SIB1 from the first communications device on the non-anchor carrier based on the scheduling information and the transmission resource; or receive, by using the receiving module 11 and based on the scheduling information, the SIB1 from the first communications device on the anchor carrier, and receive, by using the receiving module 11 and based on the transmission resource and the scheduling information, the SIB1 from the first communications device on the non-anchor carrier; or determine a repetition number of the SIB1 on the non-anchor carrier based on the guard-band operation mode or the in-band operation mode; and receive, by using the receiving module 11 and based on the scheduling information and the repetition number of the SIB1 on the non-anchor carrier, the SIB1 from the first communications device on the non-anchor carrier; or receive, by using the receiving module 11, the SIB1 from the first communications device on the anchor carrier based on the scheduling information, and receive, by using the receiving module 11, the SIB1 from the first communications device on the non-anchor carrier based on the repetition number of the SIB1 on the non-anchor carrier and the scheduling information; or determine a transmission resource of the SIB1 on the non-anchor carrier based on the guard-band operation mode or the in-band operation mode; and receive, by using the receiving module 11 and based on the scheduling information and the transmission resource of the SIB1 on the non-anchor carrier, the SIB1 from the first communications device on the non-anchor carrier; or receive, by using the receiving module 11 and based on the scheduling information, the SIB1 from the first communications device on the anchor carrier, and receive, by using the receiving module 11, the SIB1 from the first communications device on the non-anchor carrier based on the scheduling information and the transmission resource of the SIB1 on the non-anchor carrier.

When receiving the SIB1 from the first communications device on the non-anchor carrier, the processing module 12 is further adapted to determine a non-anchor carrier used to receive the SIB1.

Further, the first information further includes frequency domain position information of the non-anchor carrier used to transmit the SIB1. The frequency domain position information includes at least one of the following parameters: a relative location of the non-anchor carrier used to transmit the SIB1 relative to an anchor carrier; and a frequency-domain offset between the non-anchor carrier used to transmit the SIB1 and the anchor carrier. The frequency-domain offset is a frequency domain interval or the quantity of resource blocks.

When determining the non-anchor carrier used to receive the SIB1, the processing module 12 is specifically adapted to: determine, based on the anchor carrier and the frequency domain position information of the non-anchor carrier, a frequency domain position of the non-anchor carrier used to transmit the SIB1; and determine a non-anchor carrier corresponding to the frequency domain position.

Figure 11:
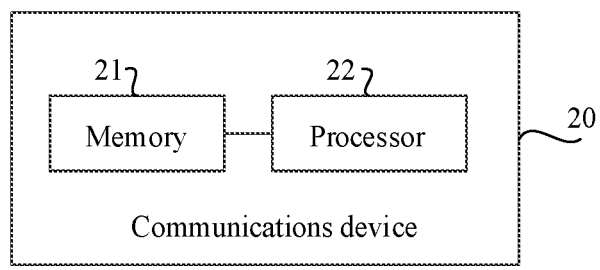
FIG. 11 is a schematic structural diagram of a communications device according to an embodiment of this application.

FIG. 11 is a schematic structural diagram of a communications device according to an embodiment of this application. As shown in FIG. 11, the communications device 20 includes a memory 21 and a processor 22. The communications device herein may be understood as the foregoing first communications device.

The memory 21 stores a computer program that can be executed by the processor 22.

The processor 22 executes the computer program to implement the steps performed by the first communications device in the foregoing method embodiments.

Figure 12:
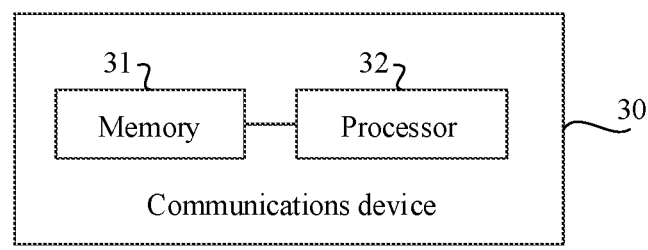
FIG. 12 is a schematic structural diagram of a communications device according to another embodiment of this application.

FIG. 12 is a schematic structural diagram of a communications device according to another embodiment of this application. As shown in FIG. 12, the communications device 30 includes a memory 31 and a processor 32. The communications device herein may be understood as the foregoing second communications device.

The memory 31 stores a computer program that can be executed by the processor 32.

The processor 32 executes the computer program to implement the steps performed by the second communications device in the foregoing method embodiments.

This application further provides a communications device, including at least one processing element (or chip) adapted to perform the method on the first communications device side.

This application further provides a communications device, including at least one processing element (or chip) adapted to perform the method on the second communications device side.

This application further provides a computer program. When being executed by a processor of a terminal device, the program is configured to perform the steps performed by the first communications device in the foregoing method embodiments.

This application further provides a computer program. When being executed by a processor of a network device, the program is configured to perform the steps performed by the second communications device in the foregoing method embodiments.

This application further provides a computer program product. The computer program product includes a computer program (that is, an executable instruction). The computer program is stored in a readable storage medium. At least one processor of a first communications device or a second communications device may read the computer program from the readable storage medium, and the at least one processor executes the computer program, so that the first communications device or the second communications device performs the methods provided in the foregoing implementations.

This application further provides a computer-readable storage medium. When an instruction in the computer-readable storage medium is executed by a processor of a communications device, the communications device is enabled to perform the steps performed by the first communications device in any one of the foregoing method embodiments.

This application further provides a computer-readable storage medium. When an instruction in the computer-readable storage medium is executed by a processor of a communications device, the communications device is enabled to perform the steps performed by the second communications device in any one of the foregoing method embodiments.

This application further provides a communications system, including the communications device 20 shown in FIG. 11 and the communications device 30 shown in FIG. 12.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A system message transmission method, comprising:
configuring, by a first communications device, a master information block (MIB) message, wherein
the MIB message comprises scheduling information of a system information block type 1 (SIB1) at least one of an operation mode of a carrier or first information; and
the first information comprises at least one of the following information: status information used to transmit the SIB1, time domain position information used to transmit the SIB1, or frequency domain position information of a non-anchor carrier used to transmit the SIB1; and
sending, by the first communications device, the MIB message to a second communications device; and
transmitting, by the first communications device, the SIB1 to the second communications device based on the scheduling information and at least one of the operation mode of the carrier or the first information.

2. The method according to claim 1, wherein
the first information comprises the status information used to transmit the SIB1, wherein
the status information comprises one of the following states: the SIB1 is transmitted only on an anchor carrier, or the SIB1 is transmitted only on a non-anchor carrier; and
the transmitting, by the first communications device, the SIB1 to the second communications device based on the scheduling information and the first information comprises:
determining, by the first communications device based on the scheduling information and the status information, to transmit the SIB1 to the second communications device on the anchor carrier or the non-anchor carrier; and
when the first communications device determines to transmit the SIB1 on the non-anchor carrier, determining, by the first communications device, the non-anchor carrier used to transmit the SIB1.

3. The method according to claim 1, wherein the first information comprises the frequency domain position information of the non-anchor carrier used to transmit the SIB1, and the frequency domain position information of the non-anchor carrier used to transmit the SIB1 comprises at least one of the following parameters:
a relative location of the non-anchor carrier used to transmit the SIB1 relative to an anchor carrier; or
a frequency-domain offset between the non-anchor carrier used to transmit the SIB1 and the anchor carrier, wherein the frequency-domain offset is a frequency domain interval or a quantity of resource blocks; and
the transmitting, by the first communications device, the SIB1 to the second communications device based on the scheduling information and the first information comprises:
determining, by the first communications device, that the SIB1 is transmitted on a non-anchor carrier;
determining, by the first communications device based on the frequency domain position information and the anchor carrier, a frequency domain position of the non-anchor carrier; and
transmitting, by the first communications device based on the scheduling information, the SIB1 on the non-anchor carrier that corresponds to the frequency domain position; or transmitting, by the first communications device based on the scheduling information, the SIB1 to the second communications device on the anchor carrier and the non-anchor carrier that corresponds to the frequency domain position.

4. A system message transmission method, comprising:
receiving, by a second communications device, a master information block (MIB) message from a first communications device, wherein the MIB message comprises scheduling information of a system information block type 1 (SIB1) and at least one of an operation mode of a carrier or first information, and the first information comprises at least one of the following information: status information used to transmit the SIB1, time domain position information used to transmit the SIB1, or frequency domain position information of a non-anchor carrier used to transmit the SIB1;
obtaining, by the second communications device, the scheduling information and the operation mode of the carrier based on the MIB message; and
receiving, by the second communications device, the SIB1 from the first communications device based on the obtained scheduling information and the operation mode of the carrier.

5. The method according to claim 4, wherein
the first information comprises the status information used to transmit the SIB1, wherein
the status information comprises one of the following states: the SIB1 is transmitted only on an anchor carrier, or the SIB1 is transmitted only on a non-anchor carrier; and
the receiving, by the second communications device, the SIB1 from the first communications device based on the scheduling information and the first information comprises:
determining, by the second communications device, to receive the SIB1 from the first communications device on the anchor carrier or the non-anchor carrier based on the scheduling information and the status information; and
when the second communications device determines to receive the SIB1 from the first communications device on the non-anchor carrier, determining, by the second communications device, the non-anchor carrier used to receive the SIB1.

6. The method according to claim 4, wherein the first information comprises the frequency domain position information of the non-anchor carrier used to transmit the SIB1, and the frequency domain position information of the non-anchor carrier used to transmit the SIB1 comprises at least one of the following parameters:
 a relative location of the non-anchor carrier used to transmit the SIB1 relative to an anchor carrier; or
 a frequency-domain offset between the non-anchor carrier used to transmit the SIB1 and the anchor carrier, wherein the frequency-domain offset is a frequency domain interval or a quantity of resource blocks; and
 the receiving, by the second communications device, the SIB1 from the first communications device based on the scheduling information and the first information comprises:
 determining, by the second communications device, that the SIB1 is received on the non-anchor carrier;
 determining, by the second communications device based on the frequency domain position information and the anchor carrier, a frequency domain position of the non-anchor carrier; and
 receiving, by the second communications device based on the scheduling information, the SIB1 from the first communications device on the non-anchor carrier that corresponds to the frequency domain position; or
 receiving, by the second communications device based on the scheduling information, the SIB1 from the first communications device on the anchor carrier and the non-anchor carrier that corresponds to the frequency domain position.

7. A system message transmission apparatus, wherein the system message transmission apparatus is a first communications device, and the system message transmission apparatus comprises:
 a processor, adapted to configure a master information block (MIB) message, wherein
 the MIB message comprises scheduling information of a system information block type 1 (SIB1) and at least one of an operation mode of a carrier or first information; and
 the first information comprises at least one of the following information: status information used to transmit the SIB1, time domain position information used to transmit the SIB1, or frequency domain position information of a non-anchor carrier used to transmit the SIB1; and
 a transmitter, adapted to send the MIB message to a second communications device, wherein
 the processor is further adapted to transmit, by using the transmitter, the SIB1 to the second communications device based on the scheduling information and at least one of the operation mode of the carrier or the first information.

8. The apparatus according to claim 7, wherein
 the first information comprises the status information used to transmit the SIB1, wherein
 the status information comprises one of the following states: the SIB1 is transmitted only on an anchor carrier, or the SIB1 is transmitted only on a non-anchor carrier; and
 the processor is adapted to:
 determine, using the transmitter and based on the scheduling information and the status information, to transmit the SIB1 to the second communications device on the anchor carrier or the non-anchor carrier; and
 when determining to transmit the SIB1 on the non-anchor carrier, the processor is further adapted to determine the non-anchor carrier used to transmit the SIB1.

9. The apparatus according to claim 7, wherein the first information comprises the frequency domain position information of the non-anchor carrier used to transmit the SIB1, and the frequency domain position information of the non-anchor carrier used to transmit the SIB1 comprises at least one of the following parameters:
 a relative location of the non-anchor carrier used to transmit the SIB1 relative to an anchor carrier; or
 a frequency-domain offset between the non-anchor carrier used to transmit the SIB1 and the anchor carrier, wherein the frequency-domain offset is a frequency domain interval or a quantity of resource blocks; and
 the processor is adapted to:
 determine that the SIB1 is transmitted on a non-anchor carrier;
 determine, based on the frequency domain position information and the anchor carrier, a frequency domain position of the non-anchor carrier; and
 transmit, using the transmitter and based on the scheduling information, the SIB1 on the non-anchor carrier that corresponds to the frequency domain position; or
 transmit, using the transmitter and based on the scheduling information, the SIB1 to the second communications device on the anchor carrier and the non-anchor carrier that corresponds to the frequency domain position.

10. A system message transmission apparatus, wherein the system message transmission apparatus is a second communications device, and the system message transmission apparatus comprises:
 a receiver, adapted to receive a master information block (MIB) message from a first communications device, wherein the MIB message comprises scheduling information of a system information block type 1 (SIB1) and at least one of an operation mode of a carrier or first information, and the first information comprises at least one of the following information: status information used to transmit the SIB1, time domain position information used to transmit the SIB1, or frequency domain position information of a non-anchor carrier used to transmit the SIB1; and
 a processor, adapted to obtain the scheduling information and the operation mode of the carrier based on the MIB message, and receive, using the receiver, the SIB1 from the first communications device based on the obtained scheduling information and the operation mode of the carrier.

11. The apparatus according to claim 10, wherein
 the first information comprises the status information used to transmit the SIB1, wherein
 the status information comprises one of the following states: the SIB1 is transmitted only on an anchor carrier, or the SIB1 is transmitted only on a non-anchor carrier; and
 the processor is adapted to:
 determine to receive, using the receiver, the SIB1 from the first communications device on the anchor carrier or the non-anchor carrier based on the scheduling information and the status information; and
 when determining to receive the SIB1 from the first communications device on the non-anchor carrier, the processor is further adapted to determine a non-anchor carrier used to receive the SIB1.

12. The apparatus according to claim 10, wherein the first information comprises the frequency domain position information of the non-anchor carrier used to transmit the SIB1, and the frequency domain position information of the non-anchor carrier used to transmit the SIB1 comprises at least one of the following parameters:
a relative location of the non-anchor carrier used to transmit the SIB1 relative to an anchor carrier; or
a frequency-domain offset between the non-anchor carrier used to transmit the SIB1 and the anchor carrier, wherein the frequency-domain offset is a frequency domain interval or a quantity of resource blocks; and
the processor is adapted to:
determine that the SIB1 is received on a non-anchor carrier;
determine, based on the frequency domain position information and the anchor carrier, a frequency domain position of the non-anchor carrier; and
receive, using the receiver and based on the scheduling information, the SIB1 from the first communications device on the non-anchor carrier that corresponds to the frequency domain position; or receive, using the receiver and based on the scheduling information, the SIB1 from the first communications device on the anchor carrier and the non-anchor carrier that corresponds to the frequency domain position.

13. The method according to claim 1, wherein
a part of repetition number values in a repetition number set corresponds to a first state, and the first state is that the SIB1 is transmitted only on an anchor carrier;
a second state corresponding to another part of the repetition number values in the repetition number set is determined based on the status information used to transmit the SIB1, and the second state is that the SIB1 is transmitted only on the non-anchor carrier or the SIB1 is transmitted only on the anchor carrier;
the scheduling information is used to determine a transport block size used to transmit the SIB1 and a repetition number;
when the repetition number in the scheduling information corresponds to the first state, the MIB message comprises the scheduling information of the SIB1 and the operation mode of the carrier;
when the repetition number in the scheduling information corresponds to the second state, the MIB message comprises the scheduling information of the SIB1, the operation mode of the carrier, and the first information comprising the status information used to transmit the SIB1.

14. The method according to claim 1, wherein the anchor carrier is a carrier on which the second communications device assumes that narrowband primary synchronization signal/ narrowband secondary synchronization signal/ narrowband physical broadcast channel (NPSS/NSSS/NPBCH) transmission is performed, and the non-anchor carrier is a carrier on which the second communications device assumes that no NPSS/NSSS/NPBCH transmission is performed.

15. The method according to claim 4, wherein
a part of repetition number values in a repetition number set corresponds to a first state, and the first state is that the SIB1 is transmitted only on an anchor carrier;
a second state corresponding to another part of the repetition number values in the repetition number set is determined based on the status information used to transmit the SIB1, and the second state is that the SIB1 is transmitted only on the non-anchor carrier or the SIB1 is transmitted only on the anchor carrier;
the scheduling information is used to determine a transport block size used to transmit the SIB1 and a repetition number;
when the repetition number in the scheduling information corresponds to the first state, the MIB message comprises the scheduling information of the SIB1 and the operation mode of the carrier;
when the repetition number in the scheduling information corresponds to the second state, the MIB message comprises the scheduling information of the SIB1, the operation mode of the carrier, and the first information comprising the status information used to transmit the SIB1.

16. The method according to claim 4, wherein the anchor carrier is a carrier on which the second communications device assumes that narrowband primary synchronization signal/ narrowband secondary synchronization signal/ narrowband physical broadcast channel (NPSS/NSSS/NPBCH) transmission is performed, and the non-anchor carrier is a carrier on which the second communications device assumes that no NPSS/NSSS/NPBCH transmission is performed.

17. The apparatus according to claim 7, wherein
a part of repetition number values in a repetition number set corresponds to a first state, and the first state is that the SIB1 is transmitted only on an anchor carrier;
a second state corresponding to another part of the repetition number values in the repetition number set is determined based on the status information used to transmit the SIB1, and the second state is that the SIB1 is transmitted only on the non-anchor carrier or the SIB1 is transmitted only on the anchor carrier;
the scheduling information is used to determine a transport block size used to transmit the SIB1 and a repetition number;
when the repetition number in the scheduling information corresponds to the first state, the MIB message comprises the scheduling information of the SIB1 and the operation mode of the carrier;
when the repetition number in the scheduling information corresponds to the second state, the MIB message comprises the scheduling information of the SIB1, the operation mode of the carrier, and the first information comprising the status information used to transmit the SIB1.

18. The apparatus according to claim 7, wherein the anchor carrier is a carrier on which the second communications device assumes that narrowband primary synchronization signal/ narrowband secondary synchronization signal/ narrowband physical broadcast channel (NPSS/NSSS/NPBCH) transmission is performed, and the non-anchor carrier is a carrier on which the second communications device assumes that no NPSS/NSSS/NPBCH transmission is performed.

19. The apparatus according to claim 10, wherein
a part of repetition number values in a repetition number set corresponds to a first state, and the first state is that the SIB1 is transmitted only on an anchor carrier;
a second state corresponding to another part of the repetition number values in the repetition number set is determined based on the status information used to transmit the SIB1, and the second state is that the SIB1 is transmitted only on the non-anchor carrier or the SIB1 is transmitted only on the anchor carrier;

the scheduling information is used to determine a transport block size used to transmit the SIB1 and a repetition number;

when the repetition number in the scheduling information corresponds to the first state, the MIB message comprises the scheduling information of the SIB1 and the operation mode of the carrier;

when the repetition number in the scheduling information corresponds to the second state, the MIB message comprises the scheduling information of the SIB1, the operation mode of the carrier, and the first information comprising the status information used to transmit the SIB1.

20. The apparatus according to claim 10, wherein the anchor carrier is a carrier on which the second communications device assumes that narrowband primary synchronization signal/ narrowband secondary synchronization signal/ narrowband physical broadcast channel (NPSS/NSSS/NPBCH) transmission is performed, and the non-anchor carrier is a carrier on which the second communications device assumes that no NPSS/NSSS/NPBCH transmission is performed.

* * * * *

UNITED STATES PATENT AND TRADEMARK OFFICE
CERTIFICATE OF CORRECTION

PATENT NO. : 11,259,314 B2
APPLICATION NO. : 16/875801
DATED : February 22, 2022
INVENTOR(S) : Luo et al.

It is certified that error appears in the above-identified patent and that said Letters Patent is hereby corrected as shown below:

In the Claims

Claim 1, Column 69, Line 34: "(SIB1) at least" should read -- (SIB1) and at least --.

Claim 7, Column 71, Line 53: "transmit, by using" should read -- transmit, using --.

Signed and Sealed this
Fourteenth Day of June, 2022

Katherine Kelly Vidal
*Director of the United States Patent and Trademark Office*